July 9, 1963
J. A. ABBOTT ETAL
3,096,837
WEIGHT CHECKING AND CORRECTING APPARATUS
Filed Jan. 26, 1959
20 Sheets-Sheet 1
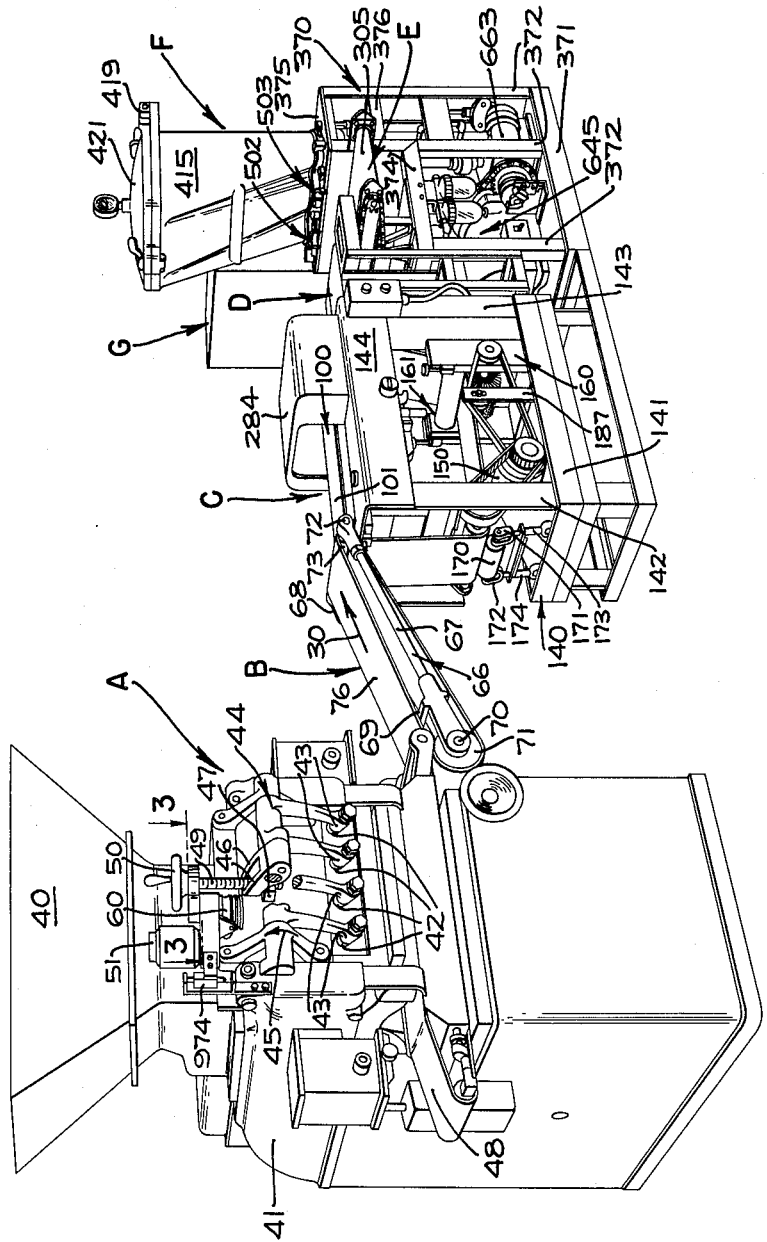
FIG_1
INVENTORS
JOHN A. ABBOTT   PHILIP R. BUNNELLE
THOMAS E. ROBERTS, JR.   HERBERT B. BROOKS
WILLIAM J. FOWLER
BY Hans G. Hoffmeister
ATTORNEY July 9, 1963
J. A. ABBOTT ETAL
3,096,837
WEIGHT CHECKING AND CORRECTING APPARATUS
Filed Jan. 26, 1959
20 Sheets-Sheet 2
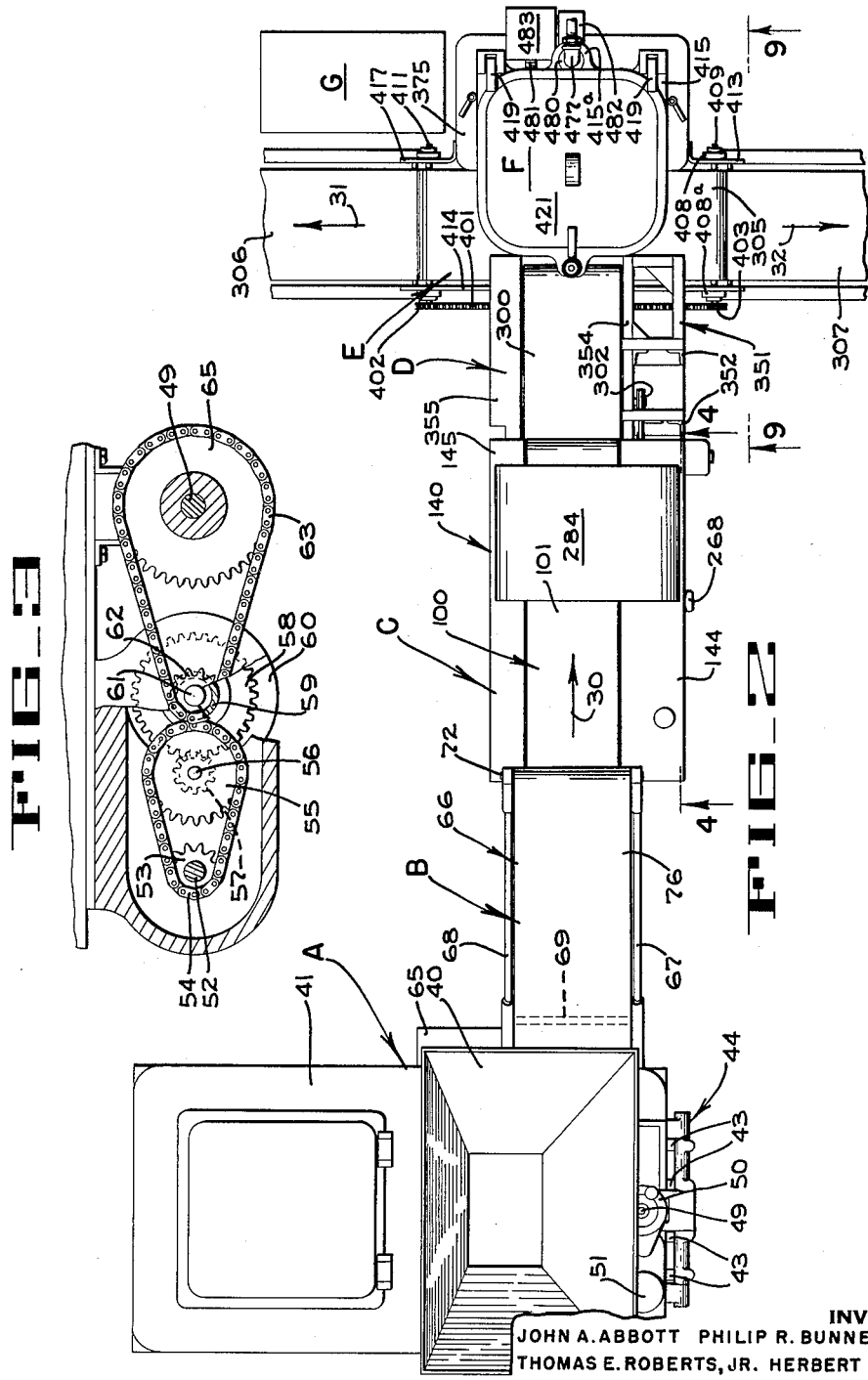
INVENTORS
JOHN A. ABBOTT  PHILIP R. BUNNELLE
THOMAS E. ROBERTS, JR.  HERBERT B. BROOKS
WILLIAM J. FOWLER
BY Hans G. Hoffmeister
ATTORNEY July 9, 1963
J. A. ABBOTT ETAL
3,096,837
WEIGHT CHECKING AND CORRECTING APPARATUS
Filed Jan. 26, 1959
20 Sheets-Sheet 3
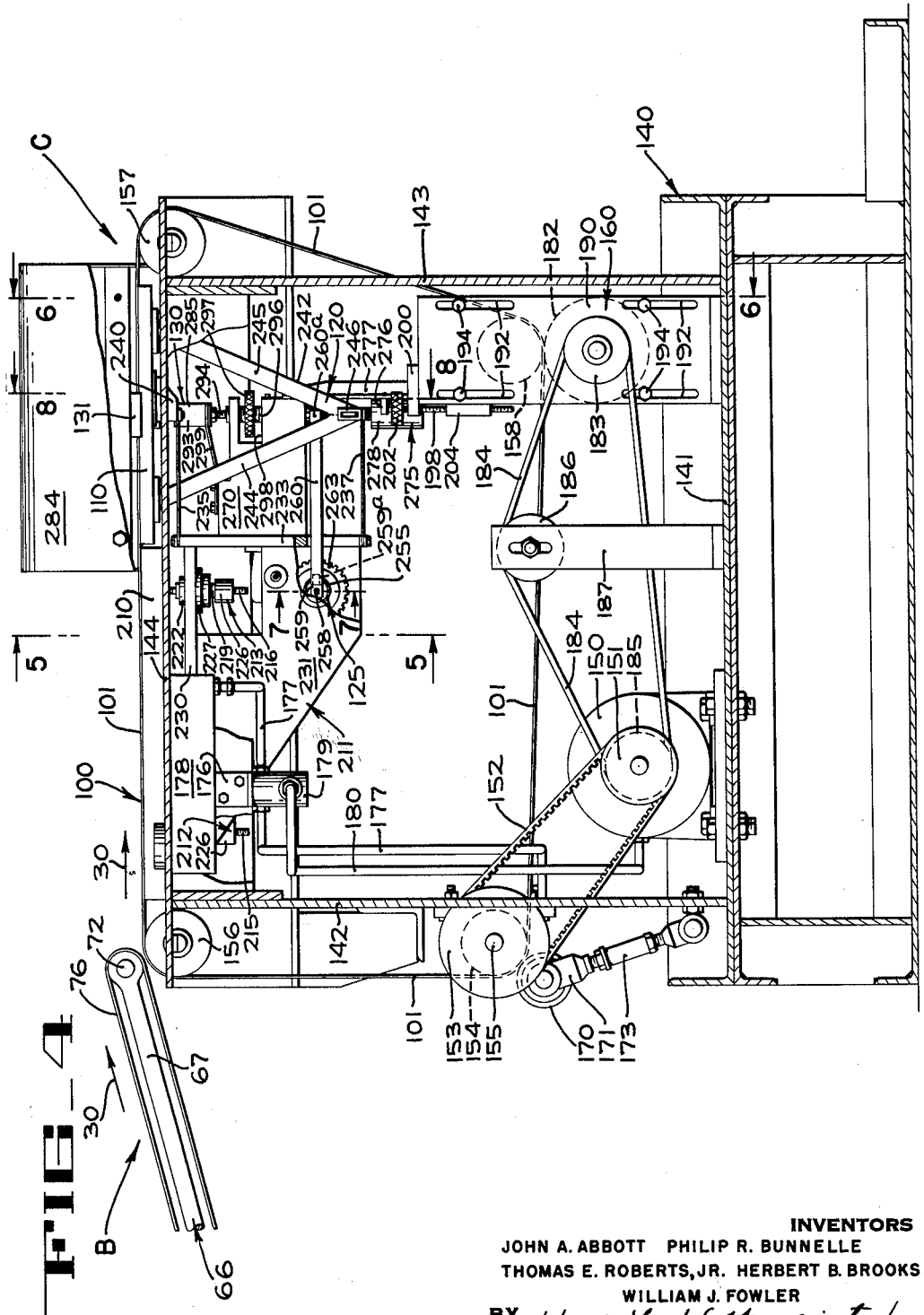
INVENTORS
JOHN A. ABBOTT   PHILIP R. BUNNELLE
THOMAS E. ROBERTS, JR.   HERBERT B. BROOKS
WILLIAM J. FOWLER
BY Hans G. Hoffmeister
ATTORNEY July 9, 1963
J. A. ABBOTT ETAL
3,096,837
WEIGHT CHECKING AND CORRECTING APPARATUS
Filed Jan. 26, 1959
20 Sheets-Sheet 4
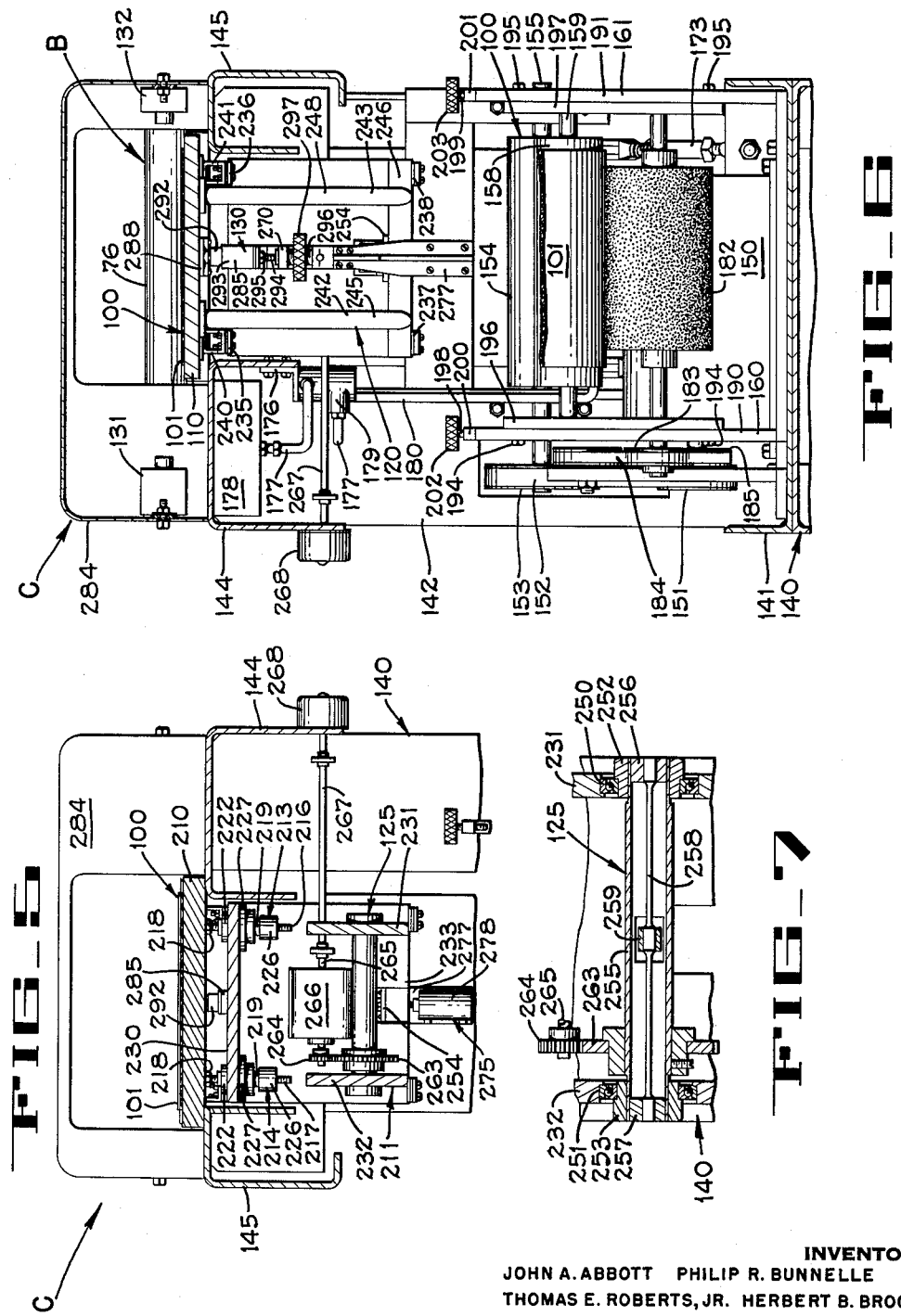
INVENTORS
JOHN A. ABBOTT   PHILIP R. BUNNELLE
THOMAS E. ROBERTS, JR.   HERBERT B. BROOKS
WILLIAM J. FOWLER
BY Hans G. Hoffmeister
ATTORNEY

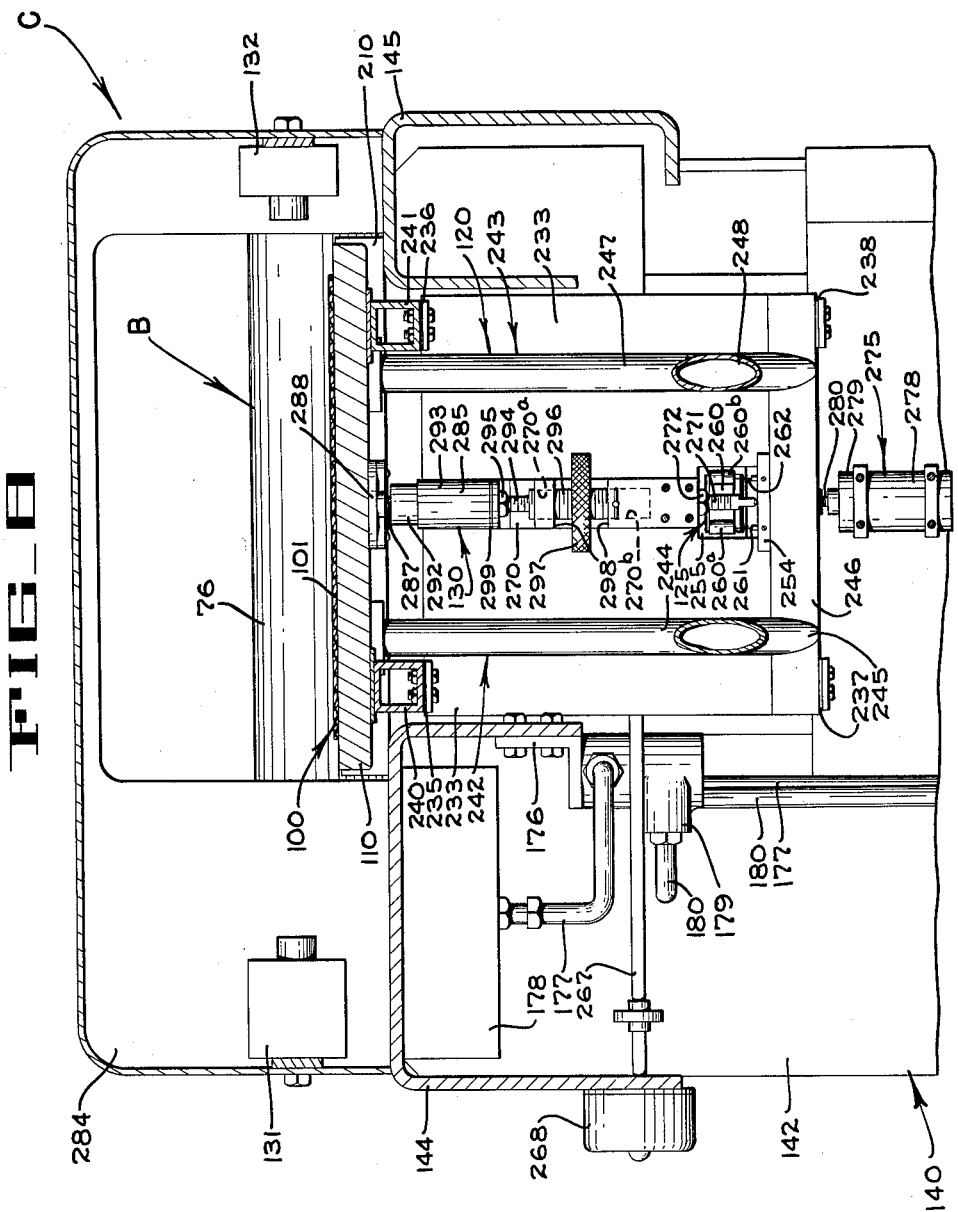

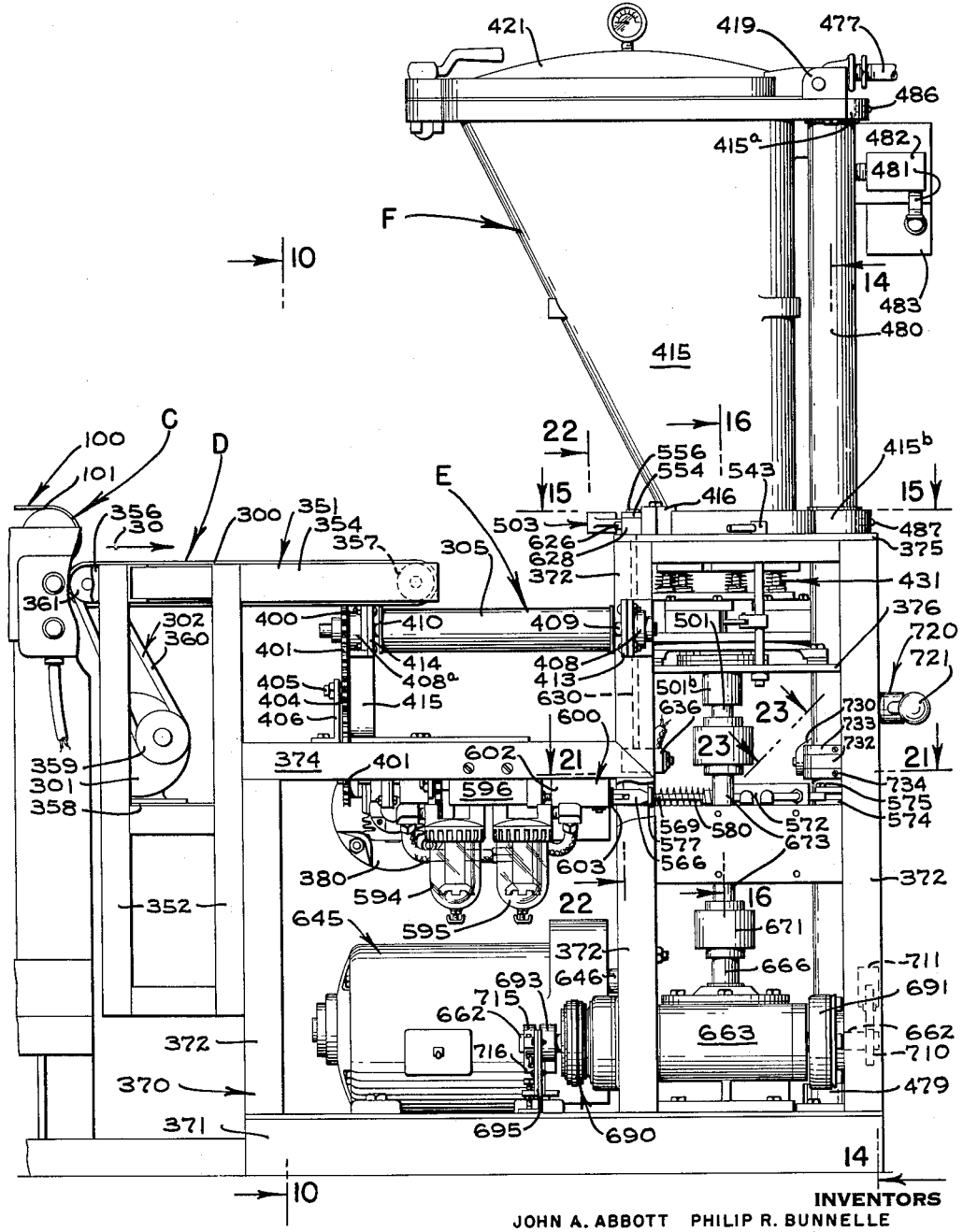

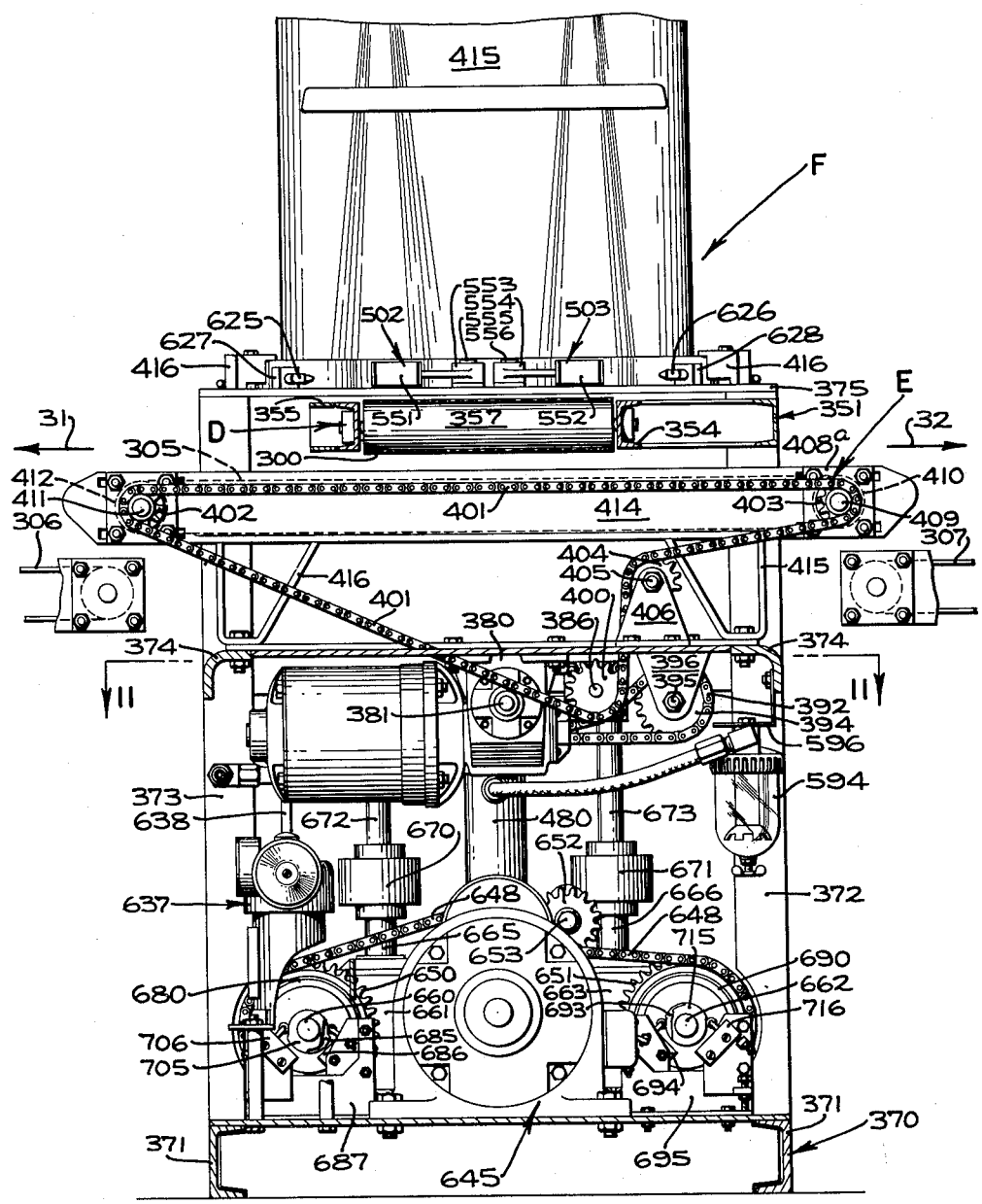

July 9, 1963 J. A. ABBOTT ETAL 3,096,837
WEIGHT CHECKING AND CORRECTING APPARATUS
Filed Jan. 26, 1959 20 Sheets-Sheet 8
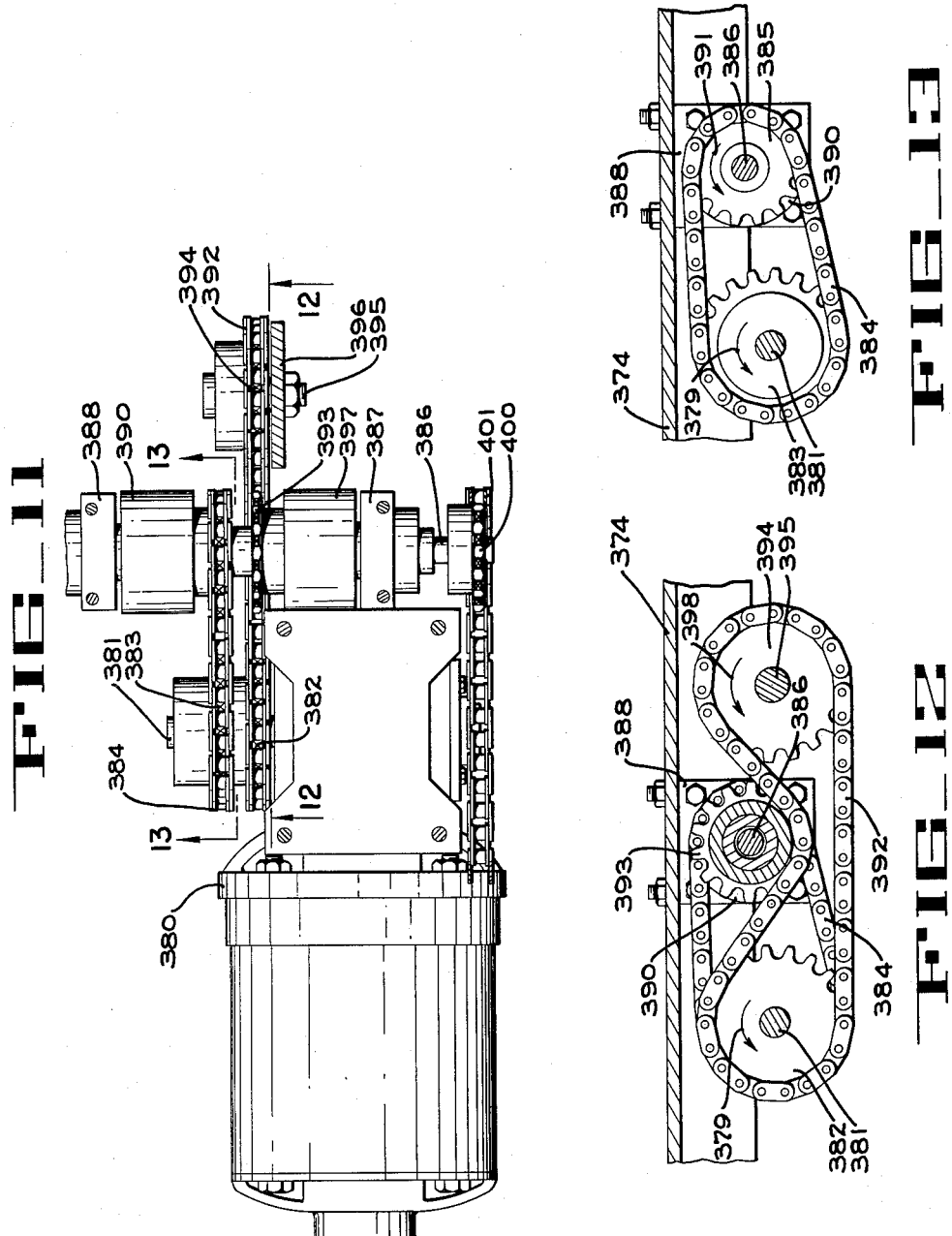
INVENTORS
JOHN A. ABBOTT   PHILIP R. BUNNELLE
THOMAS E. ROBERTS, JR.   HERBERT B. BROOKS
WILLIAM J. FOWLER
BY
ATTORNEY

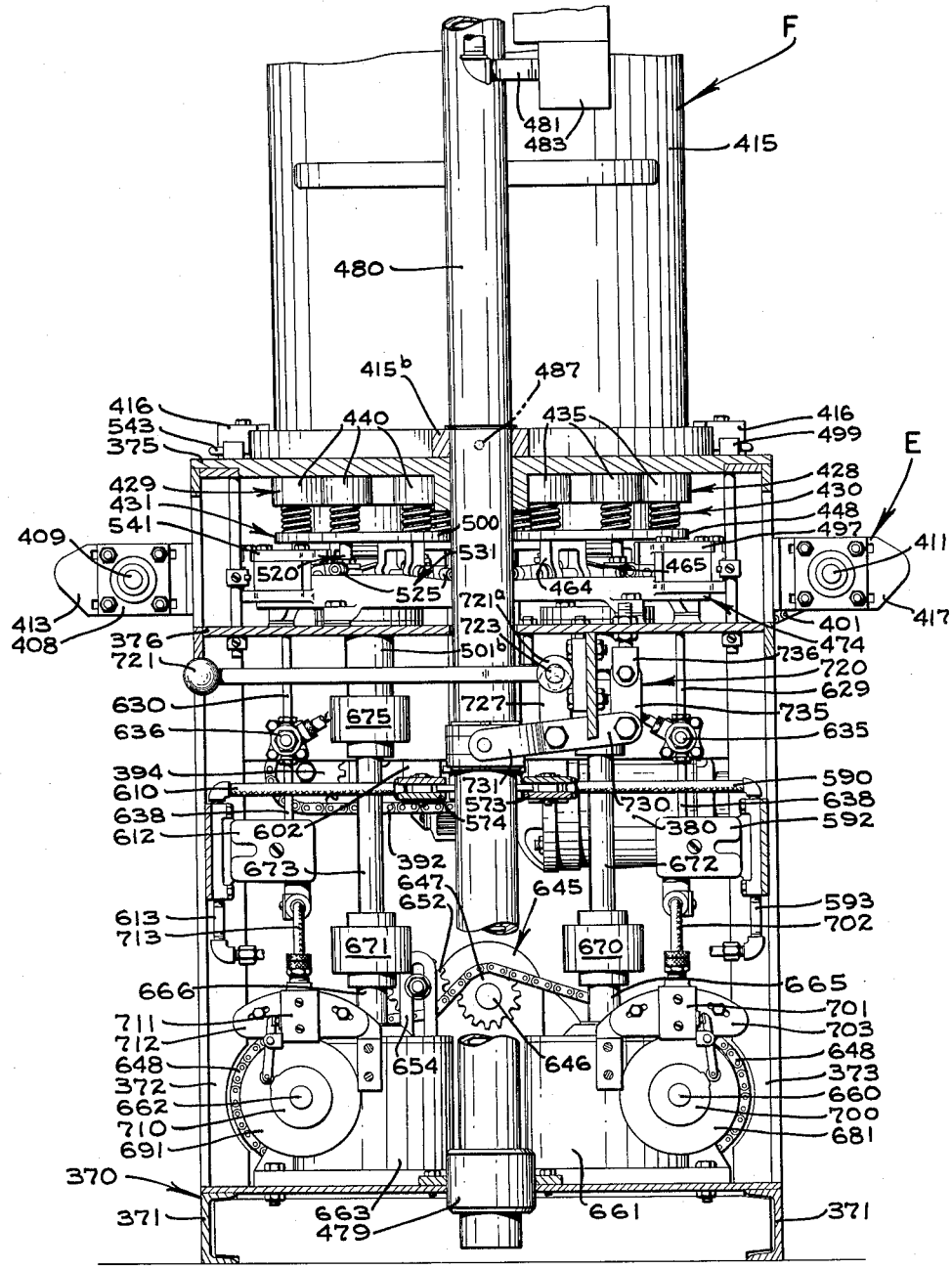

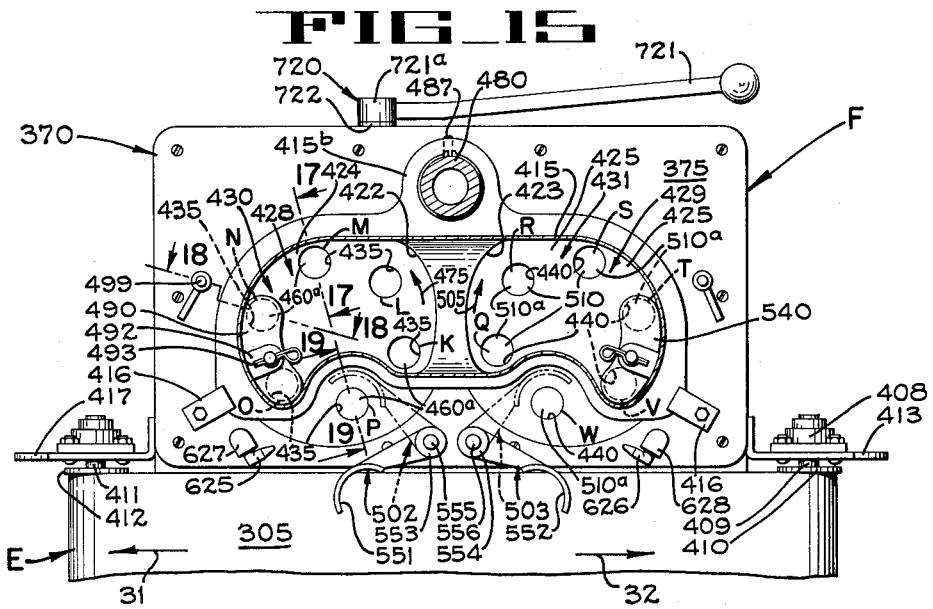
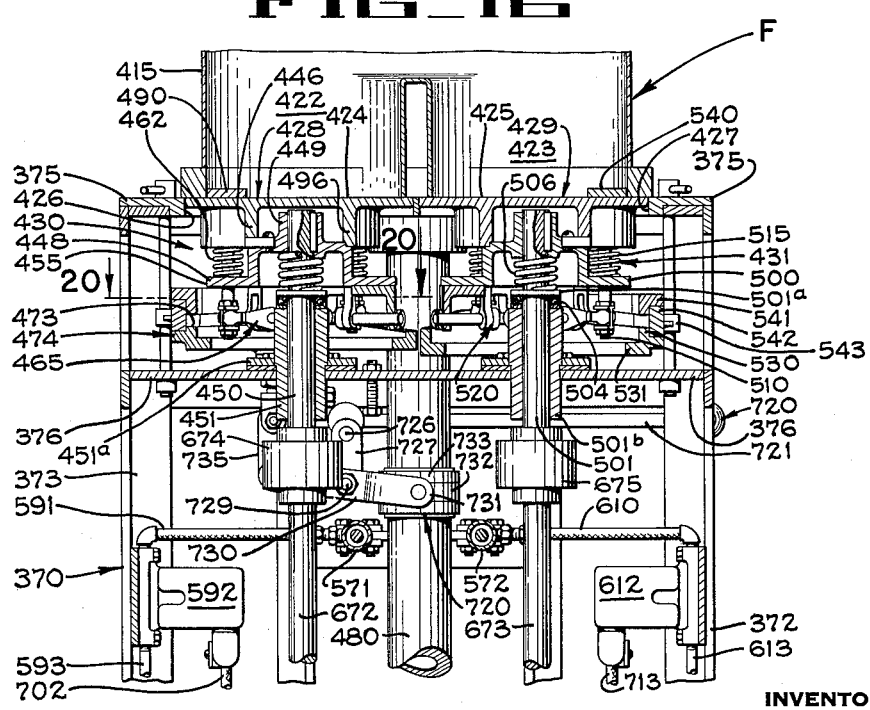

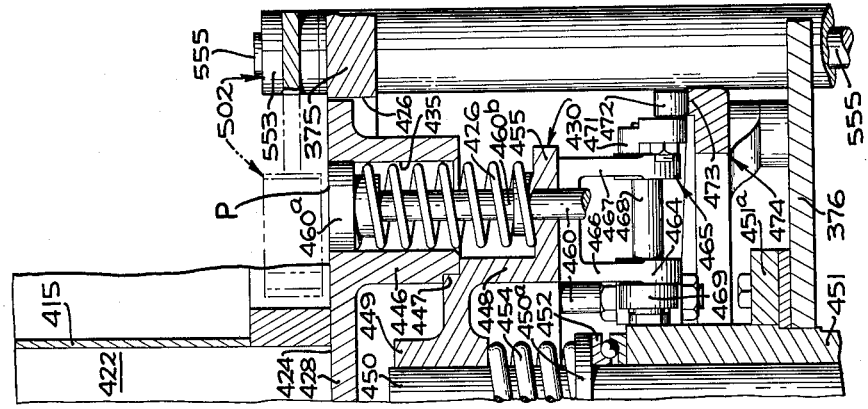
FIG_19
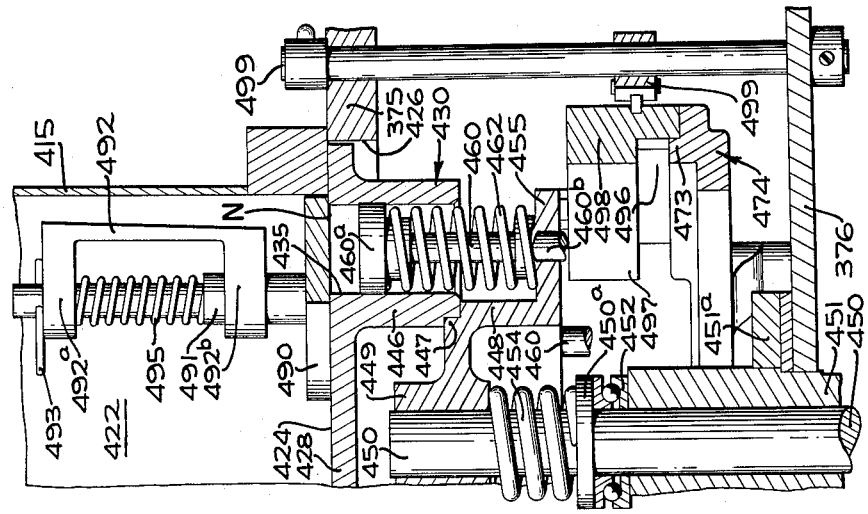
FIG_18
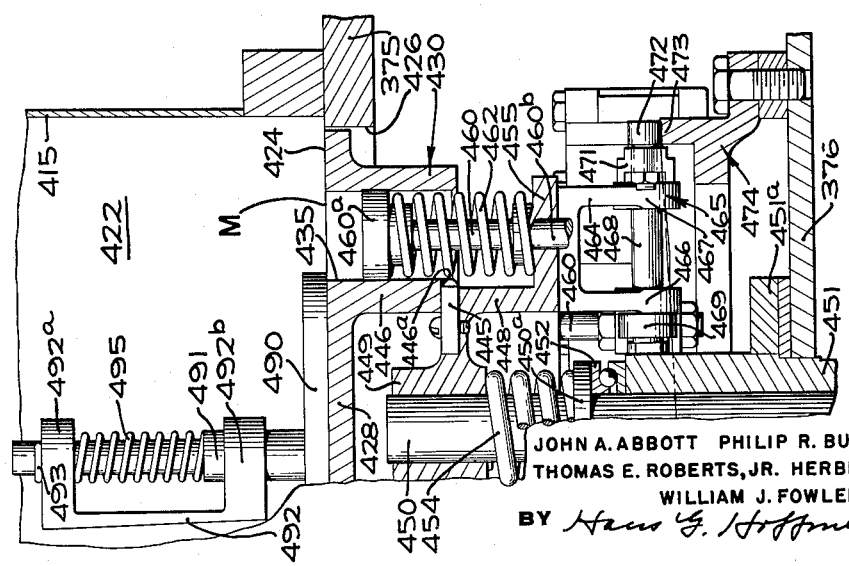
FIG_17
INVENTORS
JOHN A. ABBOTT  PHILIP R. BUNNELLE
THOMAS E. ROBERTS, JR.  HERBERT B. BROOKS
WILLIAM J. FOWLER
BY
ATTORNEY

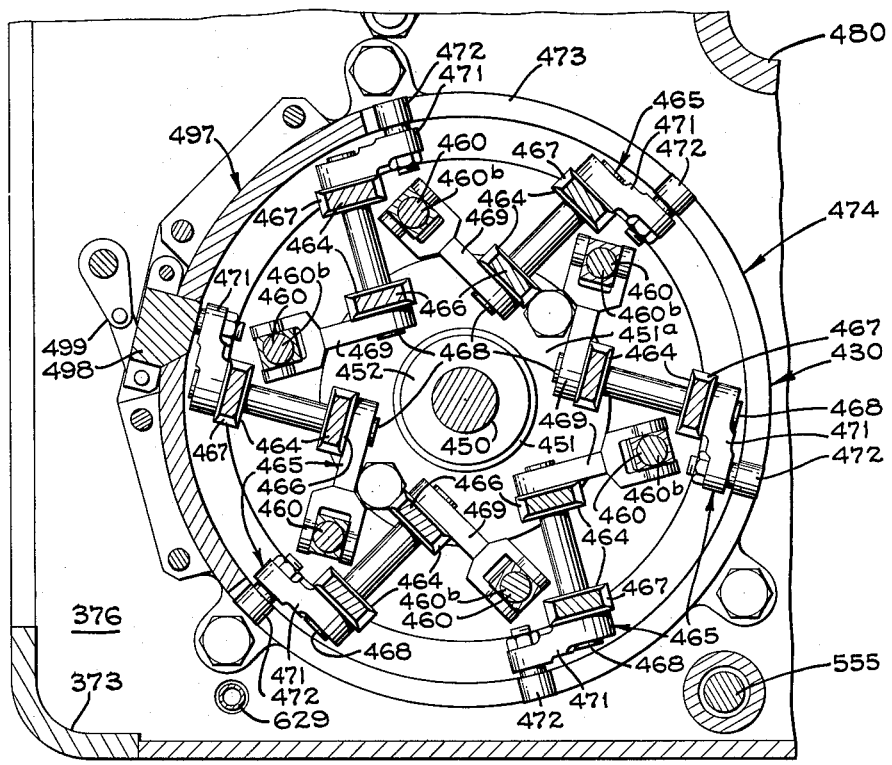

July 9, 1963
J. A. ABBOTT ETAL
3,096,837
WEIGHT CHECKING AND CORRECTING APPARATUS
Filed Jan. 26, 1959
20 Sheets-Sheet 13
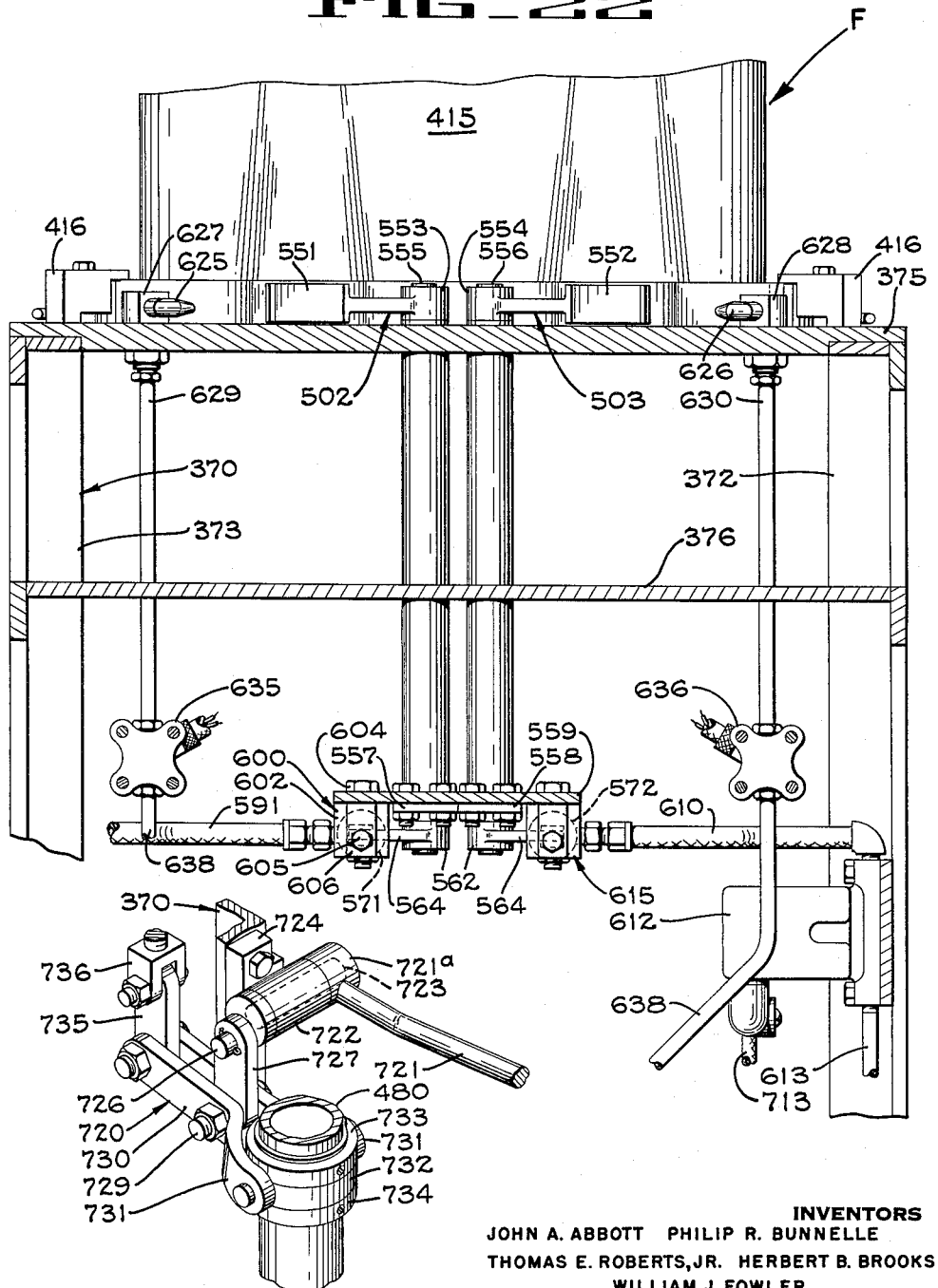
INVENTORS
JOHN A. ABBOTT   PHILIP R. BUNNELLE
THOMAS E. ROBERTS, JR.   HERBERT B. BROOKS
WILLIAM J. FOWLER
BY Hans G. Hoffmeister
ATTORNEY

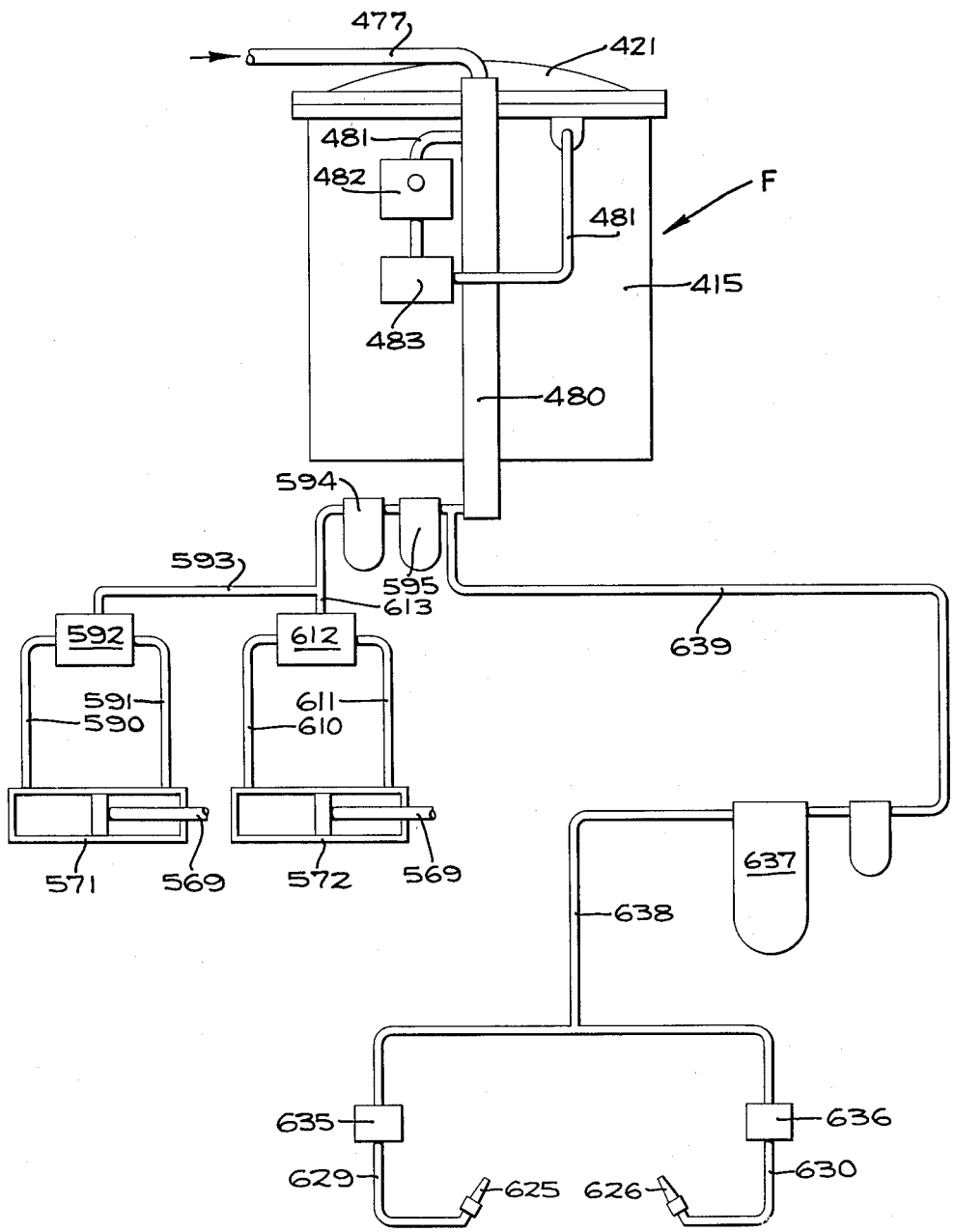

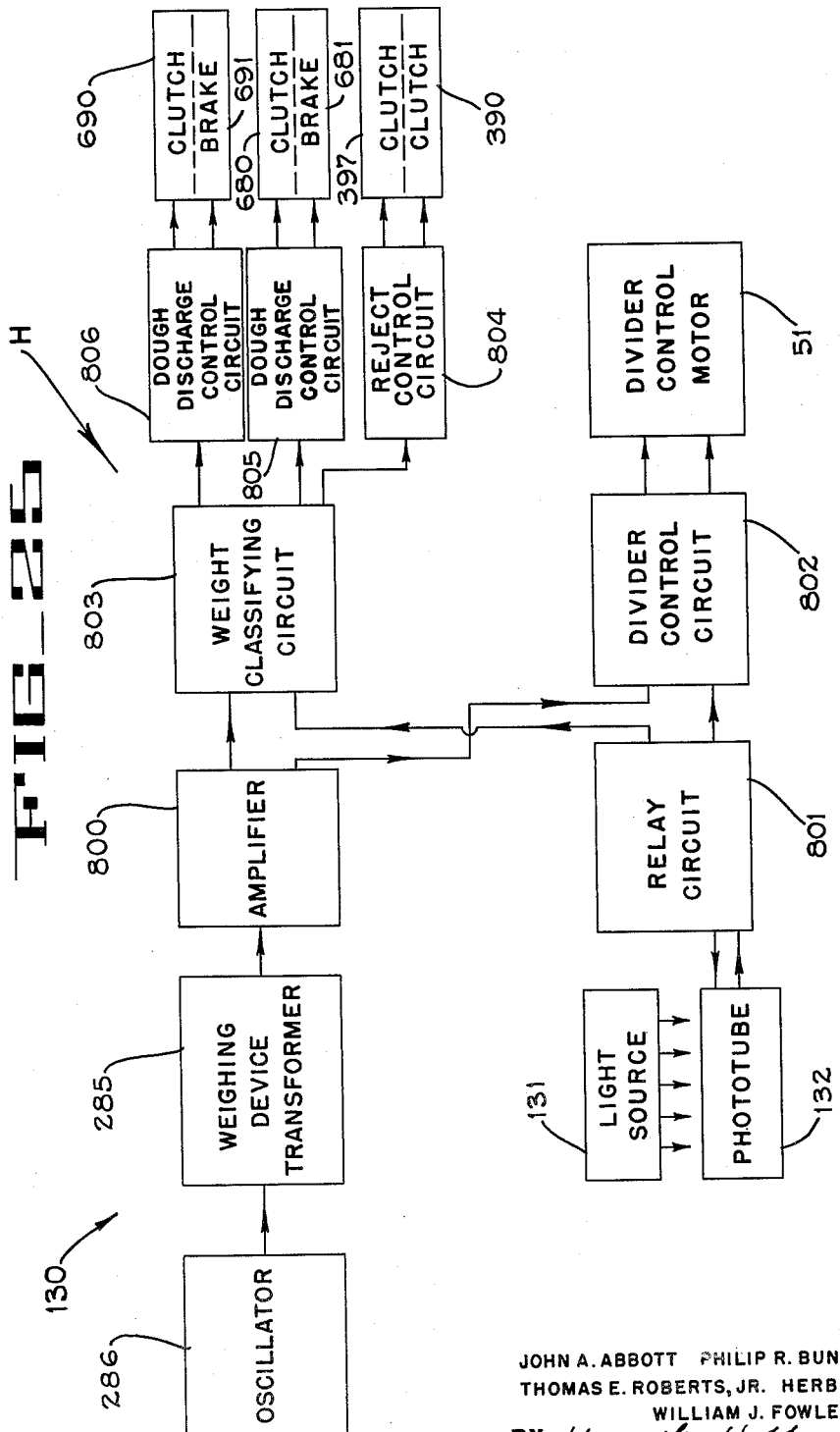

July 9, 1963
J. A. ABBOTT ETAL
3,096,837
WEIGHT CHECKING AND CORRECTING APPARATUS
Filed Jan. 26, 1959
20 Sheets—Sheet 16
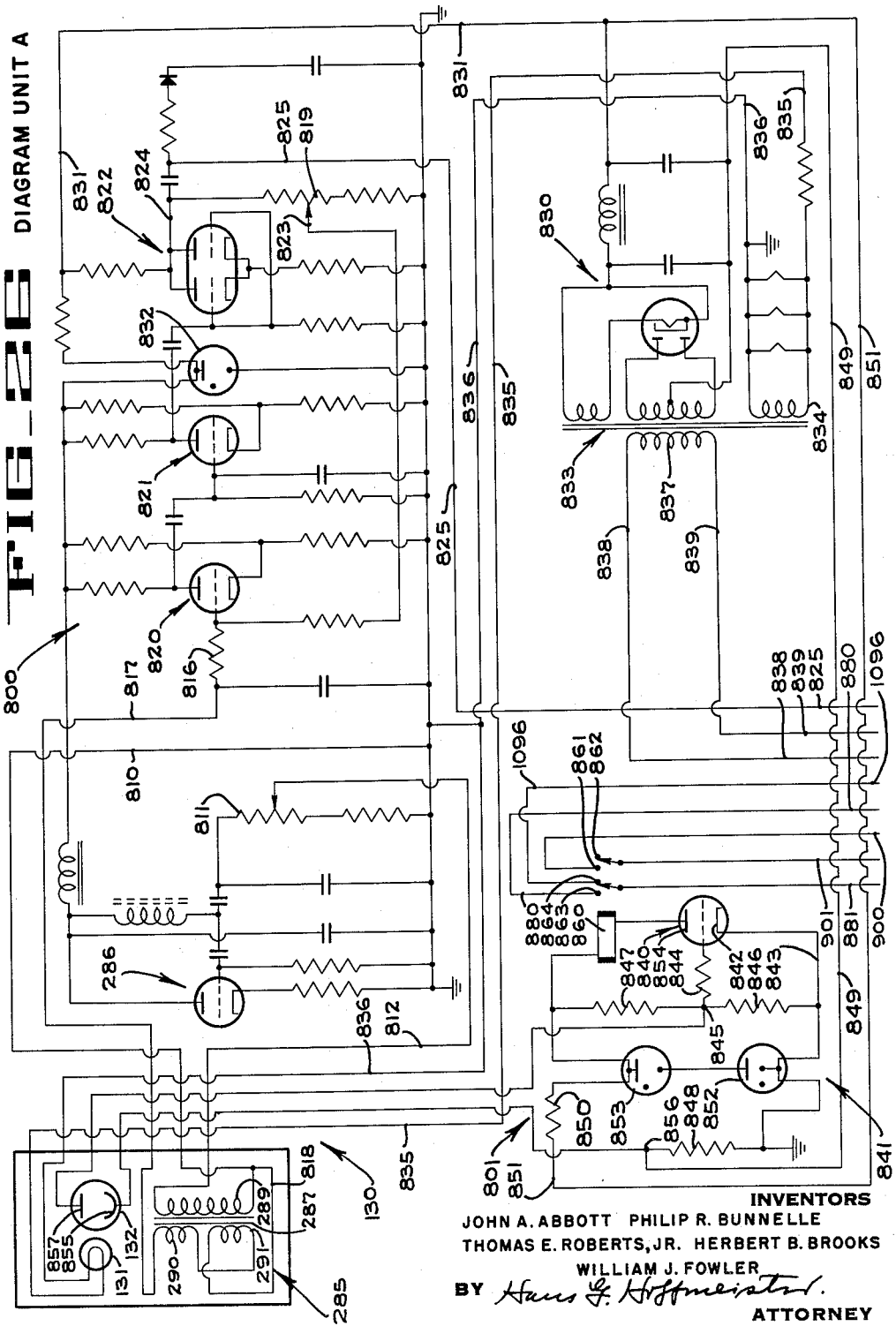
INVENTORS
JOHN A. ABBOTT  PHILIP R. BUNNELLE
THOMAS E. ROBERTS, JR.  HERBERT B. BROOKS
WILLIAM J. FOWLER
BY *Hans G. Hoffmeister*
ATTORNEY

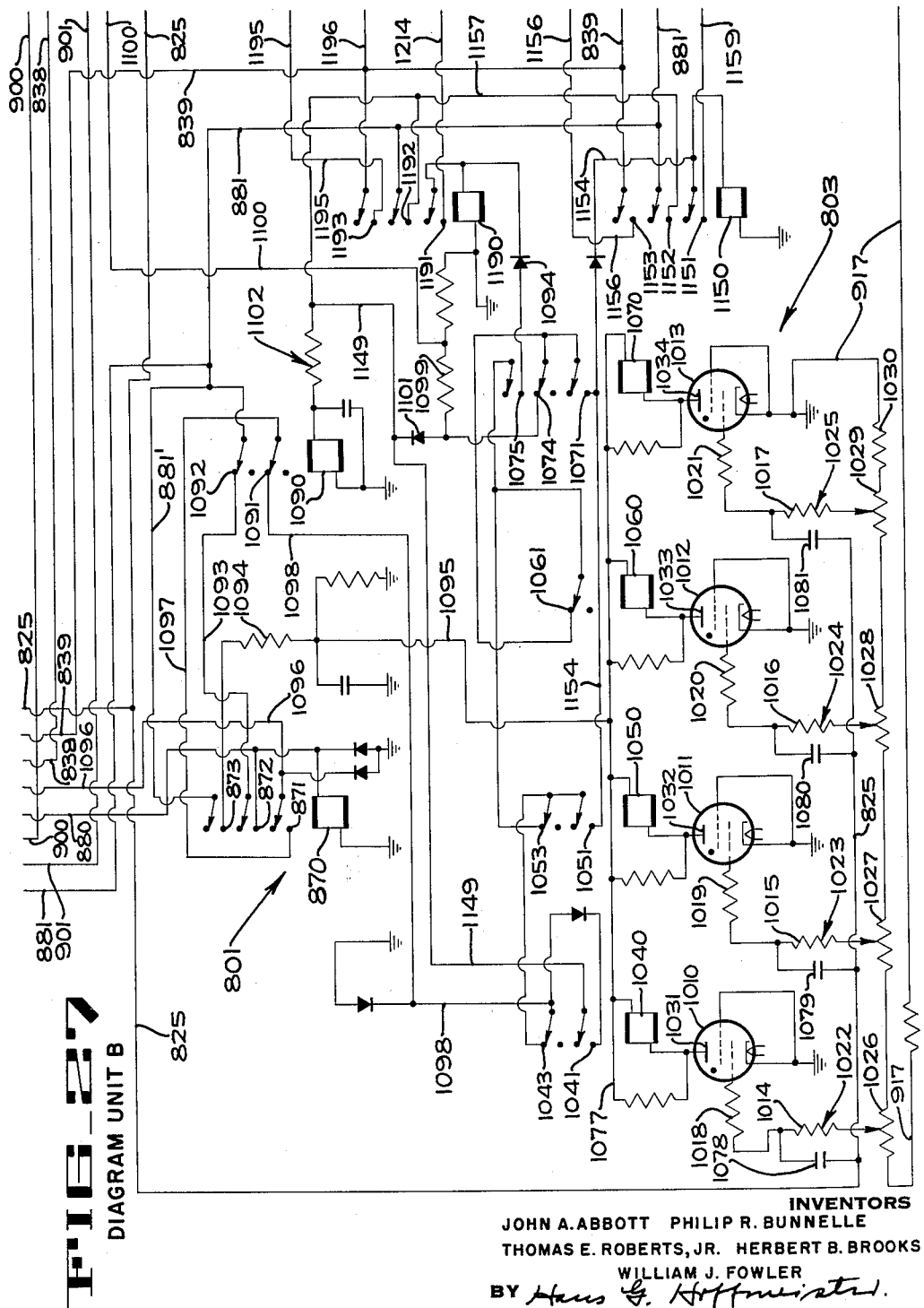
FIG. 27 DIAGRAM UNIT B
INVENTORS
JOHN A. ABBOTT  PHILIP R. BUNNELLE
THOMAS E. ROBERTS, JR.  HERBERT B. BROOKS
WILLIAM J. FOWLER
BY Hans G. Hoffmeister
ATTORNEY July 9, 1963 J. A. ABBOTT ETAL 3,096,837
WEIGHT CHECKING AND CORRECTING APPARATUS
Filed Jan. 26, 1959 20 Sheets-Sheet 18
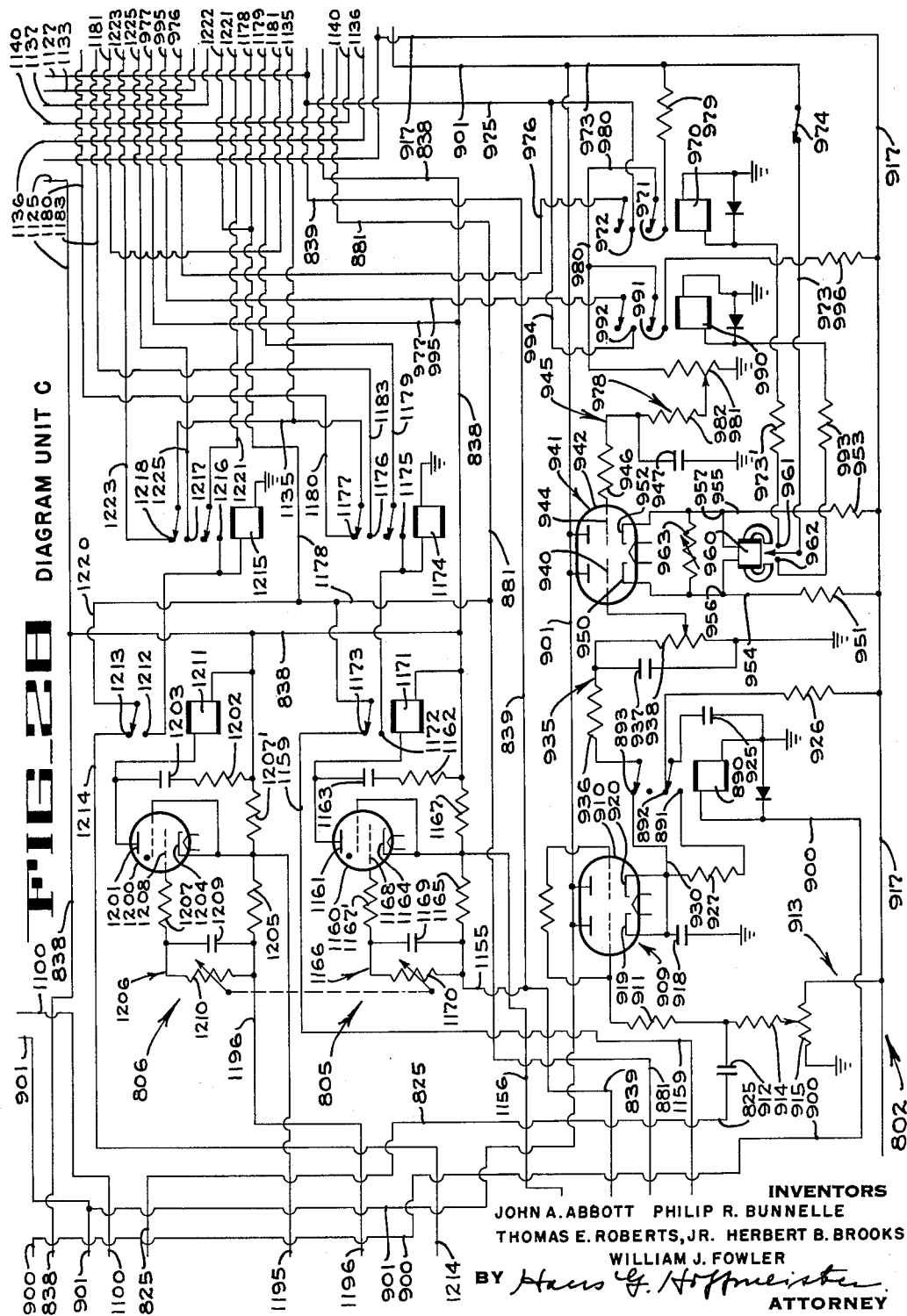
INVENTORS
JOHN A. ABBOTT  PHILIP R. BUNNELLE
THOMAS E. ROBERTS, JR.  HERBERT B. BROOKS
WILLIAM J. FOWLER
BY Hans G. Hoffmeister
ATTORNEY

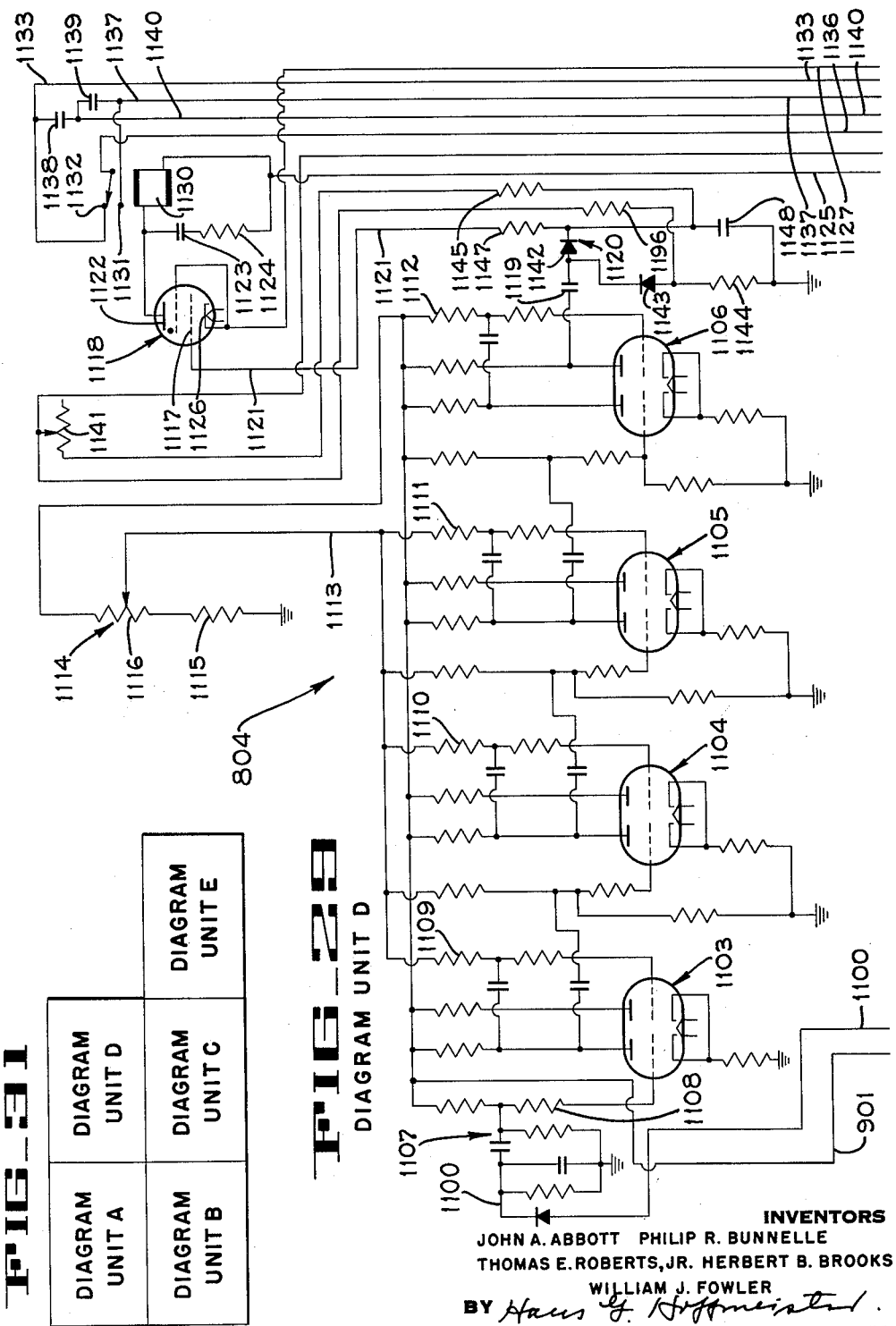

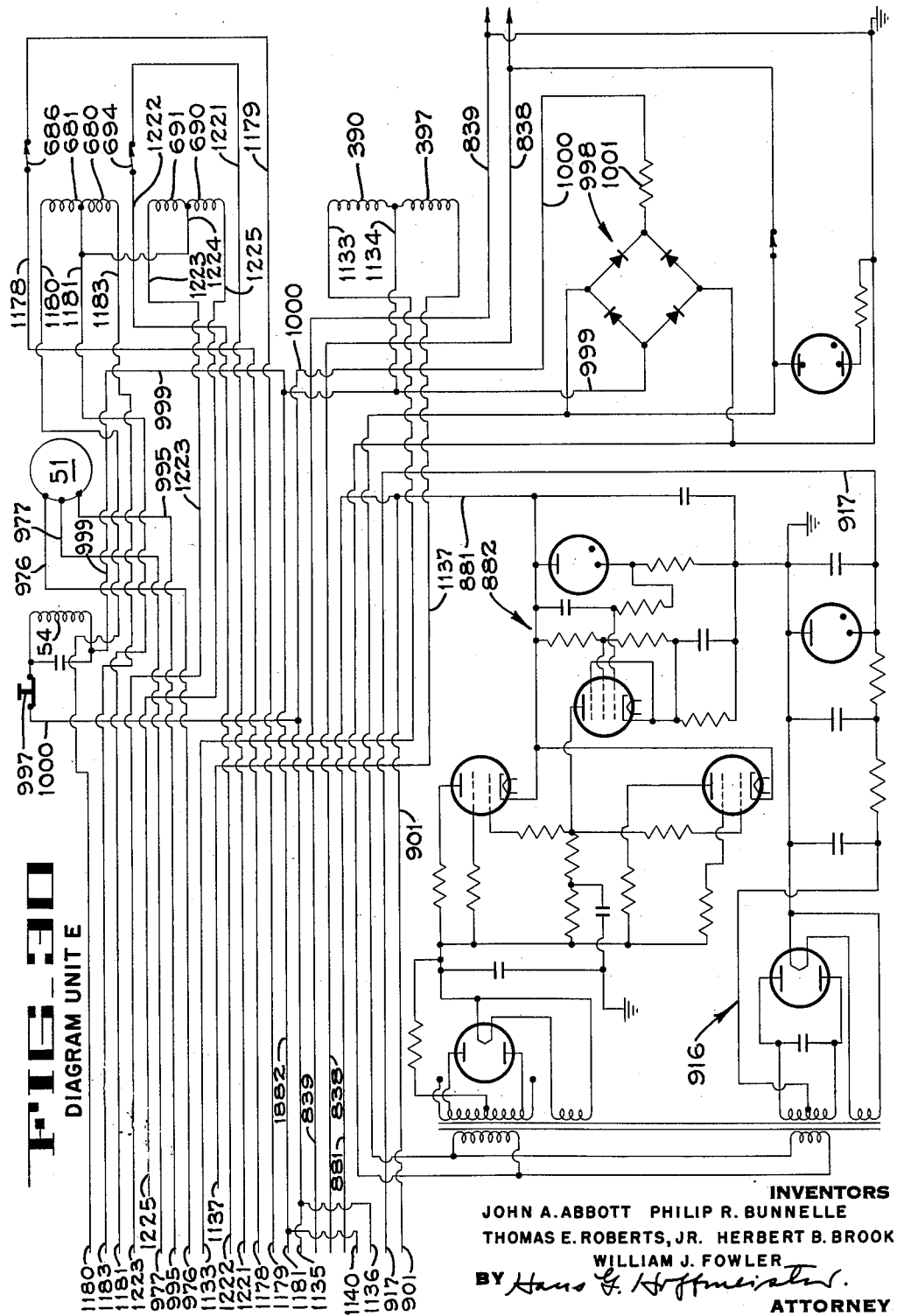

United States Patent Office 3,096,837
Patented July 9, 1963

3,096,837
WEIGHT CHECKING AND CORRECTING APPARATUS
John A. Abbott, Menlo Park, Philip R. Bunnelle, San Jose, Thomas E. Roberts, Jr., Saratoga, Herbert B. Brooks, Menlo Park, and William J. Fowler, San Jose, Calif., assignors to FMC Corporation, a corporation of Delaware
Filed Jan. 26, 1959, Ser. No. 789,124
8 Claims. (Cl. 177—62)

The present invention appertains to weight checking and correcting apparatus, and more particularly to weight checking and correcting apparatus adapted for use with apparatus for handling dough in bakeries and the like.

In the commercial processing of manufacturing baked goods, pieces of dough are formed from a mass of dough by a dough divider. The dough divider includes pockets or cells to measure volumetrically the size of the pieces of dough formed therein. Since dough is a tacky, viscous substance that varies in density, the forming of pieces of dough in volumetric measuring cells or pockets produced finished products that varied in weight. It is the commercial practice to sell baked goods, such as loaves of bread, by weight. Therefore, the baking industry has been confronted with the problem of ensuring that each item produced meets a prescribed weight requirement without incurring losses resulting from intentionally overweighted items. Further, the baking industry has been confronted with the problem of reducing the number of pieces of dough that are rejected because they fail to meet the prescribed weight requirement. It is desirable to overcome these problems without sacrificing speed of operation and without incurring additional expenses through manual labor.

An object of the present invention is to provide an improved weight checking and correcting apparatus.

Another object is to provide a weight checking and correcting apparatus that reduces handling costs by automatically correcting the weight of underweight articles.

Another object of the present invention is to provide a weight checking and correcting apparatus for use with dough dividing machines, which apparatus ensures that pieces of dough advanced for further processing meet a prescribed weight requirement, thereby avoiding losses resulting from the necessity of intentionally making pieces of dough overweight.

Another object is to provide a weight checking and correcting apparatus capable of depositing quantities of dough onto continuously advancing pieces of dough that are deficient in weight.

Another object is to provide a weight checking and correcting apparatus capable of detecting the amount of underweight of a piece of dough and selectively adding one of several increments of supplemental dough to the main piece of dough to accurately correct the underweight condition in a single operation.

Another object is to provide a weight checking and correcting apparatus that adds quantities of dough onto pieces of dough weighing in a range between a prescribed weight and a predetermined minimum weight, and that rejects pieces of dough weighing less than the predetermined minimum weight.

Another object of the present invention is to provide control means for a weight checking apparatus having a reversible conveyor movable in one direction to reject articles and in an opposite direction to further process the articles, said control means being arranged to maintain a high operating speed by keeping the conveyor moving in the article-rejecting direction after an article is rejected for a predetermined length of time.

Another object of the present invention is to provide a weight checking and correcting apparatus that has an improved control circuit for controlling the forming and discharging of pieces of dough from a dough dividing machine.

Another object of the present invention is to provide a dough discharging mechanism that forms pieces of dough and projects the pieces of dough in a predetermined direction.

Another object of the present invention is to provide a dough discharging mechanism that measures different quantities of dough and is selectively operable to project a selected quantity of dough in a predetermined direction.

Another object is to provide improved control mechanism and an improved electric control circuit for a weight checking and correcting apparatus.

Another object is to provide an improved weight checking apparatus.

Another object is to provide an improved mechanism for controlling the size of the dough pieces formed in a dough divider.

Another object is to provide a weighing device having a depressible scale platform and improved means for accurately positioning the platform for receiving articles successively advanced thereacross.

Other objects and advantages of the present invention will become apparent from the following description and drawings, in which:

FIG. 1 is a perspective view of the weight checking and correcting apparatus of the present invention in operative association with a dough dividing machine.

FIG. 2 is a plan view of the weight checking and correcting apparatus of the present invention shown with the dough dividing machine.

FIG. 3 is an enlarged horizontal section taken along line 3—3 of FIG. 1.

FIG. 4 is an enlarged vertical section taken along line 4—4 of FIG. 2, particularly illustrating the weight checking apparatus of the present invention.

FIG. 5 is a vertical section taken along line 5—5 of FIG. 4.

FIG. 6 is a vertical section taken along line 6—6 of FIG. 4.

FIG. 7 is an enlarged vertical section taken along line 7—7 of FIG. 4.

FIG. 8 is an enlarged vertical section taken along line 8—8 of FIG. 4.

FIG. 9 is a side elevation looking in the direction of arrows 9—9 of FIG. 2, and particularly illustrating the dough discharging apparatus and the reversible conveyor of the present invention.

FIG. 10 is an enlarged vertical section taken along line 10—10 of FIG. 9 to illustrate the reversible conveyor.

FIG. 11 is a horizontal section taken along line 11—11 of FIG. 10.

FIG. 12 is a vertical section taken along line 12—12 of FIG. 11.

FIG. 13 is a vertical section taken along line 13—13 of FIG. 11.

FIG. 14 is an enlarged vertical section taken along line 14—14 of FIG. 9 to illustrate the dough discharging mechanism.

FIG. 15 is an enlarged horizontal section taken along line 15—15 of FIG. 9 to further illustrate the dough discharging mechanism.

FIG. 16 is an enlarged vertical section taken along line 16—16 of FIG. 9.

FIG. 17 is an enlarged vertical section taken along line 17—17 of FIG. 15.

FIG. 18 is an enlarged vertical section taken along line 18—18 of FIG. 15.

FIG. 19 is an enlarged vertical section taken along line 19—19 of FIG. 15.

FIG. 20 is an enlarged horizontal section taken along line 20—20 of FIG. 16.

FIG. 21 is an enlarged horizontal section taken along line 21—21 of FIG. 9.

FIG. 22 is an enlarged vertical section taken along line 22—22 of FIG. 9.

FIG. 23 is a fragmentary perspective taken looking in the direction of arrows 23—23 of FIG. 9.

FIG. 24 is a diagram of the fluid control system used in the machine of the present invention.

FIG. 25 is a block diagram of the electronic circuits employed in the weight checking and correcting apparatus of the present invention.

FIGS. 26-30, inclusive, comprise units A, B, C, D and E, respectively, of a control diagram which, when arranged in the manner shown in FIG. 31, illustrate schematically the electronic circuits shown in block diagram in FIG. 25.

In FIGS. 1 and 2 is illustrated a conventional dough dividing machine A that forms individual measured pieces of dough from a mass of dough, each individual piece being adapted to be formed into a single article, such as a loaf of bread. The machine advances the measured pieces of dough in succession onto a continuously operated conveyor B which projects upwardly and away from the dough dividing machine A.

The conveyor B feeds the spaced pieces of dough in succession onto a weight checking apparatus C, which continuously advances the pieces of dough in the direction indicated by an arrow 30. The weight checking apparatus C weighs the continuously advancing pieces of dough individually and transmits successive voltage signals representative of the weight of the successively weighed pieces of dough.

The pieces of dough are then advanced from the weight checking apparatus C onto a continuously operated transfer conveyor D, which feeds the pieces of dough to a reversible conveyor E. The pieces of dough discharged onto the reversible conveyor E are continuously advanced transversely of the conveyor D either in the direction indicated by an arrow 31 (FIG. 2) or in the direction indicated by an arrow 32 (FIG. 2). The reversible conveyor E is driven at a sufficient speed relative to the spacing between successive pieces of dough so that each piece of dough is supported individually by the reversible conveyor E.

Disposed adjacent the reversible conveyor E and spaced from the weight checking apparatus C, as shown in FIG. 2, is a dough discharging apparatus F. The dough discharging apparatus F forms relatively small measured quantities of dough from a mass of dough. When one of the pieces of dough, that was formed by the dough divider A and is advancing toward the reversible conveyor E, is deficient in weight within a predetermined range, the dough discharging apparatus F is operated to deposit onto such an underweight piece of dough a selected quantity of supplemental dough commensurate with the amount the piece of dough is deficient in weight. Thus, the discharging apparatus F adds increments of dough to the main piece of dough provided by the dough divider A. As will be explained presently, the apparatus F is adapted to selectively provide supplemental increments of dough in three different sizes since it is capable of discharging either one of two increments of different sizes or of discharging both increments simultaneously.

Adjacent the dough discharging apparatus F is a control unit G (FIG. 1) for mounting the components of electronic control circuits H (FIG. 25), which receive the successive voltage signals transmitted by the weight checking apparatus C. As previously described, the successive voltage signals are representative of the weights of successively weighed pieces of dough. The electronic control circuits H perform several control operations in response to the voltage signals and in response to the advancement of pieces of dough on the weight checking apparatus C. One control operation is the adjustment of the dough dividing machine A for regulating the weight of measured pieces of dough formed therein to compensate for a weight variation between a desired weight and the average weight of pieces of dough advancing successively across the check weighing apparatus C.

Another operation of the electronic control circuits H is the regulation of the direction of travel of the reversible conveyor E. When a piece of dough weighing more than a prescribed weight is discharged by the transfer conveyor D onto the reversible conveyor E, the reversible conveyor E advances the piece of dough of prescribed weight in the direction shown by the arrow 31 (FIG. 2) for further processing. In case a piece of dough of a weight less than said prescribed weight and less than a predetermined minimum weight is processed by the weight checking apparatus C, the electronic control circuits H reverse the direction of travel of the conveyor E to advance the piece of dough in the direction shown by the arrow 32, thereby rejecting the piece of dough weighing less than the predetermined minimum weight. The pieces of dough weighing in a range between the prescribed weight and the predetermined minimum weight are advanced by the reversible conveyor E in the direction shown by the arrow 31 toward a subsequent processing station of the plant.

Still another operation of the electronic control circuits is the controlling of the operation of the dough discharging apparatus F to vary the quantity of dough discharged thereby when a piece of dough weighing in the range between the prescribed weight and the predetermined minimum weight is discharged by the conveyor D onto the reversible conveyor E. The electronic control circuits classify each of such pieces of dough into a weight group corresponding to the amount the individual piece of dough weighs less than the prescribed weight, and then operate the dough discharging apparatus F to deposit onto that piece of dough a selected quantity of dough commensurate with the amount that the piece of dough weighs less than the prescribed weight.

The dough dividing machine A (FIGS. 1 and 2) is of conventional design and includes in general a dough supply hopper 40 which supplies dough to a pressure chamber formed within a housing 41 (FIG. 1), and the pressure chamber is equipped with a ram, not shown, for forcing dough into measuring pockets, not shown. A piston 42 (FIG. 1) is provided in each of the measuring pockets and is moved outwardly therefrom by the incoming mass of dough in the associated pocket. As the pistons 42 move outwardly, they engage the free ends of arms 43 of a rocker assembly 44, causing the rocker assembly 44 to rotate in the direction indicated by arrow 45 (FIG. 1). The rocker assembly 44 rotates in the aforementioned direction until fingers 46 thereof engage the upper horizontal surface of an adjustably positioned abutment block 47. The location of the abutment block 47 regulates the size and weight of pieces of dough in the measuring pockets, since the abutment block 47 limits the rotation of the rocker assembly 44 in the direction shown by the arrow 45, and thereby limits the outward, measuring movement of the pistons 42.

The dough in the measuring pockets is sheared off from that in the chamber to leave in the pockets measured quantities of dough. Simultaneously, the pockets and the rocker assembly 44 are lowered as a unit to a discharge station where the pistons 42 are moved inwardly to eject the pieces of dough from the pockets onto an endless belt conveyor 48 (FIG. 1).

The position of the abutment block 47 is adjusted by a screw 49 (FIGS. 1 and 3) that is received in threaded engagement in a tapped opening formed in the abutment block 47. Secured to the screw 49 is a hand wheel 50 that imparts a rotatable movement to the screw 49 for raising or lowering the abutment block 47. Thus, the rotation of the screw 49, by means of the manually operated wheel 50, adjusts the height of the abutment 47 which limits the outward measuring movement of the pistons 42, thereby regulating the weight of the pieces of dough discharged from the dough dividing machine A.

While permitting the manual adjustment of the dough dividing machine A, the apparatus of the present invention provides automatic adjustment of the dough dividing machine A for regulating the weight of measured pieces of dough formed by machine A to compensate for a weight variation between a desired weight and the average weight of pieces of dough advancing successively across the weight checking apparatus C. Toward this end, a suitable reversible motor, such as a synchronous motor 51 (FIG. 1), is mounted on the dough dividing machine A adjacent the hand wheel 50. The reversible motor 51 includes a shaft 52 (FIG. 3) that has a sprocket 53 secured thereto. A chain 54 is trained around the sprocket 53 and drives a sprocket 55 that is fixed to a short shaft 56. Secured to a lower portion of shaft 56 for rotation therewith is a spur gear 57 that meshes with a gear 58. The gear 58 is secured to the upper end of a tubular shaft 59 whose lower end is operatively associated with one element of a magnetic clutch 60 (FIG. 1). A shaft 61 (FIG. 3), which has a sprocket 62 keyed to its upper end, projects down through the tubular shaft 59 and is operatively connected at its lower end to a second element of the magnetic clutch. A chain 63 is trained around the sprocket 62 and around a sprocket 65 which is keyed to the aforementioned screw 49. The magnetic clutch 60 is operable to permit the hand wheel 50 to be manually actuated to rotate the screw 49 or to permit the reversible motor 51 to rotate the screw 49. When the magnetic clutch 60 is engaged, the tubular shaft 59 is connected in driving relation with the drive shaft 61 whereby the screw 49 may be rotated by means of the reversible motor 51 and, when the magnetic clutch 60 is disengaged, the tubular shaft 59 and shaft 61 are not connected and the manual operation of the hand wheel 50 will effect adjustment of the position of abutment block 47. Hence, the operation of the reversible motor 51, which is controlled by the electronic control circuits H, causes an adjustment of the dough dividing machine A for automatically regulating the weight of the pieces of dough discharged therefrom.

The pieces of dough ejected from the dough dividing machine A are advanced in succession by the conveyor 48 and are discharged onto the conveyor B (FIG. 1). The conveyor B includes a frame 66 bolted at one end to a gear housing 65 (FIG. 2) that is mounted on the frame of the dough dividing machine A. The frame 66 is generally H-shaped and includes side members 67 and 68 connected by a transverse member 69. At one end of the frame, the side members 67 and 68 journal a drive shaft 70 (FIG. 1) which is driven from gear box 65 and which is connected in driving relation with a drum-like roller 71. At the other end of the frame, the side members 67 and 68 journal an idler shaft 72 which supports idler roller 73. The roller 73 is disposed at a higher elevation than the drive roller 71. Trained around the rollers 73 and 71 is an endless belt 76 that advances the pieces of dough in the direction indicated by the arrow 30. As shown in FIG. 1, the conveyor B projects outwardly away from the dough dividing machine A and is directed upwardly therefrom. The conveyor B feeds the spaced pieces of dough in succession onto the weight checking apparatus C.

*Weight Checking Apparatus*

The weight checking apparatus C of the present invention comprises a continuously operated conveyor 100 (FIG. 4) that has an endless belt 101 with its receiving end disposed below the discharge end of the conveyor B for receiving therefrom successively advanced, spaced apart pieces of dough. The belt 101 extends across the upper surface of a weighing platform 110 and advances the spaced pieces of dough in succession over the platform 110 (FIG. 4) to impose the weight of pieces of dough individually upon the platform 110.

A weighing device 120 (FIG. 4) supports the platform 110 and is depressible when the weight of a piece of dough is imposed upon the platform 110. A torsion spring assembly 125 (FIGS. 4, 5 and 7) is provided for preloading the weighing device 120 to a predetermined degree whereby a piece of dough of a weight in excess of the preload value deflects the platform 110 and the weighing device 120 by an amount representative of the weight of the piece of dough.

Associated with the weighing device 120 is an electromechanical transducer 130 (FIGS. 4 and 8) that translates the successive movements of the weighing device 120 into voltage signals and transmits successive voltage signals representative of the weight of the pieces of dough advancing in succession across the platform 110. Adjacent the platform 110 is mounted a suitable source of light, such as a lamp 131 (FIGS. 4 and 6), which projects a beam of light over the platform 110 transversely to the path of travel of the pieces of dough. In the path of the projected light is a phototube 132 (FIG. 6) that is operative to send out a control signal each time the light beam is interrupted by a piece of dough advancing on the platform 110. The light beam is interrupted just before platform 110 reaches maximum deflection from the weight of an advancing piece of dough being imposed thereon.

The weight checking apparatus C includes a suitable support structure 140 (FIG. 4) that comprises a base 141. Secured to the base 141 are upright, transversely disposed front and rear frame structures 142 and 143, respectively (FIGS. 1 and 4), which support in fixed relation a pair of spaced longitudinally extending top support members 144 and 145 (FIGS. 2 and 6).

Bolted to the base 141 is a drive motor 150 (FIG. 4) which is connected to the continuously operated conveyor 100. A pulley 151 is secured to the drive shaft of the motor 150 for rotation therewith and has trained therearound a drive belt 152. The drive belt 152 is also trained around a pulley 153 that is fixed to a shaft 155 of a drive roller 154. The shaft 155 of the roller 154 is mounted for rotation on the end frame structure 142 and has the endless belt 101 of conveyor 100 trained thereover. The belt 101 is also trained around a guide roller 156 which is supported for rotation by the top plates 144 and 145 above the drive roller 154 and at a sufficient height so that its peripheral surface is substantially aligned with the upper surface of the weighing platform 110. In horizontal alignment with the guide roller 156 is a second conveyor belt guide roller 157 that is supported for rotation by the top plates 144 and 145. It is to be observed that the weighing platform 110 and the weighing device 120 are disposed intermediate the guide rollers 156 and 157. Below the weighing device 120 is disposed a third guide roller 158, which is mounted for rotation on a shaft 159 carried in two upright standards 160 and 161 (FIG. 1). From the foregoing, it is to be noted that the upper surface of the conveyor belt 101, which is a thin, highly flexible member adapted to support the pieces of dough for advancement across the weighing platform, does not contact any of the aforementioned rollers or any component of the conveyor belt drive. Thus, the surface of the conveyor belt 101, which supports the pieces of dough, is kept free from any foreign matter that may accumulate on the conveyor drive.

A back-up roller 170 (FIG. 1) is arranged to apply a sufficient force on the conveyor belt 101 to maintain the conveyor belt 101 in driving engagement with the drive roller 154. The back-up roller 170 is journalled for rotation by ears 171 and 172 that are supported by the free ends of arms 173 and 174, respectively. The arms 173 and 174 are mounted at their proximal ends on the frame 142 and are locked in an adjusted angular position relative to the frame 142.

In order to prevent the pieces of dough supported by the conveyor belt 101 from adhering thereto, the back-up roller 170 spreads a thin film of oil on the dough supporting surface of the conveyor belt 101. Oil is supplied to the peripheral surface of the roller 170 through a conduit 177 (FIG. 4) that communicates with an oil reservoir 178, supported by the top plate 144. A solenoid actuated valve 179, which is mounted on the top support member 144 by a bracket 176, controls the flow of oil through the conduit 177. Electrical wiring, not shown, is contained in a conduit 180 and interconnects the solenoid actuated valve 179 with the conveyor drive motor 150, whereby oil flows through the conduit 177 when the motor 150 is energized.

For freeing the conveyor belt 101 from any fragments of dough that may adhere to the supporting surface thereof, a nylon rotary brush 182 (FIGS. 4 and 6) is journalled for rotation by the standards 160 and 161. Secured to the shaft of the brush 182 is a pulley 183 (FIGS. 4 and 6) that has trained therearound a drive belt 184. The drive belt 184 is trained around a pulley 185 that is fixed to the shaft of the drive motor 150 for rotation therewith. A suitable idler pulley 186 engages the drive belt 184 and is adjustably mounted on a standard 187 for controlling the tension on the drive belt 184.

To control the tension on the conveyor drive belt 101, the standards 160 and 161 (FIGS. 4 and 6) are adjustable to vary the height of the guide roller 158. For this purpose, the standards 160 and 161 include stationary lower members 190 and 191, respectively, that are fixed to the base 141. The stationary members 190 and 191 have suitable vertical slots 192 (shown only for member 190 in FIG. 4) that receive bolts 194 and 195 (FIG. 6). The bolts 194 and 195 are secured to the movable upper members 196 and 197 (FIG. 6), respectively, so that the movable upper members 196 and 197 may be adjusted in a vertical direction relative to the stationary support members 190 and 191, respectively. For adjusting the height of the movable upper members 196 and 197, adjusting screws 198 and 199 are provided. As seen in FIG. 4, the screw 198 is supported for rotation in a block 200, fixed to the stationary support member 190, and is received in threaded engagement by a follower block 204 that is rigid with the movable support member 196. Similarly, the screw 199 is supported in a fixed block 201 (FIG. 6) and is threaded in a follower block (not shown) that is rigid with the movable member 197. By rotating knobs 202 and 203, the height of the movable members 196 and 197 may be adjusted relative to the stationary members 190 and 191, respectively. Since the shaft 159, in which guide roller 158 is supported, is carried by the movable members 196 and 197, the position of the guide roller 158 and the tension on belt 101 may be adjusted by shifting the movable members 196 and 197.

Between the rollers 156 and 157 (FIG. 4), the conveyor belt 101 provides a horizontal run upon which spaced pieces of dough are continuously advanced in the direction indicated by the arrow 30 for individual weighing by the weighing device 120. The device 120 includes the horizontal weighing platform 110, which is disposed below and contiguous with the horizontal run of the belt 101 between the top plates 144 and 145. Since the conveyor 100 is continuously driven, the platform 110 is constructed of sufficient length so that each piece of dough is supported thereon for a period of time enabling the platform 110 and the weighing device 120 to react fully to the weight of that particular piece of dough. The spacing between successive pieces of dough is arranged so that the platform 110 and the weighing device 120 are depressed by the weight of individual pieces of dough, and the time interval between successive pieces of dough is adequate to permit the platform 110 and the associated mechanism to return to their undepressed or elevated position after each piece of dough is weighed.

A fixed platform 210 (FIGS. 4 and 5) is mounted on the top support members 144 and 145 below the horizontal run of the conveyor belt 101 and in juxtaposition with the weighing platform 110 to assist in supporting the pieces of dough that are approaching the weighing platform 110.

The stationary platform 210 has mounted thereon a support structure 211 (FIG. 4) for the weighing device 120. The structure 211, which will be described presently, is adjustable relative to the stationary platform 210 for varying the height of the weighing platform 110 and the weighing device 120. As shown in FIG. 4 and 5, the support structure 211 includes three differential adjusting devices 212–214 having screws 215–217, respectively, that are fixed to the stationary platform 210 by threaded engagement therewith. Suitable lock nuts 218 (only two shown in FIG. 5) retain individually the screws 215–217, inclusive, fixed to the stationary platform 210. Each of the screws 215, 216 and 217 is received in threaded engagement by internally threaded portions of a cylindrical adjusting member 219 (only two shown in FIG. 5), and an externally threaded portion of each adjusting member 219 is received in an internally threaded portion of an outer cylindrical body member 222 (only two shown in FIG. 5). Integrally formed with each adjusting member 219 is a knob 226, and integrally formed with each outer body member 222 is a flange 227 that is secured to the structure 211. The inner threads of the adjusting member 219 have a pitch different from that of the outer threads. Accordingly, by turning each knob 226, relative movement is obtained between the associated adjusting member 219, the outer cylindrical body member 222 and the associated screw, with the result that the support structure 211 is raised or lowered relative to the stationary platform 210.

The support structure 211 includes a top plate 230 (FIGS. 4 and 5) that has suitable apertures for receiving the adjusting devices 212–214. The top plate 230, which is disposed below the stationary platform 210, rests upon the flanges 227. Thus, the distance between the top plate 230 and the stationary platform 210 is varied by the differential adjusting devices 212–214. Depending from the top plate 230 in fixed relation therewith are transversely spaced side plates 231 and 232 which project longitudinally of the machine. Rigid with the side plates 231 and 232 is an end plate 233 (FIG. 4) that depends from the top plate in fixed relation therewith and is disposed transversely of the weighing platform 110 below the forward edge of the platform.

For supporting the weighing platform 110, the weighing device 120 has two upper flexible flat leaf springs 235 and 236 (FIGS. 4 and 8) and two lower springs 237 and 238. All four springs, which are anchored at one end thereof to the end plate 233, are generally horizontally disposed and extend longitudinally in the general direction of travel of the pieces of dough advancing across the weighing platform 210. Secured to the free ends of upper leaf springs 235 and 236 are hollow posts 240 and 241, respectively, which are rigid with the underside of weighing platform 110. Carried by the free ends of lower leaf springs 237 and 238 are two V-shaped frames 242 and 243, (FIGS. 4 and 8) which have their apices centrally disposed below the platform 110. The frame 242 includes two hollow struts 244 and 245 secured to the underside of the weighing platform 110, which struts converge on and are welded to a horizontal, hollow cross beam 246. Similarly, the frame 243 comprises two hollow struts 247 and 248 (FIG. 8) secured to the underside of the weighing platform 110, which struts converge and terminate on the cross beam 246. On the underside of the cross beam 246 are secured the free ends of the lower leaf springs 237 and 238.

From the foregoing, it is to be observed that the weighing platform 110 is supported by the leaf springs 235–238 for movement in a vertical direction. The horizontal force produced by a piece of dough advancing on the weighing platform 110 does not influence the depression of the weighing platform 110 and the depression of the weighing platform is not a function of the position of a piece of dough advancing thereacross.

The weighing device 120 is preloaded by the torsion spring assembly 125 (FIGS. 4, 5 and 7), so that the weighing platform 110 is depressed when a piece of dough advancing thereacross is of a weight equal to or in excess of the predetermined preload value. The torsion spring assembly 125 is supported in part by the side plates 231 and 232 (FIG. 5) of the scale support structure 211, said plates having suitable openings for mounting bearings 250 and 251 (FIG. 7), respectively. Journalled for rotation by the bearings 250 and 251 are end caps 252 and 253, respectively, of a tubular housing 255. At opposite ends of the tubular housing 255 are end plugs 256 and 257 (FIG. 7), which are fixed to the tubular housing 255 by set screws (not shown). Mounted within the tubular housing 255 by means of the end plugs 256 and 257 is a torsion bar 258. The end portions of the torsion bar 258 are square in cross sectional area and are received by central openings of the plugs 256 and 257 having corresponding configurations. Midway between its ends, the torsion bar 258 has a drive portion of square cross-section which receives a hub 259 (FIG. 4) in driving engagement. An arm 259a, projecting from hub 259, is fixed within a beam-loading rod 260 which projects from the hub 259 and extends through a suitable opening in the end plate 233. The free end of the loading rod 260 is bifurcated, having two arms 260a and 260b that project above the cross beam 246 (FIG. 8). Supported by the bifurcated end portion of the loading rod 260 is a suitable linkage, such as piano wires 261 and 262 (FIG. 8), that connects the rod 260 to a mounting plate 254, which is rigid with the cross beam 246.

For applying a turning force to the end portions of the torsion bar 258, the tubular housing 255 is fixed by set-screws to the hub of a gear 263 (FIG. 5) that meshes with a gear 264. The gear 264 is fixed to a shaft 265 of a conventional gear type speed reduction unit 266. Coupled to the shaft 265 is a rod 267 that passes through an opening in the top plate 144 and has secured thereto an adjusting knob 268. The speed reduction unit 266 is mounted on the end plate 233 by a suitable bracket, not shown.

Thus, the rotation of the adjusting knob 268 imparts a turning movement to the tubular housing 255 through the gear reduction unit 266 and the gears 263 and 264. The tubular housing, in turn, applies a turning force to the end portions of the torsion bar 258 by means of the end plugs 256 and 257. The direction of rotation of the tubular housing 255 is such that the torsion bar 258 transmits a force to the rod 260 through the central hub 259 to cause the wires 261 and 262 to urge the cross beam 246 upwardly.

Secured to the end plate 233 is an upright, longitudinally extending mounting plate 270 (FIG. 4) that has its free end projecting over the cross beam 246. Threaded in the underside of the plate 270 is a stop member 271 (FIG. 8) that projects downwardly from the plate 270 to engage the upper surface of the mounting plate 254 of cross beam 246. A suitable lock nut 272 retains the stop member 271 in fixed relation with the plate 270.

To accurately adjust the preloading of the weighing device 120 under no-load conditions, the cross beam 246 is first moved into abutting relation with the stop member 271. Thereupon, the knob 268 is rotated to impart a turning moment to the tubular housing 255, in a manner previously described, and the housing 255 in turn imparts a rotating force to the ends of the torsion bar 258. The center of the torsion bar 258 is connected to the cross beam 246 by means of the rod 260 and the wires 261 and 262 to urge the cross beam 246 upwardly. However, the cross beam 246 is limited in its upward movement, since the plate 254 rigid therewith is abutting against the stop member 271. This action enables the rotation of the adjusting knob 268 to set a desired preload on the torsion bar 258.

For damping oscillations and vibrations of the weighing device 120, a damping device 275 (FIGS. 4 and 8) is secured by suitable support arms 276 to a vertical mounting plate 277 (FIGS. 4 and 6) which is rigid with the free end of the stationary support plate 270. The damping device 275 comprises a vessel 278 containing a suitable viscous fluid. A cap 279 is secured in threaded engagement to the vessel 278 (FIG. 8) and has a centrally disposed aperture through which a rod 280 is freely movable. The lower end of the rod 280 has secured thereto a suitable paddle, not shown, while the upper end of the rod 280 is carried by the cross beam 246. Thus, the rod 280 moves in a vertical direction with the movement of the weighing device 120. Since the movement of the paddle on the rod 280 is resisted by the fluid within the vessel 278, any tendency for the weighing device 120 to vibrate is effectively minimized by the damping device 275.

The electromechanical transducer 130 (FIGS. 4 and 8), which translates the movement of the weighing device 120 and the weighing platform 110 into voltage signals, comprises a detector transformer 285 (FIGS. 6 and 8) and a suitable source of excitation voltage, such as oscillator 286 (FIG. 25). The detector transformer 285 includes a movable core 287 (FIG. 8), which is fixed to the underside of the weighing platform 110 by a suitable mounting pad 288. In addition, the detector transformer 285 comprises a primary winding 289 (FIG. 26) and two secondary windings 290 and 291. The primary winding 289 and the secondary windings 290 and 291 are mounted in fixed position within a suitable cylindrical housing 292. It is to be observed that the core 287 moves with the deflection of the weighing platform 110 and is disposed centrally of the transformer windings for movement relative thereto.

The transformer housing 292 is rigidly secured within a socket 293 (FIGS. 4 and 8) that is supported in threaded engagement by the upper portion of a rod 294. A lock nut 295 retains the socket 293 in fixed relation relative to the rod 294. The lower portion of the rod 294 is received in threaded engagement by an inner threaded wall of a cylindrical adjusting member 296. An externally threaded portion of the cylindrical adjusting member 296 is received in threaded engagement by suitable bores 270a and 270b formed in the support plate 270 (FIG. 8). A knob 297 is fixed to the adjusting member 296 and is disposed substantially within a slotted area 298 of the support plate 270. Further support is provided for the housing 292 by a retaining spring 299 (FIG. 4) that is secured at its free end to the socket 293. At its opposite end the spring 299 is anchored to the support plate 270. By turning the knob 297, relative movement is imparted between the adjusting member 296 and the rod 294 due to a difference in pitch of the internal and external threads of member 296, thereby raising and lowering the housing 292. This action effects a relative movement between the transformer windings carried by the housing 292 and the core 287 which is fixed to the scale platform, for adjusting the output of the detector transformer 285.

As hereinbefore indicated, the detector transformer 285 with the oscillator 286 is an electromechanical transducer that translates the linear deflection of the platform 110 into voltage signals. For this purpose, the primary winding 289 is energized by the oscillator 286, which is a source of excitation voltage. When the primary winding 289 is energized by the oscillator 286, voltages are induced in the secondary windings 290 and 291, respectively. The secondary windings 290 and 291 are connected in series opposition. Consequently, the two voltages induced in the secondary windings 290 and 291 are opposite in phase and the net voltage across the output of the secondary windings 290 and 291 is the difference of the two voltages. For the electrical center position of the core 287, the net output voltage is zero. This is called the balance point or null position. As the core 287 is displaced from the null position, the voltage induced in the secondary winding toward which the core 287 is moved increases, while the voltage induced in the other secondary winding decreases. This produces a differential voltage across the output of the secondary windings 290 and 291, which varies linearly with the change in core position. Movement of the core 287 in an opposite direction beyond the null position produces a similar linear voltage characteristic, but with the phase of the output voltage shifted 180°.

When the weighing platform 110 is in the undepressed position, which is the no load condition, the core 287 is disposed relative to the windings 289, 290 and 291 so that a desired output voltage is produced across the secondary windings 290 and 291. This is accomplished by rotating the knob 297. When the platform 110 receives a piece of dough of a weight equal to or less than the preload value, the resultant movement of the platform 110, if any, is insufficient to displace the core 287 in a manner to materially alter the output voltage of the detector transformer 285. However, the platform 110, when receiving thereon a piece of dough of a weight in excess of the preload value, moves the core 287 sufficiently to effect a material voltage change in the output of the transformer 285. It is to be observed, however, that the detector transformer 285 detects the magnitude of linear descent of the platform 110 and produces a signal indicative of such magnitude. This, of course, is a function of the amount by which the weight of a piece of dough advancing on the platform 110 exceeds the predetermined preload value.

In FIGS. 1, 4 and 6 is shown a tunnel-shaped shield 284, which is secured to the top support members 144 and 145 and is disposed over the weighing platform 110. Mounted in the shield 284 adjacent one side of the platform 110 is the phototube 132 (FIG. 6) and mounted in the shield 284 adjacent the other side of the platform 110 is the lamp 131. The shield 284 prevents light other than the light projected by the lamp 131 from affecting the operation of the phototube 132. The lamp 131 and the phototube 132 are centrally located with respect to the ends of the weighing platform 110. The phototube 132 is operative to effect a control signal each time the light beam, which is projected by the lamp 131, is interrupted by a piece of dough advancing on the platform 110.

In the operation of the weight checking apparatus C, spaced pieces of dough are successively advanced by the conveyor 100 in a continuous procession over the weighing platform 110 and the weighing device 120 which weighs individually each piece of dough advancing thereacross. The platform 110 descends when the weight of a piece of dough thereon is in excess of the predetermined preload value. This movement of the scale platform 110 causes displacement of the core 287 relative to the windings 289, 290 and 291 to effect the production of a net voltage across the secondary windings 290 and 291 that is representative of the magnitude of depression of the weighing platform 110. While a piece of dough is advancing across the platform 110 and just before maximum deflection is attained by the platform 110, the light beam projected by the lamp 131 toward the phototube 132 is interrupted, thereby causing the phototube 132 to effect a control signal. From the weighing platform 110, the weighed pieces of dough are successively discharged onto the conveyor D.

*Reversible Conveyor and Dough Discharging Apparatus*

Weighed pieces of dough are advanced successively from the weight checking apparatus C onto the continuously operated conveyor D (FIG. 2). The conveyor D includes an endless belt 300 having its receiving end disposed adjacent to and below the discharge end of belt 101 of the conveyor 100. A motor 301 (FIG. 9) and pulley arrangement 302 continuously drive the conveyor belt 300 in the direction shown by the arrow 30 and the weighed pieces of dough on the conveyor belt 300 are advanced in succession and in spaced relation.

The reversible conveyor E (FIGS. 1, 9 and 10) of the present invention is disposed below the discharge end of the conveyor D and is arranged to receive pieces of dough from the conveyor D. An endless conveyor belt 305 is included in the reversible conveyor E and this belt is driven at a sufficient speed relative to the spacing between successive pieces of dough so that only one piece of dough at a time is supported by the reversible conveyor E. Individual pieces of dough that are discharged onto the reversible conveyor E are advanced by conveyor E in a direction transversely of the conveyor D, either in the direction indicated by the arrow 31 (FIG. 10) or in the direction indicated by the arrow 32. Pieces of dough advanced in the direction indicated by the arrow 31 are of a weight equal to or in excess of the predetermined minimum weight and are discharged onto a conveyor 306 (FIG. 2) for further processing. Pieces of dough advanced in the direction shown by the arrow 32 weigh less than the predetermined minimum weight and are discharged onto a reject conveyor 307 (FIG. 2).

The continuously operated transfer conveyor D includes a suitable frame support structure 351 (FIG. 9) having two similar side frame supports 352 (only one shown in FIG. 9) that extend in the direction of travel of the advancing pieces of dough. Rigid with one of the side frame supports 352 is a longitudinally extending top frame support 354 (FIGS. 2 and 9) and rigid with the other side frame support 352 is a longitudinally extending top plate support 355 (FIG. 2) that is spaced transversely from the top frame support 354. A drive roller 356 (FIG. 9) is supported for rotation by the supports 354 and 355 adjacent to and below the discharge end of the weight checking apparatus C. The supports 354 and 355 project above a portion of the reversible conveyor E and at their free ends journal a guide roller 357 (FIGS. 9 and 10) for rotation. Trained around the rollers 356 and 357 is the endless conveyor belt 300. The continuously operated drive motor 301 (FIG. 9) is mounted on a support plate 358 that extends between the side frame supports 352. Fixed to the drive shaft of the motor 301 is a pulley 359 of the pulley drive arrangement 302. A drive belt 360 is trained around the pulley 359 and is trained around a pulley 361 that is secured to the shaft of the drive roller 356, thus imparting a continuous movement to the drive roller 356 for rotating continuously the conveyor belt 300.

As shown in FIG. 9, the frame support structure 351 of the conveyor D is rigid with and supported by a frame support structure 370. The support structure 370 includes a base 371 that has three upright support posts 372 (FIG. 9) along one side. Three identical upright posts 373 (one only shown in FIG. 10) are mounted on and project upwardly from the opposite side of the base 371. A transversely extending platform 374 (FIGS. 9 and 10) is mounted at the forward end of the support structure below the end of conveyor D for supporting the drive mechanisms of the reversible conveyor E. A platform 375 (FIG. 9) is fixed to the rearward side of the support structure at a higher elevation than the platform 374 and extends in the same general direction as the platform 374. Below the platform 375, the side support posts 372 and 373 support a horizontal platform 376 (FIG. 9) that mounts certain measuring mechanisms of the dough discharging apparatus F.

As previously described, individual pieces of dough are continuously advanced by the reversible conveyor E either in the direction shown by the arrow 31 (FIG. 10) or in the direction shown by the arrow 32. For this purpose, the reversible conveyor E includes a motor driven gear transmission 380 (FIGS. 10 and 11) that is bolted to the underside of the platform 374. The motor driven gear transmission 380 includes an output shaft 381 (FIGS. 11, 12 and 13) that rotates continuously in the direction shown by an arrow 379. Fixed to the output shaft 381 for rotation therewith are sprockets 382 and 383. The sprocket 383 (FIG. 11) has trained therearound an endless chain 384, which is also trained around a sprocket 385. The sprocket 385 is mounted on a main drive shaft 386 that is journalled for rotation by suitable bearings 387 and 388. The bearing 387 is rigid with the motor driven gear transmission 380 and is supported by the underside of the platform 374. Likewise, the bearing 388 is supported by the underside of the platform 374. Mounted on the shaft 386 adjacent the sprocket 385 is an electrically operated clutch 390, which is anchored to the platform 374 by suitable means, not shown. When the clutch 390 is engaged, the sprocket 385 drives the shaft 386 in the direction indicated by an arrow 391 (FIG. 13).

Trained around the sprocket 382 is an endless chain 392 (FIGS. 11 and 12), which is also trained around a sprocket 393 and an idler sprocket 394. The sprocket 393 is mounted on the shaft 386, while the idler sprocket 394 is rotatably journalled on a stub shaft 395. The stub shaft 395 is supported by a bracket 396 that is bolted to the underside of the platform 374. Mounted on the main shaft 386 adjacent the sprocket 393 is an electrically operated clutch 397, which is anchored to the platform 374 by suitable means, not shown. When the clutch 397 is engaged, the sprocket 393 drives the shaft 386 in a direction indicated by an arrow 398 (FIG. 12), which is opposite t othe direction of rotation indicated by the arrow 391 (FIG. 13). The clutch 397 is engaged when the clutch 390 is disengaged and, conversely, when the clutch 390 is engaged, the clutch 397 is disengaged.

Fixed to the main shaft 386 for rotation therewith is a drive sprocket 400 (FIGS. 10 and 11) that has trained therearound a drive chain 401. The drive chain 401 extends transversely of the conveyor D and is trained around sprockets 402, 403 and 404 (FIG. 10). The sprocket 404 is an idler sprocket and is mounted for rotation on a stub shaft 405 that is secured to a bracket 406, the bracket 406 being mounted on the upper side of the platform 374. Suitable openings are formed in the platform 374 for receiving the lower run of the drive chain 401. The sprocket 403 is fixed to a shaft 409 of a longitudinally extending drive roller 410, while the sprocket 402 is fixed to a shaft 411 of a longitudinally extending drive roller 412. The shaft 409 (FIG. 9) of the drive roller 410 is journalled for rotation in a bearing 408 carried by an angle bracket 413 (FIGS. 2 and 9), that is fixed to an adjacent upright post 372, and in a bearing 408a carried by an elongated side plate 414 (FIGS. 9 and 10) that is mounted on the platform 374 by means of brackets 415 and 416. The shaft 411 of the drive roller 412 is journalled for rotation by an angle bracket 417 (FIG. 2), that is supported by the side frame 373, and by the elongated side plate 414. Trained around the rollers 410 and 412 is the endless conveyor belt 305 that extends in a direction transversely of the conveyor D.

The operation of the electrically operated clutches 390 and 397 is controlled by the electronic control circuits H in the control unit G in a manner to be described in detail hereinafter. When a piece of dough moving toward the reversible conveyor E is of the prescribed weight or weighs between the prescribed weight and the pretermined minimum weight, the clutch 390 is engaged and the clutch 397 is disengaged. Consequently, the main drive shaft 386 is rotated in the direction shown by the arrow 391 (FIG. 13) and the drive chain 401 is advancing in the direction shown by the arrow 31 (FIG. 10). Therefore, a piece of dough on the conveyor belt 305 weighing at least the predetermined minimum weight is advanced continuously toward the conveyor 306 and discharged onto this conveyor for movement to a processing station.

In case a piece of dough is discharged onto the reversible conveyor E that weighs less than the predetermined minimum weight, the electronic control circuits H cause the clutch 397 to engage and cause the clutch 390 to disengage. As a result thereof, the main drive shaft 386 rotates in the direction shown by the arrow 398 (FIG. 12) and the drive chain 401 moves in the direction shown by the arrow 32 (FIG. 10). This action causes the conveyor belt 305 to reverse its direction of travel and to advance the piece of dough thereon, which weighs less than the predetermined weight, toward the reject conveyor 307.

When a piece of dough of a weight between the prescribed weight and the predetermined minimum weight is moved toward the reversible conveyor E, the dough discharging apparatus F is operated to deposit onto such a piece of dough a quantity of dough commensurate with the amount the piece of dough weighs less than the prescribed weight. For this purpose, the dough discharging apparatus F (FIG. 9) comprises a dough supply hopper 415 that is removably secured to the upper side of the platform 375 by a plurality of clamp blocks 416 that are bolted to the platform. The upper end of the hopper 415 is sealed by a cover 421 that is mounted for pivotal movement by brackets 419 (FIGS. 2 and 9). Formed within the hopper 415 are two chambers 422 and 423 (FIG. 16) that are open at their lower end to provide discharge openings 424 and 425 (FIGS. 15 and 16), respectively, of the hopper 415. The platform 375 has formed therein two cylindrical openings 426 and 427 (FIG. 16) that are disposed below the discharge openings 424 and 425, respectively.

Seated within the cylindrical openings 426 and 427 of the platform 375 are horizontally disposed, generally cylindrical, rotatable plates or discs 428 and 429 (FIGS. 15 and 16), respectively, of dough measuring mechanisms 430 and 431, respectively. The rotatable plate 428 has formed therein six cylindrical measuring pockets 435, which are spaced at equal angular distances around the plate 428 and are disposed at equal radial distances relative to the axis of rotation of the plate 428. As the plate 428 rotates, each pocket 435 moves from an inlet station K (FIG. 15) past stations, L, M, N and O to a discharge station P. The axis of each of the measuring pockets 435 is parallel to the axis of rotation of the rotatable plate 428 and to the axis of rotation of the rotatable plate 429. Likewise, the rotatable plate 429 has formed therein six cylindrical measuring pockets 440, which are spaced at equal angular distances and are disposed at equal radial distances relative to the axis of rotation of the plate 429. Each pocket 440 moves from an inlet station Q past stations R, S, T and V to a discharge station W. Similarly, the axis of each of the measuring pockets 440 is parallel to the axis of rotation of the rotatable plate 429, as well as to the axis of rotation of the rotatable plate 428.

The rotatable plate 428 includes a circular depending flange 446 (FIG. 16) that is seated on a circular shoulder 447 of a drive plate 448. At one point, a notch 446a is provided in flange 446 to receive a key 445 that is secured to the drive plate 448. With this arrangement, rotation of plate 448 causes rotation of the plate 428. A central hub 449 is integrally formed with the drive plate 448 and is keyed to a drive shaft 450 for rotation therewith. The drive shaft 450 is journalled for rotation by a sleeve 451 (FIG. 16) that is received by a suitable opening in the platform 376 and has a flange 451a fixed to the upper side of the platform 376. Seated on the upper end of sleeve 451 is a thrust bearing 452 on which an annular flange 450a of shaft 450 rests. A coil spring 454 surrounds the shaft 450 and is interposed between the flange 450a and the underside of the drive plate 448.

The drive plate 448 is provided with a radial flange 455 in which suitable openings (not shown) are formed for receiving therethrough measuring pistons 460 (FIGS. 15 and 17). There is a measuring piston 460 for each of the cylindrical measuring pockets 435. Each measuring piston 460 includes a piston head 460a that projects into its associted cylindrical pocket 435 and a rod 460b that projects below the drive plate 448. Surrounding each piston rod 460b and interposed between the associated cylindrical pocket 435 and the radial flange 455 of the drive plate 448 in a compression spring 462.

Secured to the underside of the drive plate 448 are six rocker assemblies 465 (FIGS. 16, 17 and 20), one for each of the pistons 460. Each rocker assembly 465 includes an inverted U-shaped bracket 464 having a pair of arms 466 and 467 that journal a shaft 468 for rotation. Fixed to the inner end of the shaft 468 is an arm 469 that has a bifurcated free end portion which is secured to the threaded lower end portion of its associated piston rod 460b by means of a threaded block and lock nuts. At the outer end portion of the shaft 468 is fixed a follower arm 471 that mounts a follower roller 472 at its free end. The follower roller 472 engages a circular camming track 473 of a cam plate 474 (FIGS. 14, 16 and 20) that is bolted to the platform 376 (FIG. 17). The cam track 473 is so designed that, as the several rocker assemblies 465 are carried in a circular path by the drive plate 448, each shaft 468 is pivoted to raise and lower the piston 460 with which it is associated.

The drive shaft 450, which is operated intermittently in a manner to be described hereinafter, rotates 60° during each cycle of operation of the measuring mechanism 430 in the direction shown by an arrow 475 (FIG. 15). Hence, the rotatable plate 428 rotates 60° in the counterclockwise direction as viewed in FIG. 15 for each cycle of operation of the measuring mechanism 430, and six cycles of operation are required before a measuring pocket 435 leaving the discharge station P (FIG. 15) returns to the discharge station P.

When measuring pockets 435 are located at stations K, L, and M, they are in registry with the discharge opening 424 of the chamber 422. The camming track 473 is constructed so that the pistons 460, associated respectively with the measuring pockets 435 located at stations K, L, and M are at their lowermost positions (FIG. 17) under the action of their associated rocker assemblies 465. The pistons 460 are operable to permit predetermined quantities of dough in their associated pockets 435 from the mass of dough in the chamber 422, when their associated pockets are in registry with the discharge opening 424 of the hopper 415. Thus, each pocket 435 when leaving station M has substantially the same predetermined quantity of dough therein, which in the exemplary embodiment is ½ ounce of dough.

A quantity of dough is forced from the chamber 422 into each of the pockets 435 located at stations K, L and M by compressed air which is supplied to the upper portion of the dough supply hopper 415. Toward this end, an upright conduit 480 (FIGS. 2, 9 and 14), which is closed at both ends, is connected at its upper end (FIG. 9) to a conduit 477 communicating with a suitable source of air under pressure (not shown). Adjacent its upper end, the upright conduit 480 is connected to a collar 415a of the hopper by a setscrew 486 whose inner end is disposed in a groove (not shown) in the conduit 480. At a lower point of the conduit, a setscrew 487 also connects the conduit to a collar 415b of the hopper. Snaprings are disposed in grooves in conduit 480 below the collar 415a and above the collar 415b. Due to the setscrews and the snaprings, upward movement of the conduit causes upward movement of the hopper. At its lower end, the upright conduit is slidably disposed in a sleeve 479 (FIG. 14) that is mounted on the base 371. An air supply line 481 (FIGS. 2 and 24) interconnects the conduit 480 to the upper portion of the dough supply hopper 415. A device 482 regulates the pressure of the air flowing in the supply line 481 from the conduit 480.

In the supply line 481 between the pressure regulating device 482 and the supply hopper 415 is a solenoid actuated valve 483. The valve 483 is operated through a switch, not shown, that is mounted on the supply hopper 415 adjacent the cap 421. The switch controls the operation of the solenoid actuated valve 483 to open the valve 483 when the cover 421 is closed and to close the valve 483 when the cover 421 is opened.

While a measuring pocket 435 travels from station N to station O, the measured quantity of dough therein is compressed and the pockets of gas, if any, are decreased in size. For this purpose, the piston 460, which is associated with the pocket 435 advancing from station N to station O, is gradually raised to an intermediate position (shown in FIG. 18) by means of its associated rocker assembly 465 and the camming track 473. An arcuate horizontal abutment plate 490 (FIGS. 15 and 18) is disposed in contact with the upper surface of the plate 428 above the pockets 435 located at stations N and O. Fixed to the abutment plate 490 is a post 491 that projects vertically upwardly therefrom. The post 491 is received by ears 492a and 492b of an upright bracket 492 that is fixed to an inner wall of the hopper 415. A suitable compression spring 495 is positioned around the post 491 and in engagement with oppositely facing surface of the ear 492a and a shoulder formed by an increased diameter portion of the post 491. A cotter pin 493 is received by a suitable opening in the post 491 above the ear 492a. The compression spring 495 urges the horizontal plate 490 into contact with the plate 428 against the action of dough urged upwardly by a rising piston 460.

While one of the pockets 435 is disposed under the plate 490 at stations N and O, the cam follower roller 472 is held in a channel 496 formed by an arcuate plate 497 (FIG. 18) and the cam track 473. A suitable gate 498 (FIG. 20) of the guide plate 497 serves to facilitate the cleaning of the dough measuring mechanism 430 and is pivotally mounted intermediate the ends of the guide plate 497. The gate 498 is opened and closed by a suitable actuating linkage 499 (FIG. 14).

When a measuring pocket 435 traveling from station O arrives at the discharge station P, the piston 460 associated therewith is rapidly raised to its uppermost position (FIG. 19) by its associated rocker assembly 465, and the action of its associated compression spring 469, whereby the measured quantity of dough contained therein is ejected therefrom at the discharge station P (FIG. 15). However, the quantity of dough removed from the measuring pocket 435 located at the discharge station P remains seated on the piston head 460a of its associated piston 460 for a short time duration and is projected therefrom onto a piece of dough, continuously advancing toward the reversible conveyor E, by a casting arm 502 in a manner to be described in detail hereinafter. It is to be observed that the wall of the hopper 415 adjacent the discharge station P (FIG. 15) has a concave configuration and, hence, a pocket 435 located at the discharge station P is not within the confines of the chamber 422, but is removed from under the hopper 415.

The dough measuring mechanism 431 is similar in operation and in construction to the dough measuring mechanism 430, except with regard to the quantity of dough measured in the pockets 440 and the direction of rotation of the pockets 440. The rotatable plate 429, a drive plate 500 (FIG. 16) and a drive shaft 501 of the dough measuring mechanism 431 rotate simultaneously in the direction shown by an arrow 505 (FIG. 15). The drive shaft 501 is journalled for rotation by a sleeve 501b (FIG. 16) that is received by a suitable opening in the platform 376 and is fixed to the upper side of the platform 376. Seated on the sleeve 501b is a thrust bearing 504 on which a flange 501a of shaft 501 rests. A coil spring 506 surrounds the shaft 501 and is interposed between the flange 501a and the underside of the drive plate 500.

The drive shaft 501 operates intermittently in a manner to be described in detail hereinafter and rotates 60° during each cycle of operation of the measuring mechanism 431. Hence, the rotatable plate 429 rotates 60° in a clockwise direction for each cycle of operation of the measuring mechanism 431 and requires six cycles of operation before a measuring pocket 440 leaving the discharge station W (FIG. 15) returns to the discharge station W.

There is a measuring piston 510 for each of the cylindrical measuring pockets 440. Each measuring piston 510 includes a piston head 510a (FIG. 15) that projects into its associated pocket 440 and a rod 510b (FIG. 16) that projects below the drive plate 500. Surrounding each piston rod 510b is a compression spring 515, and fixed to the underside of the drive plate 500 are six rocker assemblies 520, one for each of the pistons 510. The rocker assemblies 520 are similar in construction to the rocker assemblies 465. Each rocker assembly 520 is secured to the lower end portion of its associated piston rod 510b and carries a cam follower roller 525. The cam follower rollers 525 engage a circular camming track 530 of a cam plate 531 (FIGS. 14 and 16).

When measuring pockets 440 are located at stations Q, R, and S, they are in registry with the discharge opening 425 of the chamber 423. The camming track 530 is constructed so that the pistons 510, associated respectively with the measuring pockets 440 located at stations Q, R and S, are at their lowermost positions under the action of their associated rocker assemblies 520. The pistons 510 are operable to effect an entry of a predetermined quantity of dough in their associated pockets 440 from the mass of dough in the chamber 423, when their associated pockets are in registry with the discharge opening 425 of the hopper 415. The piston heads 510a of the dough measuring mechanism 431, when at their lowermost position, are disposed lower than the lowermost position of the piston heads 460a of the dough measuring mechanism 430. Thus, the pistons 510 effect the entry of a larger quantity of dough in their associated pockets 440 than is effected by the pistons 460 in their associated pockets 435. Each measuring pocket 440, when leaving station S, has substantially the same predetermined quantity of dough therein, which in the exemplary embodiment is 1 ounce of dough. Dough is forced into the measuring pockets 440 located at stations Q, R and S by compressed air conducted to the supply hopper 415 through the air supply line 481 (FIG. 2).

While a measuring pocket 440 advances from station T to station V, the measured quantity of dough therein is compressed. This is accomplished by raising gradually the associate piston 510, by means of its associated rocker assembly 520 and the camming track 530 against the yieldable action of a horizontal plate 540. The horizontal plate 540 is constructed and mounted in a manner similar to that described with reference to the horizontal plate 490 and is spring loaded by a compression spring, not shown, so as to be continuously urged in contact with the upper surface of the rotatable plate 429. A channel guide plate 541 (FIG. 16), similar to the channel guide plate 497, retains the associated cam roller 525 in engagement with the cam track 530. A gate 542 is likewise provided in the guide plate 541 to facilitate the cleaning of the dough measuring mechanism 431 and is connected to a suitable actuating linkage 543.

When a measuring pocket 440 arrives at the discharge station W, the piston 510 associated therewith is rapidly raised to its uppermost position by its associated rocker assembly 520, the camming track 530 and the action of its associated compression spring 515, whereby the measured quantity of dough contained therein is ejected therefrom at the discharge station W. The piston 510 is at its uppermost position when the upper surface of its piston head 510a is at even height with the upper surface of the rotatable plate 429. The quantity of dough removed from the measuring pocket 440 located at the discharge station W remains seated on the piston head 510a of its associated piston 510 for a short time duration and is projected therefrom onto a piece of dough, which is advancing continuously toward the conveyor E, by the casting arm 503 in a manner to be described in detail hereinafter. It is to be observed that the wall of the hopper 415 adjacent the discharge station W (FIG. 15) has a concave configuration and, hence, a pocket 440 located at the discharge station W is not confined to the chamber 423, but is removed from the hopper 415.

Adjacent the discharge stations P and W of the dough measuring mechanisms 430 and 431, respectively, are disposed the previously mentioned casting arms or flippers 502 and 503 (FIG. 15), respectively. The casting arms 502 and 503 include at their free ends concave dough engaging surfaces 551 and 552, respectively. At their proximal ends, the casting arms comprise hubs 553 and 554, respectively, that rest on the upper surface of the platform 375 and are keyed to vertical shaft 555 and 556, respectively. Rotation of the shaft 555 pivots the casting arm 502 in a plane parallel to the upper surface of the horizontal rotatable plate 428 to cause the dough engaging surface 551 to traverse the opening of a pocket 435 (FIG. 19) located at the discharge station P. In a like manner, rotation of the shaft 556 pivots the casting arm 503 in a plane parallel to the upper surface of the horizontal rotatable plate 429 to cause the dough engaging surface to traverse the opening of a pocket 440 located at the discharge station W.

The shafts 555 and 556 (FIGS. 21 and 22) are received by suitable openings in the platform 375 and 376 and are supported for rotation by brackets 557 and 558 (FIG. 22) respectively that are secured to a fixed frame member 559. Fixed to the lower ends of each of the shafts 555 and 556 is a hub 562 that is integrally formed on a lever arm 564. The free end of each lever arm 564 is connected by a pivot pin 560 (FIG. 21) to a bifurcated head 566 of a fluid actuated plunger rod 569 which is mounted for reciprocating movement in one of two horizontally disposed air cylinders 571 and 572, respectively. Brackets 573 and 574 (FIG. 21), which are fixed to the support frame 372, support the cylinders 571 and 572, respectively, by means of pivot pins 575. A compression spring 580 is disposed around each plunger rod 569, in abutting relation between the adjacent air cylinder and a washer 577 carried by the head 566.

The cylinder 571 communicates with two conduits 590 and 591, which are connected to a solenoid actuated valve 592 (FIG. 16) having alternately operable windings, not shown. The solenoid actuated valve 592 is supported by the end frame 373. An air supply line 593 connects the valve 592 to the previously mentioned air supply conduit 480 (FIG. 21). In the air supply line 593 between the valve 592 and the conduit 480 is an air filter 594 (FIG. 9) and a lubricator 595, which are supported by a bracket 596 that is rigid with the platform 374.

When one winding of the solenoid actuated valve 592 is energized, air under pressure flows through the conduit 590 and the flow of air through the conduit 591 is cut off. At this time, the associated plunger 569 occupies a forward position and the casting arm 502 is at rest in the forward position shown in full line in FIG. 15. Upon energizing the other winding of the solenoid actuated valve 592, the flow of air through the conduit 590 (FIG. 21) is cut off and air under pressure is conducted through the conduit 591. This action causes the plunger 569 to be fully retracted against the urgency of the spring 580. As a consequence thereof, the lever arm 564 rotates the shaft 555 in a clockwise direction until the casting arm 502 occupies the rearward or cocked position illustrated in phantom lines in FIG. 15. When said one winding of the solenoid actuated valve 592 is subsequently energized, the plunger 569 moves forward under the action of the air flow through the conduit 590 into the cylinder 571, and under the action of the compression spring 580. The forward movement of the plunger 569 pivots the lever arm 564 for rotating the shaft 555 in a counterclockwise direction. As a result thereof, the casting arm 502 pivots rapidly about the axis of the shaft 555 and the dough engaging surface 551 of the arm moves in a circular path to traverse the opening of the pocket 435 located at the discharge station P for engaging the measured quantity of dough that has been raised out of a pocket 435 located at the discharge station P.

The measured quantity of dough that is projected by the arm 502 is cast in a predetermined direction so as to fall on a piece of dough in a prescribed zone. While this zone may be at various locations, in the disclosed embodiment of the machine, this zone is at the discharge end of the transfer conveyor D. As a result an increment of dough is added to a piece of dough when said piece of dough is disposed at the discharge end of conveyor D. Toward this end, the forward motion of the plunger 569 is abruptly halted at a prescribed point in its forward movement, thereby abruptly halting the dough casting movement of the arm 502. For this purpose, an adjustable abutment or stop assembly 600 (FIGS. 21 and 22) is positioned facing the plunger head 566 and comprises an abutment block 602 mounted on the fixed frame member 559. The block 602, which is adjustably positioned relative to the member 559 by means of bolts 604 extending through slots 601 in the member 559, is mounted in the path of forward movement of the plunger head 566. Bonded to the block 602 facing the plunger head 566 is a resilient pad 603. A nut and bolt arrangement 605 is received by a threaded block 606 that is fixed to the member 559 and engages the block 602 to back up the block and prevent shifting of the block under the repeated impacts of the plunger head.

Referring now to the air cylinder 572 that is associated with the dough measuring mechanism 431, the cylinder 572 communicates with two conduits 610 and 611 (FIGS. 21 and 24). The conduits 610 and 611 are connected to the solenoid actuated valve 612 (FIG. 22) which is supported by the frame support 372 and has alternately operable windings. The valve 612 is connected to the supply conduit 480 through a conduit 613 (FIG. 24) that communicates with the air supply line 593. When one winding of the solenoid actuated valve 612 is energized, air under pressure flows through the conduit 610 and the flow of air through the conduit 611 is cut off. At this time, the associated plunger 569 occupies a forward position and the casting arm 503 is at rest in the forward position shown in full line in FIG. 15. Upon energizing the other winding of the solenoid actuated valve 612, the flow of air through the conduit 610 is cut off and air under pressure is conducted through the conduit 611. This action causes the plunger 569 to be fully retracted against the urgency of the spring 580. Consequently, the lever arm 564 rotates the shaft 556 in a counterclockwise direction (as viewed in FIG. 15) until the casting arm 503 occupies the rearward or cocked position illustrated in phantom lines. Subsequently, said one winding of the solenoid actuated valve 593 is energized and the plunger 569 moves forward under the action of the air flow into the cylinder 572 and under the action of the spring 580. The forward movement of the plunger 569 pivots the lever arm 564 and rotates the shaft 556 in a clockwise direction as viewed in FIG. 15. As a result thereof, the casting arm 503 pivots rapidly about the axis of the shaft 556 and the dough engaging surface 552 moves in a circular path to traverse the opening of a pocket 440 located at the discharge station W for engaging the measured quantity of dough raised from the pocket 440 located at the discharge station W.

The measured quantity of dough that is projected by the arm 503 is cast in a predetermined direction so as to fall in the same zone as does the quantity of dough projected by the casting arm 502. For halting abruptly the forward movement of the casting arm 503 at a prescribed point in its dough casting movement, the plunger 569 of cylinder 572 is halted abruptly in its forward movement by an adjustable abutment or stop assembly 615 (FIGS. 21 and 22) which is identical in construction and mounting as the above-mentioned adjustable abutment block 602.

The dough engaging surfaces 551 and 552 of the casting arms 502 and 503, respectively, as well as the surfaces of the piston heads in the dough measuring pockets are sprayed with oil at the discharge stations P and W by nozzles or jets 625 and 626 (FIG. 15) to prevent fragments of dough from adhering thereto. The jets 625 and 626 are mounted on the platform 375 by fittings 627 and 628, respectively (FIG. 22), that are connected to conduits 629 and 630, respectively. Communicating with the conduits 629 and 630 are solenoid actuated valves 635 and 636 (FIGS. 22 and 24), respectively, that also communicate with an oil mist lubricator 637 through an oil mist supply line 638. An air supply line 639 connects the lubricator 637 to the previously mentioned air supply conduit 480. The solenoid actuated valve 635 is energized for a short time to permit a flow of oil mist through the conduit 629 for ejection from the spray nozzle 625, when the casting arm 502 is located in the cocked position shown in phantom in FIG. 15. Likewise, the solenoid actuated valve 636 is energized for a short time to permit a flow of oil mist through the conduit 630 for ejection from the spray nozzle 626, when the casting arm 503 is located in the cocked position shown in phantom in FIG. 15.

The drive means for the dough measuring mechanism 430 and 431 and the activating arrangements for the solenoid actuated valves 592, 612, 635 and 636 include a continuously operated, motor driven gear transmission 645 (FIG. 9) that is mounted on the base 371 of the support structure 370. The transmission 645 includes a drive shaft 646 (FIG. 14) that has fixed thereto a drive sprocket 647. Trained around the drive sprocket 647 is a drive chain 648 (FIG. 10), which is also trained around an idler sprocket 652 and driven sprockets 650 and 651. The idler sprocket engages the upper run of the drive chain 648 to control the tension thereof and is mounted on a stub shaft 653 (FIG. 14) that is adjustably mounted on a standard 654, the standard 654 being rigid with the base 371. The driven sprocket 650 is mounted on an input shaft 660 of a gear-type speed reduction unit 661 (FIGS. 10 and 14), while the driven sprocket 651 is mounted on an input shaft 662 of a speed reduction unit 663.

The speed reduction unit 661, which is mounted on the base 371, is constructed so that its vertically disposed output shaft 665 rotates sixty degrees in a counterclockwise direction (as viewed in FIG. 15) for each complete revolution of its input shaft 660, while the speed reduction unit 663, which is also mounted on the base 371, is constructed to rotate its output shaft 666 sixty degrees in a clockwise direction (as viewed in FIG. 15) for each complete revolution of its input shaft 662. Flexible couplings 670 and 671 connect the output shafts 665 and 666, respectively, of the speed reduction units 661 and 663, respectively, to intermediate shafts 672 and 673, respectively. The intermediate shaft 672 is connected to the drive shaft 450 (FIG. 16) of the dough measuring mechanism 430 by means of a flexible coupling 674, while the intermediate shaft 673 is connected to the drive shaft 501 of the dough measuring mechanism 431 by means of flexible coupling 675. Thus, the output shaft 665 of the speed reducing unit 661 rotates the drive shaft 450 to impart a rotary movement to the measuring plate 428 in a counterclockwise direction (as viewed in FIG. 15) and the output shaft 666 of the speed reducing unit 663 rotates the drive shaft 501 to impart a rotary movement to the plate 428 in a clockwise direction (as viewed in FIG. 15).

At one end of the input shaft 660 (FIG. 10) of the speed reduction unit 661 and adjacent the sprocket 650 is mounted an electrically operated clutch 680 which is arranged to connect the sprocket 650 to shaft 660. At the opposite end of the shaft 660 is mounted an electrically operated brake 681 (FIG. 14) which is arranged, when actuated, to prevent rotation of shaft 660. The operation of the clutch 680 and the brake 681 is controlled by the electronic control circuits in the control unit G in a manner to be described in detail hereinafter. When the brake 681 is released and the clutch 680 is engaged, the drive sprocket 650 rotates the input shaft 660. Fixed to the input shaft 660 adjacent the clutch 680 is a cam 685 (FIG. 10) that controls the actuation of a cycle control microswitch 686. The cycle control switch 686 is mounted on a suitable bracket 687, which is supported by the base 371.

The cam 685 is constructed so that the microswitch 686 is always closed when the input shaft 660 is at rest to prepare an operating circuit for the clutch 680 and the brake 681, and is further constructed to temporarily open the cycle control microswitch 686 immediately prior to the completion of one revolution of the input shaft 660. Thus, when the electronic control circuits energize the clutch 680 and deenergize the brake 681, the input shaft 660 is rotated 360°. Just prior to completion of one revolution, the microswitch 686 is opened, for a short time duration, causing the clutch 680 to be disengaged. The coasting of the shaft 660 prior to the application of the brake 681 is sufficient to reset the microswitch 686 to a closed position. Therefore, the cam 685, through the action of the cycle control microswitch 686, limits the rotation of the input shaft 660 of the gear reduction unit 661 to one complete revolution each time the clutch 680 is engaged under the control of the electronic control circuits. Hence the output shaft 665 of the gear reduction unit 661 rotates 60 degrees during each cycle of operation and the rotatable plate 428 of the dough measuring mechanism 430 rotates sixty degrees in the counterclockwise direction (FIG. 15) during each cycle of operation of the dough measuring mechanism 430 for advancing each pocket 435 thereof to the succeeding station.

In a like manner, the input shaft 662 of the gear reduction unit 663 has mounted thereon an electrically operated clutch 690 (FIGS. 9 and 10) and an electrically operated brake 691 (FIGS. 9 and 14). The operation of the clutch 690 and the brake 691 is controlled by the electronic control circuits H (FIG. 25) in a manner to be described in detail hereinafter. When the brake 691 is released and the clutch 690 is engaged, the drive sprocket 651 rotates the input shaft 662.

Fixed to the input shaft 662 of the gear speed reduction unit 663 is a cam 693 (FIGS. 9 and 10) that controls the actuation of a cycle control microswitch 694 (FIG. 10). A suitable bracket 695, which is supported by the base 371, mounts the microswitch 694 adjacent the cam 693. The cam 693 is constructed so that the microswitch 694 is always closed when the shaft 662 is at rest to prepare an operating circuit for the clutch 690 and the brake 691, and is further constructed to temporarily open the microswitch 694 immediately prior to the completion of one revolution of the shaft 662. The opening of the microswitch 694 for a short time duration causes the clutch 690 to be disengaged and the coasting of the input shaft 662 prior to the application of the brake 691 is sufficient to reset the microswitch 694 to a closed position. Hence, the cam 693 through the action of the cycle control switch 694 limits the rotation of the input shaft 662 of the gear reduction unit 663 to one complete revolution each time the clutch 690 is engaged under the control of the electronic circuits H. Accordingly, the output shaft 666 of the gear reduction unit 663 rotates 60 degrees during each cycle of operation and the rotatable plate 429 of the dough measuring mechanism 431 rotates sixty degrees in a clockwise direction (FIG. 15) during each cycle of operation of the dough measuring mechanism 330 for advancing each pocket 440 thereof to the succeeding station.

During each cycle of operation of the dough measuring mechanism 430, the rotatable plate 428 advances a pocket 435 from station O to the discharge station P. As a pocket 435 leaves the station O, the casting arm 502 is moved rapidly to the cocked position (shown in phantom in FIG. 15). As a pocket 435 arrives at the discharge station P, the measured quantity of dough therein is rapidly ejected therefrom. Thereupon, the casting arm 502 is rapidly moved to the forward position for traversing the opening of the pocket 435 now located at the discharge station P to contact and project the measured quantity of dough to the prescribed zone adjacent the end of the transfer conveyor D. The movement of the casting arm 502 is controlled by the aforementioned solenoid actuated valve 592 in a manner previously described.

For operating the solenoid actuated valve 592 in timed relation with the rotation of the measuring plate 428, a cam 700 (FIG. 14) is fixed to the input shaft 660 of the gear reduction unit 661 adjacent the brake 681. Actuated by the cam 700 is a two-position microswitch 701 that is connected to the solenoid actuated valve 592 by a cable 702. The microswitch 701 is supported by a bracket 703 that is rigid with the frame 370. The cam 700 is constructed so that the switch 701 is actuated to occupy a first position when the shaft 660 is at rest. When the switch 701 occupies said first position, one winding of the solenoid actuated valve 592 is energized to cause the casting arm 502 to be moved to its forward position (shown in full line in FIG. 15). At the beginning of a cycle of operation, the cam 700 rotates with the shaft 660 and is constructed to actuate the microswitch 701 to its second position. As a result, the other winding of the solenoid actuated valve 592 is energized and the casting arm 502 is moved to a cocked position. At the end of the cycle of rotation, the cam 700 resets the microswitch 701 to its first position, thereby energizing said one winding of the solenoid actuated valve 592. This results in the casting arm 502 traversing the opening of a pocket 435, now located at the discharge station P, after the measured quantity of dough has been raised therefrom.

While the casting arm 502 is in the cocked position (shown in phantom in FIG. 15), the dough engaging surface 551 thereof and the piston head 460a associated with the pocket 435 advancing toward the station K are sprayed with an oil mist from the nozzle 625. The flow of oil through the nozzle 625, as previously described, is controlled by the solenoid actuated valve 635. For operating the solenoid actuated valve 635 in timed relation with the movement of the casting arm 502, a cam 705 (FIG. 10) is fixed to the input shaft 660. Adjacent the cam 705 is mounted a microswitch 706 that is supported by the bracket 687 and that is actuated in response to the rotation of the cam 705. The cam 705 is arranged to close the microswitch 706 for a short duration after the microswitch 701 is actuated to its second position by the cam 700. By closing the microswitch 706, the solenoid actuated valve 635 is energized for a short time duration. When the solenoid actuated valve 635 is energized, an oil mist is ejected from the nozzle 625, which occurs after the casting arm 502 is in the cocked position and at a time when the pocket 435, which has just been emptied, has moved only a short distance from the discharge station P. During the remainder of the cycle of rotation of the shaft 660, the cam 705 is arranged to open the microswitch 706, thereby deenergizing the solenoid actuated valve 635 and cutting off the supply of oil mist to the nozzle 625.

Likewise, the casting arm 503 is moved to the cocked position at the beginning of each cycle of operation of the dough measuring mechanism 431, and at the end of each cycle of operation of the dough measuring mechanism 431, the casting arm 503 traverses the opening of a pocket 440 located at the discharge station W after the dough contained therein is ejected therefrom. For this purpose, a cam 710 (FIG. 14) is fixed to the input 662 of the speed reduction unit 663. Mounted adjacent the cam 710 is a two-position microswitch 711 that is supported by a bracket 712, which is rigid with the frame 370. The microswitch 711 is actuated in response to the rotation of the cam 710 and is connected to a cable 713 to control the operation of the solenoid actuated valve 612. The cam 710 is constructed so that the microswitch 711 is actuated to occupy a first position when the input shaft 662 is at rest. Consequently, one winding of the solenoid actuated valve 612 is energized and the casting arm 503 is moved to its forward position (shown in full line in FIG. 15). At the beginning of the cycle of operation of the dough measuring mechanism 431, the cam 710 rotates with the input shaft 662, and is constructed to actuate the microswitch 711 to its second position. As a result thereof, the other winding of the solenoid actuated valve 612 is energized and the casting arm 503 is moved to a cocked position. At the end of the cycle of operation of the dough measuring mechanism 431, the cam 710 resets the microswitch 711 to its first position to energize said one winding of the solenoid actuated valve 612. This results in the casting arm 503 traversing the opening of a pocket 440 located at the discharge station W after the measured quantity of dough is raised therefrom.

For spraying the dough engaging surface 552 of the casting arm 503 and the piston head associated with the pocket moving away from the discharge station, a cam 715 (FIGS. 9 and 10) is fixed to the shaft 662. Adjacent the cam 715 is mounted a microswitch 716 that is supported by the bracket 695 and that is actuated in response to the rotation of the cam 715. The cam 715 is arranged to close the microswitch 716 for a short time duration after the microswitch 711 is actuated to its second position by the cam 710. By closing the microswitch 716, the solenoid actuated valve 636 is energized for a short time duration, which occurs after the casting arm 503 is in the cocked position (shown in phantom in FIG. 15), at a time when the pocket 440, that has just been emptied, has moved only a short distance from the discharge station. During the remainder of the cycle of rotation of the shaft 662, the cam 715 is arranged to open the microswitch 716, thereby deenergizing the solenoid actuated valve 636 and cutting off the supply of oil mist to the nozzle 626.

In order to facilitate the cleaning of the hopper 415 and the rotatable plates 428 and 429, a hopper lifting assembly 720 (FIGS. 14 and 23) is provided. The hopper lifting assembly 720 comprises a handle 721 that has a hub 721a (FIG. 23) integrally formed at the proximal end thereof. The hub 721a is keyed to a short crankshaft 723 that is journalled for rotation in a bushing 722 which is fixed to a bracket 724 bolted to the frame 370. The crankshaft 723 has a single crankpin 726 on which a depending link 727 is pivotally connected. The link 727 is pivotally connected by a bolt 729 to an intermediate portion of a lever 730 that has a yoke 731 formed at one end. The yoke is pivotally connected to a collar 732 that is disposed around the conduit 480 between two collars 733 and 734 that are secured to the conduit. The lever 730 is connected at its opposite end to a link 735 that is pivotally mounted in a supported member 736 which is adjustably secured to platform 375.

When the clamp blocks 416, which secure the hopper 415 to the platform 375 are removed, an operator can pivot the handle 721 about the axis of crankshaft 723 in a direction to swing the lever 730 and the associated links upwardly to elevate the conduit 480, which in turn lifts the hopper 415. The hopper 415 is lifted a distance sufficient to clear the casting arm 502 and 503, and, thereupon, the operator may move the hopper 415 horizontally about the axis of the conduit 480 until the plates 428 and 429 are exposed for servicing.

In the operation of the reversible conveyor E and the dough discharging apparatus F, weighed pieces of dough are advanced in spaced relation for discharge onto the reversible conveyor E (FIG. 2). The reversible conveyor E drives the endless belt 305 thereof at a sufficient speed relative to the spacing between successive pieces of dough so that only one piece of dough at a time is supported by the conveyor belt 305. When a piece of dough that weighs at least the prescribed weight is advanced over the weight checker C, the electronic control circuits H (FIG. 25) cause the clutch 390 (FIG. 11) to engage. Thereupon, the sprocket 385 drives the common shaft 387 in the direction shown by the arrow 391 (FIG. 13) and the drive chain 401 rotates in a direction to advance the conveyor belt 305 in the direction shown by the arrow 31 (FIG. 2). Thus, the piece of dough, which is of prescribed weight or overweight, is discharged onto the conveyor 306 (FIG. 2) for further processing.

In case a piece of dough weighing less than the predetermined minimum weight is advanced across the weight checker C, the electronic control circuits H (FIG. 25) causes the clutch 397 (FIG. 11) to engage. This results in the drive sprocket 393 rotating the common drive shaft 386 in the direction shown by the arrow 398 (FIG. 12). The drive chain 401 (FIG. 11) by means of the rollers 409 and 411 (FIG. 10) advances the conveyor belt 305 in the direction shown by the arrow 32 (FIG. 2). Hence, the direction of travel of the conveyor E is reversed and the piece of dough weighing less than the predetermined minimum weight is discharged onto the reject conveyor 307 (FIG. 2).

When a piece of dough weighing in a range between the prescribed weight and the predetermined minimum weight is discharged onto the reversible conveyor E, the reversible conveyor E operates in the manner described for advancing a piece of dough weighing the prescribed weight. Hence, a piece of dough weighing more than the predetermined minimum weight, but less than the prescribed weight, is advanced continuously in the direction shown by the arrow 31 (FIG. 2) for discharge onto the conveyor 306.

If a piece of dough advancing toward the reversible conveyor E weighs less than the prescribed weight by an amount not in excess of a predetermined quantity, such as one-half ounce, the dough discharging apparatus F is operated by the electronic control circuits H (FIG. 25) to deposit onto the piece of dough a measured quantity of dough, such as one-half ounce of dough. For this purpose, the electronic control circuits H cause the clutch 680 (FIG. 10) to engage and cause the brake 681 (FIG. 14) to release. By engaging the clutch 680, the drive sprocket 650 (FIG. 10) rotates the input shaft 660 of the gear speed reduction unit 661 and the output shaft 665 of the gear speed reduction unit 661 drives the shaft 450 (FIG. 16) of the dough measuring mechanism 430. Through the action of the cam 685 and the cycle control microswitch 686, the input shaft 660 rotates 360° each time the clutch 680 is engaged under the control of the electronic circuits H. Each time the input shaft 660 rotates 360°, the drive shaft 450 of the dough measuring mechanism 430 rotates 60° in the direction shown by the arrow 475 (FIG. 15). Accordingly, the rotatable plate 428 of the dough measuring mechanism 430 rotates 60° during each cycle of operation of the dough measuring mechanism 430 and advances the pockets 435 in a counterclockwise direction (FIG. 15) to their respective succeeding stations.

In describing the operation of the dough measuring mechanism 430, it will be assumed that five cycles of operation have taken place. The piston 460 (FIG. 15) associated with the pocket 435 advancing to station K is moved to its lowermost position (FIG. 17). The piston associated with the pockets 435 advancing to the stations L and M are at their lowermost positions. Dough from the chamber 422 (FIG. 16) is forced into the pockets located between stations K and M by means of air under pressure, which is conducted to the hopper 415 through the air line 481 (FIG. 2). A measured quantity of dough is formed within the pocket leaving station M. In the exemplary embodiment, the measured quantity of dough weighs one-half ounce. The piston 460 (FIG. 18) associated with the pocket 435 advancing from station N to station O is gradually raised to an intermediate position against the action of the spring loaded horizontal plate 490. In this manner, the dough contained in the pocket 435 advancing toward station O is compressed and the gas that may be contained therein in expelled. The piston 460 (FIG. 19) associated with the pocket 435 advancing toward the discharge station P remains in its intermediate position until it reaches the discharge station P. Upon reaching the discharge station P, the piston 460 (FIG. 19) is raised rapidly to raise the measured quantity of dough out of the pocket 435.

The rotation of the input shaft 660 of the gear reduction unit 661 is concurrent with the cycle of operation of the dough measuring mechanism 430. As the rotatable plate 428 starts to rotate to advance the pocket 435 from station O to the discharge station P, the cam 700 (FIG. 14) that is fixed to the input shaft 660 actuates the microswitch 701 to energize the other winding of the solenoid actuated valve 592. Upon energizing the other winding of solenoid actuated valve 592, air under pressure is conducted to the cylinder 571 (FIG. 21) through the conduit 591 and the air flow through the conduit 590 is cut off. As a consequence thereof, the plunger 569 (FIG. 21) is retracted against the urgency of the spring 580. This action pivots the lever arm 564 for rotating the shaft 555 in a clockwise direction. The rotation of the shaft 555 in the clockwise direction moves the casting arm 340 to its rearward position.

As the casting arm 502 reaches its rearward position, the cam 705 (FIG. 10) that is fixed to the input shaft 660 closes the microswitch 706. The closing of the microswitch 706 energizes the solenoid actuated valve 635 (FIG. 22). Upon energizing the solenoid actuated valve 635, an oil mist is supplied to the nozzle 625 from the supply line 638 and conduit 629. Thereupon, the nozzle 625 sprays the oil mist onto the dough engaging surface 551 of the casting arm 502 and upon the piston head 460a associated with the pocket 435 advancing to the station K. This occurs before the pocket 435 advancing to the discharge station P reaches the path of the oil mist emitted from the nozzle 625.

When the pocket 435 arrives at the discharge station P, the measured quantity of dough therein is rapidly ejected therefrom. Thereupon, the cam 700 (FIG. 14) causes the microswitch 701 to energize said one winding of the solenoid actuated valve 592. Upon energizing the said one winding of the solenoid actuated valve 592, air under pressure is conducted to the cylinder 571 (FIG. 21) through the conduit 590 and air flow through the conduit 591 is cut off. Consequently, the plunger 569 is moved rapidly toward its forward position under the action of the air flow through the conduit 590 and the urgency of the spring 580. The plunger 569 in moving forward pivots the lever arm 564 for rotating the shaft 555 in a counterclockwise direction. By rotating the shaft 555 in the counterclockwise direction, the dough engaging surface 551 of the casting arm 502 sweeps in an arcuate path and engages the measured quantity of dough ejected from the pocket 435 now located at the discharge station P. The forward movement of the plunger 569 is halted abruptly by the abutment assembly 600. Therefore, the forward movement of the casting arm 502 is halted abruptly at a prescribed point. In this manner, the measured quantity of dough is projected into the prescribed zone at the discharge end of conveyor D and is deposited onto the piece of dough. When the piece of dough is discharged onto the conveyor 306 (FIG. 2) for further processing, it meets the prescribed weight requirement.

In case a piece of dough that is advanced over the weight checker C weighs less than the prescribed weight by an amount within a selected range, such as between one-half ounce and one ounce, the dough discharging apparatus F is operated by the electronic control circuits H (FIG. 25) to deposit onto the piece of dough a measured quantity of dough, such as one ounce of dough. For this purpose, the electronic control circuits H cause the clutch 690 (FIGS. 9 and 10) to engage and cause the brake 691 (FIGS. 9 and 14) to release. By engaging the clutch 690, the drive sprocket 651 (FIG. 10) rotates the input shaft 662 of the gear speed reduction unit 663 and the output shaft 666 of the gear speed reduction unit 663 drives the shaft 501 (FIG. 16) of the dough measuring mechanism 431. Through the action of the cam 693 and the cycle control switch 694, the input shaft 662 rotates 360° each time the clutch 690 is engaged under the control of the electronic circuits H. Each time the input shaft 662 rotates 360°, the drive shaft 501 of the dough measuring mechanism 431 rotates in the direction shown by the arrow 505 (FIG. 15). Accordingly, the rotatable plate 429 of the dough measuring mechanism 431 rotates 60° during each cycle of operation of the dough measuring mechanism 431 and advances the pockets 440 in a clockwise direction (FIG. 15) to their respective succeeding stations.

In describing the operation of the dough measuring mechanism 431, it will be assumed that five cycles of operation have taken place. The piston 510 (FIG. 15) associated with the pocket 440 advancing to station Q is moved to its lowermost position. The pistons associated with the pockets 440 advancing to the stations R and S are at their lowermost positions. Dough from the chamber 423 (FIG. 16) is forced into the pockets located between the stations Q and S under the action of air under pressure, which is conducted to the hopper 415 through the air line 481 (FIG. 2). A measured quantity of dough is formed in the pocket leaving station S. In the exemplary embodiment, the measured quantity of dough weighs one ounce. The piston 510 (FIG. 15) associated with the pocket 440 advancing from station S to station T is gradually raised to an intermediate position against the action of the spring loaded horizontal plate 540. In this manner, the dough contained in the pocket 440 advancing toward station V is compressed and the gas that may be contained therein expelled. The piston 510 associated with the pocket 440 advancing toward the discharge station W remains in its intermediate position until it reaches the discharge station W. Upon reaching the discharge station W, the piston 510 is raised rapidly to eject the measured quantity of dough contained in its associated pocket 440.

The rotation of the input shaft 662 of the gear reduction unit 663 is concurrent with the cycle of operation of the dough measuring mechanism 431. As the rotatable plate 429 starts to rotate to advance the pocket 440 from station V to the discharge station W, the cam 710 (FIG. 14) that is fixed to the input shaft 662 actuates the microswitch 711 to energize the other winding of the solenoid actuated valve 612. Energizing the other winding of the solenoid actuated valve 612, air under pressure is conducted to the cylinder 572 (FIG. 21) through the conduit 611 and the air flow through the conduit 610 is cut off. As a consequence thereof, the plunger 569 is retracted against the urgency of the spring 580. This action pivots the lever arm 564 for rotating the shaft 556 in a counterclockwise direction (FIG. 15). The rotation of the shaft 556 in the counterclockwise direction moves the casting arm 503 to its rearward position (shown in phantom in FIG. 15).

As the casting arm 503 reaches its rearward position, the cam 715 (FIG. 10) that is fixed to the input shaft 662 closes the microswitch 716. The closing of the microswitch 716 energizes the solenoid actuated valve 636 (FIG. 22). Upon energizing the solenoid actuated valve 636, an oil mist is supplied to the nozzle 626 from the supply line 638 and conduit 630. Thereupon the nozzle 626 sprays the oil mist onto the dough engaging arm 552 of the casting arm 503 (FIG. 15) and upon the piston head 510a associated with the pocket 440 advancing to the station Q. This occurs before the pocket 440 advancing to the discharge station W reaches the path of the oil mist emitted from the nozzle 626.

When the pocket 440 arrives at the discharge station W, the measured quantity of dough therein is rapidly raised therefrom. Thereupon, the cam 710 (FIG. 14) causes the microswitch 711 to energize said one winding of the solenoid actuated valve 612. Upon energizing said one winding of the solenoid actuated valve 612, air under pressure is conducted to the cylinder 572 (FIG. 21) through the conduit 610 and air flow through the conduit 611 is cut off. Consequently, the plunger 569 is moved rapidly toward its forward position under the action of the air flow through the conduit 610 and the urgency of spring 580. The plunger 569 in moving forward pivots the lever arm 564 for rotating the shaft 556 in a clockwise direction. By rotating the shaft 556 in the clockwise direction, the dough engaging surface 552 of the casting arm 503 sweeps in an arcuate path and engages the measured quantity of dough raised from the pocket 440 now located at the discharge station W. The forward movement of the plunger 569 is halted abruptly by the abutment assembly 615 (FIG. 21). Therefore, the forward movement of the casting arm 503 is halted abruptly at a prescribed point. In this manner, the measured quantity of dough is projected into the prescribed zone on the conveyor D and is deposited onto the piece of dough. When the piece of dough is discharged onto the conveyor 306 (FIG. 2) for further processing, it meets the prescribed weight requirement.

In the event a piece of dough is discharged onto the reversible conveyor E that weighs more than the predetermined minimum weight, but weighs less than the prescribed weight within a selected range, such as between one ounce and one and one-half ounces, the dough discharging apparatus F is operated by the electronic control circuits H (FIG. 25) to deposit onto the piece of dough a measured quantity of dough, such as one and one-half ounces of dough. For this purpose, the electronic control circuits cause the clutches 680 and 690 (FIG. 10) to engage simultaneously, and the brakes 681 and 691 (FIG. 14) to release simultaneously. The above-described operations are repeated for operating the dough measuring mechanisms 430 and 431 simultaneously and for operating the casting arms 502 and 503 simultaneously. In this manner, the measured quantity of supplemental dough, which in the exemplary embodiment is one and one-half ounces, is projected into the prescribed zone on the conveyor D and is deposited onto the piece of dough that is advancing continuously toward the conveyor belt 305. When the piece of dough is discharged onto the conveyor 306 (FIG. 2) for further processing, it meets the prescribed weight requirement.

Electronic Control Circuits

The electromechanical transducer 130 (FIG. 25) of the weight checking apparatus C transmits successive voltage signals that are respectively representative of the weights of pieces of dough advancing in succession across the weight checking apparatus C. The voltage signals are amplified by a suitable amplifier 800 (FIG. 25). Each piece of dough that advances across the weight checking apparatus C interrupts the beam of light projected by the light source 131 (FIG. 25) toward the phototube 132 (FIG. 25) just before maximum deflection is attained by the scale of the weight checking apparatus C. When the beam of light emitted by the light source 131 is interrupted by a continuously advancing piece of dough, the phototube 132 operates a relay circuit 801 (FIG. 25).

In FIG. 25 are illustrated diagrammatically the electronic control circuits H that are employed in the weight checking and correcting apparatus of the present invention. The electronic control circuits H include a dough divider control circuit 802 that is responsive to the successive voltage signals transmitted by the transducer 130 and is responsive to the operation of the relay circuit 801 to convert the successive voltage signals into a series of pulses. The series of pulses are respectively representative of the difference between a desired weight and the weights of the pieces of dough advancing in succession across the weight checking apparatus C. The control circuit 802 averages the series of pulses to produce an average signal and compares the average signal with reference voltages for controlling the direction of rotation of the dough divider control motor 51 and the angular displacement of the drive shaft of the motor 51. In this manner, the dough dividing machine A is adjusted to regulate the weight of pieces of dough formed therein to compensate for a weight variation between a desired weight and the average weight of pieces of dough advancing in succession across the weight checking apparatus C.

In addition to the adjustment of the dough divider A for regulating the weight of pieces of dough ejected therefrom, the electronic control circuits H control the direction of travel of the reversible conveyor E and control the operation of the dough discharging apparatus F. Toward this end, the electronic control circuits H include a weight classifying circuit 803 (FIG. 25) that is conditioned for operation with the successive advancement of pieces of dough across the weight checking apparatus C by the operation of the phototube relay circuit 801 and is operated in response to the successive voltage signals transmitted by the electromechanical transducer 130 for classifying individually the pieces of dough in accordance with their weight.

When a piece of dough, which is of the prescribed weight or is overweight, is advanced across the weight checking apparatus C, the weight classifying circuit 803 operates to prevent activation of a reject control circuit 804, whereby the normally operated clutch 390 (FIG. 25) of the reversible conveyor E is engaged at the time the piece of dough of the prescribed weight or overweight is discharged onto the reversible conveyor E. While the clutch 390 is engaged, the conveyor E advances the piece of dough to the conveyor 306 (FIG. 2) for further processing.

In case a piece of dough of a weight less than the predetermined minimum weight advances across the weight checking apparatus C, the phototube relay circuit 801 applies a potential through the weight classifying circuit 803 to activate the reject control circuit 804. The activation of the reject control circuit 804 causes the clutch 397 (FIG. 25) of the reversible conveyor E to be engaged at the time the piece of dough weighing less than the predetermined minimum weight is discharged onto the reversible conveyor E. When the clutch 397 is engaged, the direction of travel of the conveyor E is reversed and the piece of dough weighing less than the predetermined minimum weight is discharged onto the reject conveyor 307 (FIG. 2).

In the event a piece of dough of a weight in the range between the prescribed weight and the predetermined minimum weight is advanced across the weight checking apparatus C, the weight classifying circuit 803 operates to prevent the activation of the reject control circuit 804. Thus, the normally operated clutch 390 is engaged at the time such a piece of dough is discharged onto the reversible conveyor E. While the clutch 390 is engaged, the conveyor E advances continuously the piece of dough toward the conveyor 306 (FIG. 2).

At the time the weight classifying circuit 803 operates to prevent the activation of the reject control circuit 804, it also classifies the piece of dough weighing in the range between the prescribed weight and the predetermined minimum weight in accordance with the amount the piece of dough weighs less than the prescribed weight. If the piece of dough weighs less than the prescribed weight by an amount not in excess of a predetermined quantity, such as one-half ounce, the weight classifying circuit 803 prepares an operating circuit for a dough discharge control circuit 805. The dough discharge control circuit 805 is operated by the relay circuit 801 and causes the clutch 680 (FIG. 25) of the dough discharge apparatus F to engage and causes the brake 681 of the dough discharge apparatus F to release in timed relation with the advancement of the continuously advancing piece of dough so that the dough discharge apparatus F projects a measured quantity of dough, such as one-half ounce, at the time the continuously advancing piece of dough is discharged from the conveyor D to the reversible conveyor E. The additional quantity of dough is projected onto the piece of dough and when the piece of dough is advanced by the reversible conveyor E, it meets the prescribed weight requirement.

In case the piece of dough advancing across the weight checking apparatus C weighs less than the prescribed weight by an amount within a selected range, such as between one-half ounce and one ounce, the weight classifying circuit 803 prepares an operating circuit for a dough discharge control circuit 806. The dough discharge control circuit 806 is operated by the relay circuit 801 and causes the clutch 690 (FIG. 25) of the dough discharge apparatus F to engage and causes the brake 691 of the dough discharge apparatus F to release in timed relation with the advancement of the continuously advancing piece of dough so that the dough discharge apparatus F projects a measured quantity of dough, such as one ounce, at the time the continuously advancing piece of dough is discharged from the conveyor D to the reversible conveyor E. The additional quantity of dough is projected onto the piece of dough, and when the piece of dough is discharged onto the reversible conveyor E, it meets the prescribed weight requirement.

If the piece of dough weighs less than the prescribed weight by an amount within another selected range, such as between one ounce and one and one-half ounces, the weight classifying circuit 803 prepares an operating circuit for the dough discharge control circuits 805 and 806. The above described operations are then repeated and the dough discharging apparatus F projects a measured quantity of dough, such as one and one-half ounces, onto the continuously advancing piece of dough when the piece of dough is discharged from the conveyor D to the reversible conveyor E so that the piece of dough advanced by the reversible conveyor E meets the prescribed weight requirement.

Referring to FIG. 26, the electromechanical transducer 130 of the weight checking apparatus C comprises the suitable oscillator 286 and the detector transformer 285. In the preferred embodiment, the oscillating frequency for the oscillator 286 is 2 kc. with a stable output voltage. The input winding 289 of the detector transformer 285 has one end thereof connected to ground through a conductor 810. At the other end, the winding 289 is connected to an output circuit 811 of the oscillator 286 through a conductor 812. Thus, the input winding 289 of the detector transformer 285 is excited by the oscillator 286.

The output windings 290 and 291 of the detector transformer 285 are connected in series opposition and the voltages induced therein are opposite in phase. As previously described, the core 287 of the detector transformer 285 is displaced relative to the windings of the detector transformer 285 as the scale of the weight checking apparatus C is deflected. This produces a differential voltage across the output of the secondary windings 290 and 291, which varies linearly with the change in the position of the core 287. Therefore, the detector transformer 285 detects the magnitude of linear descent of the scale of the weight checking apparatus C and produces a signal indicative of such magnitude. This, of course, is a function of the amount by which the weight of a piece of dough exceeds the predetermined preload value of the scale in the weight checking apparatus C.

The amplifier 800 (FIG. 26) has its input circuit 816 connected to one end of the serially connected output windings 290 and 291 of the detector transformer 285 through a conductor 817, while the other end of the serially connected windings 290 and 291 is connected to ground through a conductor 818. Hence, the voltage signals transmitted by the detector transformer 285 are received by the amplifier 800.

Suitable amplification of the voltage signals transmitted by the detector transformer 285 is provided by stages 820–822, inclusive, of the amplifier 800. A feedback network 823 interconnects an output circuit 824 of the amplifier 800 to its input circuit 816 to produce a stabilized output. The feedback network 823 is connected to a variable resistor 819 of the output circuit 824. Connected to the output circuit 824 of the amplifier 800 is a conductor 825 over which is transmitted the successive voltage signals that are representative of the weight of pieces of dough advancing in succession across the weight checking apparatus C.

A conventional power supply 830 (FIG. 26) supplies a suitable plate voltage for the oscillator 286 and the amplifier 800 through a conductor 831. Across the output of the power supply 830 is connected a voltage regulating tube 832. The power supply 830 includes a transformer 833 that has a secondary winding 834, which supplies power to the light source 131 of the weight checking apparatus C over conductors 835 and 836. A source of alternating current (FIG. 30) is connected to the primary winding 837 of the transformer 833 over conductors 838 and 839.

The phototube 132 controls the operation of the relay circuit 801 (FIG. 26), which includes an amplifier 840 and a voltage divider 841. The cathode 842 of the amplifier 840 is connected to ground by way of a conductor 843 of the voltage divider 841. A grid resistor 844 of the amplifier 840 is connected at a junction 845 between serially connected resistors 846 and 847 of the voltage divider 841. Connected to the resistor 846 through the conductor 843 is a resistor 848 of the voltage divider 841, said resistor 848 being connected to the negative side of the power supply 830 by way of a conductor 849, and connected to the resistor 847 is a resistor 850 of the voltage divider 841, said resistor 850 being connected to the positive side of the power supply 830 through a conductor 851. Across the voltage divider 841 are connected voltage regulating tubes 852 and 853. In the output circuit of the amplifier 840 is a relay 860, which connects the plate 854 of the amplifier 840 to the resistor 850. The cathode 855 of the phototube 132 is connected to the resistor 848 at a junction 856, which is connected to the negative side of the power supply 830 through the conductor 849. The plate 857 of the phototube 132 is connected to the resistor 846 at the junction 845. Hence, the phototube 132 is connected across the resistors 846 and 848 of the voltage divider 841.

When the beam of light emitted by the light source 131 is not interrupted, the phototube 132 conducts. As a result thereof, the resistors 846 and 848 of the voltage divider 841 are effectively shunted and a negative potential from the junction 856 is applied to the grid resistor 844 at the junction 845 for biasing the amplifier 840 to cut-off. Therefore, the amplifier 840 is rendered substantially non-conductive and the relay 860 is not energized. During the time an advancing piece of dough interrupts the light beam projected by the light source 131, the phototube 132 is rendered substantially non-conductive. Consequently, the end of the resistor 846 opposite the junction 845 is at ground through the conductor 843 and the end of the resistor 847 opposite the junction 845 is at a positive potential through the resistor 850. Therefore, a positive potential is applied to the grid resistor 844 at the junction 845 to render the amplifier 840 conductive. The conduction of the amplifier 840 causes the relay 860 to be energized and to operate.

The operation of the relay 860 causes contacts 862 and 864 to open and further causes contacts 861 and 863 to close. When contacts 863 are closed, an operating circuit is completed to operate a relay 870 (FIG. 27) of the relay circuit 801 over the following path: ground, relay 870, conductor 880, contacts 863, conductor 881 and the positive side of a power supply 882 (FIG. 30). The closing of contacts 861 completes an operating circuit for a transfer relay 890 (FIG. 28) of the divider control circuit 802 over the following path: ground, relay 890, conductor 900, contacts 861 (FIG 26), conductor 901, conductor 881 (FIG. 30), and the positive side of the power supply 882.

As shown in FIG. 28, the divider control circuit 802 comprises a detector 909, which includes a duo-triode tube 910. The grids of the tube 910 are connected to a grid resistor 911 and the grid resistor 911 is connected to the conductor 825 through a blocking capacitor 912. Over the conductor 825 is transmitted the successive voltage signals from the amplifier 800 that are respectively representative of the weight of pieces of dough advancing in succession across the weight checking apparatus C.

An adjustable biasing network 913 (FIG. 28) of the divider control circuit 802 is also connected to the grid resistor 911 of the detector 909 and includes a resistor 914 and a potentiometer 915. One end of the resistor 914 is connected to the grid resistor 911, while the other end of the resistor 914 is connected to the adjustable contact of the potentiometer 915. The potentiometer 915 at one end is connected to ground and, at its other end, the potentiometer is connected to the negative side of a power supply 916 (FIG. 30) through a conductor 917. By means of this biasing arrangement, the detector 909 conducts in response to the peak portions of the aforementioned voltage signals that are transmitted over the conductor 825.

In the cathode circuit of the detector 909 is a capacitor 918 that is connected at one end to the cathodes 919 and 920 of the duo-triode tube 910 and, at its other end, the capacitor 918 is connected to ground. The capacitor 918 charges positively as the detector 909 conducts, and the detector 909 conducts in response to the portion of a voltage signal, transmitted over the conductor 825 by the amplifier 800, that overcomes the biasing potential applied to the grid resistor 911 of the detector 909 by the biasing network 913.

The transfer relay 890 of the divider control circuit 802 is normally deenergized. At that time, contacts 891 are opened and contacts 892 and 893 are closed. When contacts 892 are closed, a capacitor 925 charges to a predetermined negative potential over the following path: ground, capacitor 925, contacts 892, resistor 926, conductor 917 and the negative side of the power supply 916 (FIG. 30). Upon energizing the transfer relay 890, contacts 891 close and contacts 892 and 893 open. The breaking of the contacts 892 opens the charging circuit for the capacitor 925 to disconnect the capacitor 925 from the negative side of the power supply 916. The closing of the contacts 891 completes a discharging circuit for the capacitor 925 over the following path: ground, capacitor 925, contacts 891, resistor 927, capacitor 918 and back to ground. Hence, the capacitor 925 discharges to charge the capacitor 918 of the detector 909 to a negative reference potential of a predetermined magnitude.

As previously described, the transfer relay 890 is energized when the relay 860 (FIG. 26) is operated. The relay 860 is operated just before the scale of the weight checking apparatus C attains maximum deflection from the weight of a piece of dough imposed thereon. Therefore, the capacitor 918 of the detector 909 is charged by the capacitor 925 to the negative reference potential just prior to the time the detector 909 receives a voltage signal representative of the weight of the piece of dough advancing across the weight checking apparatus C. When the detector 909 receives the just-mentioned voltage signal, it conducts. The conduction of the detector 909 reduces the negative potential on the capacitor 918 and may charge the capacitor 918 positively dependent upon the difference between the magnitude of the voltage signal and the biasing potential on the detector 909.

The biasing network 913 is adjusted so that the charge remaining on the capacitor 918 is zero when the detector 909 conducts in response to a voltage signal representative of the weight of a piece of dough of a desired weight. The term "desired weight" is used to indicate the weight desired for each piece of dough leaving the dough divider. It is not the final, or prescribed, weight. The desired weight is greater than the predetermined minimum weight but may be less than the prescribed weight so that the processing of pieces of dough that weigh in excess of the prescribed weight will be minimized. If an incoming voltage signal is representative of the weight of a piece of dough weighing more than the desired weight, the charge remaining on the capacitor 918 will be positive. In case an incoming voltage signal is representative of the weight of a piece of dough weighing less than the desired weight, the charge remaining on the capacitor 918 will be negative.

When a piece of dough advancing across the weight checking apparatus C no longer interrupts the light beam projected toward the phototube 132, the relay 860 is deenergized and contacts 861 open to release the transfer relay 890. Upon the release of the transfer relay 890, contacts 891 open to disconnect the capacitor 918 of the detector 909 from the capacitor 925 and contacts 892 close to complete the charging circuit for the capacitor 925. In addition, the releasing of the transfer relay 890 closes contact 893 to establish a circuit for transmitting, over a conductor 930, a voltage pulse from the voltage remaining on the capacitor 918 of the detector 909. The voltage pulse is representative of the difference between the desired weight for pieces leaving the dough divider and the weight of the piece of dough advancing across the check weighing apparatus C. The above operations occur each time a piece of dough is weighed by the check weighing apparatus C. Accordingly, the detector 909 converts the successive voltage signals transmitted by the amplifier 800 into a series of pulses respectively representative of the difference between the desired weight and the weight of pieces of dough advancing in succession across the weight checking apparatus C.

The series of pulses are received by an averaging network 935 of the divider control circuit 802 that comprises a resistor 936, a capacitor 937 and a potentiometer 938. One end of the resistor 936 is connected to the armature of the transfer relay 890 that establishes a connection with the contacts 893. At the other end, the resistor 936 is connected to one side of the capacitor 937. The other side of the capacitor 937 is connected to ground. The potentiometer 938 is connected in parallel with the capacitor 937 and its adjustable connection, which shunts out a portion of the resistance of the potentiometer 938, is connected to a grid 940 of a differential detector 941. The averaging network 935, which has a relatively long time constant compared with the time duration between successive pulses, averages the series of pulses received from the detector 909 and transmits to the differential detector 941 of the divider control circuit 802 an average signal. It is to be observed that the average signal produced by the averaging network 935 is not the result of a finite series of pulses, but is a continuous signal reflecting an average of a series of pulses that is continuously produced by the detector 909.

The differential detector 941 comprises a duo-triode tube 942 that has its grid 940 connected to the adjustable connection of the potentiometer 938 in the averaging network 935 for receiving therefrom an average signal. Another grid 944 of the duo-triode tube 942 is connected to a biasing network 945, which includes a resistor 946 and a capacitor 947, for impressing thereon a reference voltage. One end of the resistor 946 is connected to the grid 944 and the other end of the resistor 946 is connected to the capacitor 947, which is connected to ground. In the divider control circuit 802 of the present invention, the reference voltage impressed on the grid 944 of the duo-triode tube 942 by the biasing network 945 is zero.

A cathode 950 of the duo-triode tube 942 is connected to a resistor 951, which is connected to the negative side of the power supply 916 (FIG. 30) through the conductor 917. Likewise, the other cathode 952 is connected to a resistor 953, which is connected to the negative side of the power supply 916 through the conductor 917. The resistors 951 and 953 have the same resistance values and, hence, cathode circuits 954 and 955 of the differential detector 941 are balanced. Interconnecting the cathode circuits 954 and 955 of the differential detector 941 at junctions 956 and 957 is a polarized relay 960. Connected in parallel with the polarized relay 960 is a variable resistor 963 that is adjustable for regulating the sensitivity of the polarized relay 960.

When an average signal produced by the averaging network 935 has a magnitude representative of the desired weight for pieces of dough leaving the dough divider, the voltage applied to the grid 940 of the differential detector 941 by the averaging network 935 is zero. Since the reference voltage applied to the grid 944 of the differential detector 941 by the biasing network 945 is zero, each tube section of the duo-triode tube 942 has a current flow of equal magnitude. Hence, the current flow in each of the cathode circuits 954 and 955 of the differential detector 941 has a current flow of equal magnitude. Consequently, the potential difference between the junctions 956 and 957 is zero and the polarized relay 960 remains deenergized.

In case an average signal produced by the averaging network 935 has a positive magnitude, which is representative of an average weight in excess of the desired weight, the voltage applied to the grid 940 of the differential detector 941 is more positive than the reference voltage applied to the grid 944 of the differential detector 941. As a consequence thereof, the tube section of the duo-triode tube 942 controlled by the grid 940 conducts more current than the tube section of the duo-triode tube 942 controlled by the grid 944. Therefore, there is a greater current flow in the cathode circuit 954 of the differential detector 941 than is present in the cathode circuit 955. This results in a potential difference between the junctions 956 and 957 of the cathode circuits 954 and 955, respectively, to cause the polarized relay 960 to operate. The operation of the polarized relay 960 under the above-described conditions closes contacts 961 to complete an energizing circuit for a divider control relay 970 over the following path: ground, relay 970, resistor 973', contacts 961, conductor 973, microswitch 974, conductor 901 and the positive side of the power supply 882 (FIG. 30).

Upon energizing the relay 970, contacts 971 and 972 close. The closing of contacts 972 completes an operating circuit for the divider control motor 51 over the following path: one side of the source of alternating current (FIG. 30), conductor 839, conductor 975 (FIG. 28), contacts 972, conductor 976, motor 51 (FIG. 30), conductor 977, conductor 838, and back to the other side of the source of alternating current. Accordingly, the reversible motor 51 is operated so that its drive shaft rotates in a direction to decrease the weight of pieces of dough formed within the dough divider A whenever the average signal produced by the averaging network 935 indicates that the pieces of dough passing over the weight checker C is in excess of the desired weight for pieces of dough leaving the divider.

The closing of contacts 971 of relay 970 (FIG. 28) completes a circuit to apply a fixed positive potential to a bias control network 978 (FIG. 28) over the following path: positive side of power supply 882 (FIG. 30), conductor 901, conductor 973, resistor 979, contacts 971, conductor 980, and the bias control network 978. The bias control network 978 comprises a variable resistor 981 and a resistor 982. One side of the resistor 981 is connected to the conductor 980 for receiving a positive voltage from the power supply 882 and the other side of the resistor 981 is connected to ground. At the adjustable connection, the resistor 981 is connected to one end of the resistor 982. The other end of the resistor 982 is connected to the side of the capacitor 947 of the biasing network 945 opposite the ground connection. Thus, a portion of the resistor 981 and the resistor 982 together are connected in parallel with the capacitor 947.

The capacitor 947 of the biasing network 945 charges slowly toward the positive voltage of the bias control network 978 and applies a gradually increased positive potential to the grid 944 of the differential detector 941 through the resistor 946 until the positive potential on the grid 944 of the differential detector 941 is equal to the positive potential on the grid 940 of the differential detector 941, which is impressed thereon by the averaging network 935. When the potential on the grid 944 is equal to the potential on the grid 940, each tube section of the differential detector 941 has a current flow of equal magnitude. Therefore, the current flow in each of the cathode circuits 954 and 955 of the differential detector 941 has a current flow of equal magnitude. As a result thereof, the potential differences between the junctions 956 and 957 is zero and the polarized relay 960 is deenergized.

When the polarized relay 960 is deenergized, contacts 961 break to release the divider control relay 970. When the relay 970 is deenergized, contacts 972 break to open the operating circuit for the divider control motor 51 and contacts 971 break to disconnect the bias control network 978 from the fixed positive potential on the conductor 901. The capacitor 947 of the biasing network 945 then discharges to the aforementioned reference voltage, which is zero. From the foregoing, it is to be observed that the differential detector 941 compares the polarity of an average signal with a reference voltage to determine the direction of rotation of the reversible motor 51 and compares the magnitude of the average signal with a gradually increased reference voltage of a like polarity to determine the time duration for operating the reversible motor 51. The length of time that the divider control motor 51 operates, which determines the angular displacement of its drive shaft, can be regulated by the variable resistor 981 of the bias control network 978. Accordingly, the dough dividing machine A is regulated to decrease the weight of pieces of dough formed therein to compensate for an overweight variation between the desired and the average weight of pieces of dough advancing in succession across the weight checking apparatus C.

If an average signal produced by the averaging network 935 has a negative magnitude, which is representative of an average weight less than the desired weight, the voltage applied to the grid 940 of the differential detector 941 is more negative than the reference voltage applied to the grid 944 of the differential detector 941 by the biasing network 945. As a consequence thereof, the tube section of the duo-triode tube 942 controlled by the grid 944 conducts more current than the tube section of the duo-triode tube 942 controlled by the grid 940. Therefore, there is a greater current flow in the cathode circuit 955 of the differential detector 941 than is present in the cathode circuit 954. This results in a potential difference between the junctions 956 and 957 of the cathode circuits 954 and 955, respectively, to cause the polarized relay 960 to operate. The operation of the polarized relay 960 under the just-described conditions closes contacts 962 to complete an energizing circuit for a divider control relay 990 over the following path: ground, relay 990, resistor 993, contacts 962, conductor 973, microswitch 974, conductor 901, and the positive side of the power supply 882 (FIG. 30).

When the divider control relay 990 is energized, contacts 991 and 992 close. The closing of contacts 992 completes an operating circuit for the divider control motor 51 over the following path: one side of the source of alternating current (FIG. 30), conductor 839, conductor 975 (FIG. 28), conductor 994, contacts 992, conductor 995, motor 51 (FIG. 30), conductor 977, conductor 838 and the other side of the source of alternating current. Accordingly, the reversible motor 51 is operated so that its drive shaft rotates in a direction to increase the weight of pieces of dough formed within the dough divider A if the average weight of pieces of dough passing over the weight checker is less than the desired weight for pieces being discharged from the dough divider.

The closing of contacts 991 completes a circuit to apply a fixed negative potential to the bias control network 978 over the following path: negative side of the power supply 916 (FIG. 30), conductor 917, resistor 996 (FIG. 28), contacts 991, conductor 980 and the bias control network 978. The capacitor 947 of the biasing network 945 charges slowly toward the negative voltage on the bias control network 978 and impresses a gradually more negative potential on the grid 944 of the differential detector 941 through the resistor 946 until the negative potential on the grid 944 of the differential detector 941 is equal in magnitude to the negative potential on the grid 940 of the differential detector 941, which is impressed thereon by the averaging network 935. When the potential on the grid 944 is equal to the potential on the grid 940, each tube section of the differential detector 941 has a current flow of equal magnitude. Therefore, each of the cathode circuits 954 and 955 of the differential detector 941 has a current flow of equal magnitude. As a result thereof, the potential difference between the junctions 956 and 957 is zero and the polarized relay 960 is deenergized.

Upon deenergizing the polarized relay 960, contacts 962 break to release the divider control relay 990. When the relay 990 is deenergized, contacts 992 break to open the operating circuit for the divider control motor 51 and contacts 991 break to disconnect the bias control network 978 from the fixed negative potential on the conductor 917. The capacitor 947 of the biasing network 745 then discharges to the aforementioned reference voltage, which is zero. The time duration for operating the divider control motor 51 and, hence, the angular displacement of the drive shaft of the motor 51, is controlled by the magnitude of the average signal impressed on the grid 940 of the differential detector 941 and the gradually increased negative voltage impressed upon the grid 944 of the differential detector 941 by the bias control network 978 through the capacitor 947. Therefore, the differential detector 941 compares the polarity of the average signal with a reference voltage to determine the direction of rotation of the reversible motor 51 and compares the magnitude of the average signal with a gradually changing reference voltage of a like polarity to determine the time duration for operating the reversible motor 51. In this manner, the dough divider A is regulated to increase the weight of pieces of dough formed therein to compensate for an underweight variation between the desired weight and the average weight of pieces of dough advancing in succession across the weight checking apparatus C.

The above-described operations for compensating for variations between the desired weight and an average weight is repeated until the pieces of dough advancing across the weight checking apparatus C are of the desired weight. When this occurs, the average signal applied to the grid 940 of the differential detector 941 by the averaging network 935 is equal to the reference voltage applied to the grid 944 of the differential detector 941 by the biasing network 945.

The microswitch 974 (FIGS. 1 and 28) of the dough divider A, which is connected to the armature of the polarized relay 960, is actuated to an opened position by a carrier supporting the rocker assembly 44 (FIG. 1) to prevent the operation of the divider control motor 51 (FIGS. 1 and 30) while the fingers 46 (FIG. 1) of the rocker assembly 44 are in engagement with the abutment block 47 and is actuated to a closed position by the carriage, which supports the rocker assembly 44, to permit the operation of the divider control motor 51 during the time the fingers 46 are not in engagement with the abutment block 47.

The magnetic clutch 54 (FIGS. 1 and 30) of the dough divider A is engaged while a manually operated switch 997 (FIG. 30) is closed and is disengaged when the manually operated switch 997 is opened. The energizing circuit for the magnetic clutch 54 is as follows: power supply 998 (FIG. 30), conductor 999, clutch 54, switch 997, conductor 1000, and resistor 1001 and back to the power supply 998. As previously described in connection with the dough divider A, when the magnetic clutch 54 is engaged, the height of the abutment block 47 (FIG. 1) is adjusted automatically by means of the divider control motor 51 and, when the magnetic clutch 54 is disengaged, the height of the adjustment block 47 is adjusted by a manual operation of the hand wheel 50 (FIG. 1).

Illustrated in FIG. 27 is the weight classifying circuit 803 of the electronic control circuits H, which comprises four thyratrons 1010–1013. The thyratrons 1010–1013 have their grid resistors 1018–1021 connected to biasing networks 1022–1025, respectively. Included in the biasing networks 1022–1025 are resistors 1014–1017, respectively, that interconnect the grid resistors 1018–1021 to the adjustable connections of potentiometers 1026–1029, respectively (of the biasing networks 1022–1025, respectively. The potentiometers 1026–1029 are connected in series and a negative potential is conducted therethrough over the following path: negative side of the power supply 916 (FIG. 30), conductor 917, potentiometers 1026–1029 (FIG. 27), resistor 1030 and ground. From this arrangement, the thyratrons 1010–1013 are progressively biased in their numerical order, whereby each succeeding thyratron has a less negative bias impressed on the grid resistor thereof than does the preceding thyratron.

Connected to the plates 1031–1034 of the thyratrons 1010–1013, respectively, are relays 1040, 1050, 1060 and 1070, respectively, which are connected to a common conductor 1077. The firing of a thyratron will cause the relay in its plate circuit to operate. The grid resistors 1018–1021, inclusive, of the thyratrons 1010–1013, respectively, are connected through blocking capacitors 1078–1081, respectively, to the aforementioned conductor 825. Over the conductor 825 are transmitted the successive positive voltage signals from the amplifier 800 that are representative of the weight of pieces of dough advancing in succession across the weight checking apparatus C.

The potentiometers 1026–1029 of the biasing networks 1022–1025, respectively, are adjusted to control the firing of the thyratrons 1010–1013, respectively, in the following manner:

(a) Thyratrons 1010–1013 fire when a voltage signal transmitted over the conductor 825 is representative of the weight of a piece of dough weighing at least the prescribed weight;

(b) Thyratrons 1011-1013 conduct when a voltage signal transmitted over the conductor 825 is representative of the weight of a piece of dough weighing less than the prescribed weight by an amount not in excess of a predetermined quantity, such as one-half ounce;

(c) Thyratrons 1012 and 1013 fire when a voltage signal transmitted over the conductor 825 is representative of the weight of a piece of dough weighing less than the prescribed weight within a second selected range, such as between one-half ounce and one ounce;

(d) Thyratron 1013 conducts when a voltage signal transmitted over the conductor 825 is representative of the weight of a piece of dough weighing less than the prescribed weight within a third selected range, such as between one ounce and one and one-half ounces;

(e) Thyratrons 1010-1013 do not fire when a voltage signal transmitted over the conductor 825 is representative of the weight of a piece of dough weighing less than the predetermined weight.

As previously described in connection with the divider control circuit 802, the relay 860 (FIG. 26) of the relay circuit 801 is operated when a piece of dough advancing across the weight checking apparatus C interrupts the beam of light projected toward the phototube 132. The beam of light is interrupted just before the scale of the weight checking apparatus C attains maximum deflection from the weight of a piece of dough imposed thereon. The relay 860 remains operated until the piece of dough advancing across the check weighing apparatus C has advanced beyond the beam of light projected by the light source 131.

When the relay 860 is operated, contacts 864 open and contacts 863 close. The closing of contacts 863 causes the relay 870 (FIG. 27) of the relay circuit 801 to be energized in a manner previously described. Upon the energization of the relay 870, contacts 871, 872 and 873 close. The closing of contacts 873 completes a circuit for impressing a positive potential on the plates 1031-1034 of the thyratrons 1010-1013, respectively, in the classifying circuit 803 through the common conductor 1077 in the following manner: positive side of the power supply 882 (FIG. 30), conductor 881, conductor 881' (FIG. 27), contacts 873, resistor 1094, conductor 1095 and conductor 1077. It is to be observed that the relay 870 is operated before the scale of the weight checking apparatus C attains maximum deflection in response to the weight of a piece of dough advancing across the weight checking apparatus C. Hence, the positive potential is applied to the plates of the thyratrons 1010-1013 in the classifying circuit 803 before a voltage signal is transmitted over the conductor 825.

The closing of contacts 872 of the relay 870 (FIG. 27) completes a locking circuit for the relay 870 over the following path: ground, relay 870, contacts 872, conductor 1093, contacts 1092, conductor 881 and to the positive side of the power supply 882. When contacts 871 close, operating circuits are prepared for the reject control circuit 804 and a cycle control relay 1090.

If the piece of dough advancing across the weight checking apparatus C weighs less than the predetermined minimum weight, the magnitude of the voltage signal transmitted by the amplifier 800 over the conductor 825 in insufficient to overcome the bias on the thyratrons 1010-1013 of the weight classifying circuit 803 (FIG. 27). Therefore, the thyratrons 1010-1013 do not fire and the relays 1040, 1050, 1060 and 1070 in the plate circuits of the thyratrons 1010-1013, respectively, do not operate.

When the beam of light projected by the light source 131 (FIG. 26) is no longer interrupted by the piece of dough advancing across the weight checking apparatus C, the relay 860 (FIG. 26) is released to open contacts 863 and to close contacts 864. The breaking of the contacts 863 opens the operating circuit of the relay 870, which is still operated, however, through its locking circuit. The closing of contacts 864 completes a path for activating the reject control circuit 804 (FIG. 29) in the following manner: positive side of the power supply 882 (FIG. 30), conductor 881, contacts 864, conductor 1096, contacts 871, conductor 1097, contacts 1091, conductor 1098, contacts 1043, contacts 1053, contacts 1061, contacts 1074, resistor 1099, conductor 1100 and the reject control circuit 804.

The cycle control relay 1090 is subsequently operated over the following path: positive side of the power supply 882 (FIG. 30), conductor 881, contacts 864 (FIG. 26), conductor 1096, contacts 871 (FIG. 27), conductor 1097, contacts 1091, conductor 1098, contacts 1043, contacts 1053, contacts 1061, contacts 1074, rectifier 1101, time delay network 1102, relay 1090 and ground. The time delay network 1102 delays the operation of the relay 1090 for a time duration sufficient for the reject control circuit 804 to be activated. When the cycle control relay 1090 is energized, contacts 1092 break to release the relay 870 through its locking circuit, and contacts 1091 break to deenergize the relay 1090 and to disconnect the reject control circuit 804 from its activating circuit after the reject control circuit 804 is activated by a reject signal, and to release the relay 1090. When relay 870 (FIG. 27) is denergized, contacts 873 open to remove the plate voltage from the thyratrons 1010-1013, contacts 872 break to further open the locking circuit for relay 870 and contacts 871 open to further open the activating circuit for the reject control circuit 804 and the energizing circuit of the relay 1090.

The reject control circuit 804 (FIG. 29) comprises conventional multivibrators 1103-1106 which are connected in cascade. An input circuit 1107 of the reject control circuit 804, which interconnects the grid resistor 1108 of the multivibrator 1103 with the conductor 1100, receives the positive reject voltage signal transmitted over the conductor 1100 and produces a pulse that is impressed on the grid resistor 1108 to activate the multivibrator 1103. When the multivibrator 1103 is activated, it produces a voltage pulse that activates the succeeding multivibrator 1104. Thereupon, the multivibrator 1104 produces a pulse which activates the next multivibrator 1105. When the multivibrator 1105 is activated, it produces a pulse that activates the succeeding multivibrator 1106.

Associated with the multivibrators 1103-1106 are time delay networks 1109-1112, respectively, that control their associated multivibrators to establish the time duration between the pulses produced in succession within the reject control circuit 804. Connected to the time delay networks 1109-1112 through a conductor 1113 is a time delay control network 1114, which includes a resistor 1115 and a potentiometer 1116. By adjusting the adjustable connection of the potentiometer 1116, the time constants of the time delay networks 1109-1112 are regulated to control the time duration between the pulses successively produced by the multivibrators 1103-1106.

The pulse produced by the multivibrator 1106 is transmitted to the grid 1117 of a thyratron 1118 over a path including a capacitor 1119, a reject duration control network 1120, and a conductor 1121. An alternating current potential is impressed on the plate 1122 of the thyratron 1118 over the following path: plate 1122, capacitor 1123, resistor 1124, conductor 1125, conductor 838 and the source of alternating current (FIG. 30). The cathode 1126 of the thyratrons 1118 (FIG. 29) is connected to the ground side of the source of alternating current through conductors 1127 and 839.

Connected in series with the plate 1122 of the thyratron 1118 is a relay 1130. The relay 1130 is normally deenergized and, hence, contacts 1132 are normally closed to energize the normally operated clutch 390 (FIG. 30) of the reversible conveyor E over the following path:

contacts 1132, conductor 1133, clutch 390, conductor 1134, conductor 999 (FIG. 30), power supply 998, resistor 1001, conductor 1000, conductor 1135, conductor 1136, and back to contacts 1132 (FIG. 29). When the clutch 390 is energized, the clutch is engaged and the reversible conveyor E advances in the direction shown by the arrow 31 (FIG. 2).

The relay 1130 (FIG. 29) is energized while the thyratron 1118 conducts. When relay 1130 is energized, contacts 1132 open and contacts 1131 close. The breaking of contacts 1132 opens the energizing circuit for the normally operated clutch 390 to disengage the clutch 390. The closing of contacts 1131 (FIG. 29) completes an energizing circuit for the reject clutch 397 (FIG. 30) of the reversible conveyor E over the following path: contacts 1131, conductor 1137, clutch 397, conductor 1134, conductor 999, power supply 998, resistor 1001, conductor 1000, conductor 1135, conductor 1136 and back to contacts 1131. When the clutch 397 is energized, the clutch 397 is engaged and the direction of travel of the reversible conveyor E is reversed, whereby a piece of dough on the reversible conveyor E is advanced in the direction shown by the arrow 32 (FIG. 2).

To prevent arcing across the contacts 1131 and 1132 of the relay 1130, capacitors 1138 and 1139 are provided, which are connected to a conductor 1140.

The reject delay control network 1114 is adjusted so that the time interval between the release of relay 860 (FIG. 26) and the energizing of the reject clutch 397 (FIG. 30) is equal to the time it takes for a piece of dough advancing beyond the beam of light projected across the weight checking apparatus C by the light source 131 to be discharged onto the reversible conveyor E. Thus, the reject control circuit 804 by means of the multivibrators 1103–1106 and their associated time delay networks 1109–1112 stores a reject signal and operates the reject clutch 397 in timed relation with the advancement of a piece of dough weighing less than the predetermined minimum weight, whereby the direction of travel of the reversible conveyor E is reversed at the time the piece of dough weighing less than the predetermined weight is discharged onto the reversible conveyor E. It is to be observed that the reject control circuit 804 is capable of storing more than one reject signal, since the multivibrators 1103–1106 are activated in succession. In addition, the reject control circuit 804 in the absence of a reject pulse causes the normally energized clutch 390 to be engaged at the time a piece of dough weighing more than the predetermined minimum weight is discharged onto the reversible conveyor E.

The reject duration control circuit 1120, which comprises a potentiometer 1141, rectifiers 1142 and 1143, resistors 1144–1147 and capacitor 1148, receives a pulse from the multivibrator 1106 and impresses a pulse on the grid 1117 of the thyratron 1118. The pulse impressed on the grid 1117 of the thyratron 1118 by the duration control circuit 1120 attains its maximum magnitude very rapidly and reduces its magnitude from the maximum at a rate determined by the circuit parameters of the control circuit 1120 and the adjustment of the potentiometer 1141. Therefore, the thyratron 1118 conducts substantially at the time the pulse is impressed on its grid 1117 by the control network 1120 and extinguishes when the magnitude of the pulse is no longer sufficient to render it conductive and the negative portion of the alternating current voltage is impressed on its plate 1122.

The potentiometer 1141 (FIG. 29) is adjusted so that the thyratron 1118 conducts and the relay 1130 is energized for a time duration commensurate with the time interval between successive pieces of dough discharged onto the reversible conveyor E. In this manner, the reject clutch 397 is engaged for a sufficient time to enable the reversible conveyor E to discharge a piece of dough weighing less than the predetermined weight onto the reject conveyor 307 (FIG. 2) and, further, the reject clutch 397 will remain engaged until a piece of dough is advanced onto the reversible conveyor E that weighs more than the predetermined weight, since the time interval between pulses in the reject control circuit is substantially equal to the time interval between successive pieces of dough discharged onto the reversible conveyor E. In the absence of a reject pulse, the normally energized clutch 390 will be engaged at the time a piece of dough weighing more than the predetermined weight is discharged onto the reversible conveyor E.

If a piece of dough advancing across the weight checking apparatus C weighs at least the prescribed weight, the magnitude of the voltage signal transmitted by the amplifier 800 is sufficient to overcome the bias on thyratron 1010 (FIG. 27) as well as thyratrons 1011–1013. Therefore, relay 1040, as well as relays 1050, 1060 and 1070, operates. The operation of relay 1040 opens contacts 1043 and closes contacts 1041. The opening of contacts 1043 opens the activating circuit for the reject control circuit 804 (FIG. 29) and the closing of contacts 1041 prepares an operating circuit for the cycle control relay 1090.

When the beam of light projected by the light source 131 (FIG. 26) is no longer interrupted by the piece of dough advancing across the check weighing apparatus C, the relay 860 (FIG. 26) is released to open contacts 863 and to close contacts 864. The breaking of contacts 863 opens the operating circuit for the relay 870 (FIG. 27), which remains operated through its holding circuit. The closing of contacts 864 completes an operating circuit for the cycle control relay 1090 (FIG. 27) over the following path. positive side of the power supply 882 (FIG. 30), conductor 881, contacts 864 (FIG. 26), conductor 1096, contacts 871 (FIG. 27), conductor 1097, contacts 1091, conductor 1098, contacts 1041, conductor 1149, time delay network 1102, relay 1090 and ground. The closing of contacts 864 does not activate the reject control circuit 804, since contacts 1043 of the relay 1040 (FIG. 27) are open. Hence, no reject pulse is produced in the reject circuit 804 in timed relation with the advancement of the piece of dough weighing at least the prescribed weight. Accordingly, at the time the piece of dough weighing at least the prescribed weight is discharged onto the reversible conveyor E, the normally operated clutch 390 (FIG. 30) is engaged.

When the cycle control relay 1090 is energized, contacts 1091 and 1092 open. The opening of contacts 1092 releases the relay 870 (FIG. 27) through its locking circuit. The opening of contacts 1091 deenergizes relay 1090 and further opens the activating circuit for the reject control circuit 804. When relay 870 is deenergized, contact 873 open to remove the plate voltage from the thyratrons 1010–1013 to extinguish the same, and contacts 812 break to further open the activating circuit for the relay control circuit 804 and the energizing circuit for the cycle control relay 1090. Upon extinguishing the thyratrons 1010–1013, relays 1040, 1050, 1060 and 1070 are deenergized.

In case a piece of dough advancing across the weight checking apparatus C weighs less than the prescribed weight by an amount within a predetermined quantity, such as one-half ounce, the magnitude of the voltage signal transmitted by the amplifier 800 (FIG. 26) is sufficient to overcome the bias on the thyratron 1011 (FIG. 27) as well the thyratrons 1012 and 1013. Consequently, the relay 1050, as well as the relays 1060 and 1070, operates. Upon operating relay 1050, contacts 1053 open and contacts 1051 close. The breaking of contacts 1053 opens the activating circuit for the reject control circuit 804 (FIG. 29), and the closing of contacts 1051 prepares an operating circuit for a relay 1150 (FIG. 27).

When the beam of light projected by the light source 131 (FIG. 26) is not longer interrupted by the piece of dough advancing across the check weighing apparatus C, the relay 860 is deenergized to open contacts 863 and to close contacts 864. The breaking of contacts 863 opens the operating circuit for the relay 870, which remains energized through its locking circuit. The closing of contacts 864 completes an operating circuit for a relay 1150 (FIG. 27) over the following path: positive side of the power supply 882 (FIG. 30), conductor 881, contacts 864 (FIG. 26), conductor 1096, contacts 871 (FIG. 27), conductor 1097, contacts 1091, conductor 1098, contacts 1043, contacts 1051, conductor 1154, relay 1150 and ground.

The closing of contacts 864 does not activate the reject control circuit 804, since contacts 1053 of the relay 1050 are open. Accordingly, no reject pulse is produced in timed relation with the advancement of the piece of dough weighing less than the prescribed weight by an amount within a predetermined quantity, such as one-half ounce. Therefore, at the time such a piece of dough is discharged onto the reversible conveyor E, the normally operated clutch 390 (FIG. 30) is engaged.

When relay 1150 (FIG. 27) is energized, contacts 1151–1153 are closed. The closing of contacts 1151 completes a holding circuit for the relay 1150 over the following path: ground, relay 1150, contacts 1151, conductor 1159, contacts 1173, conductor 1178, conductor 881 and the positive side of the power supply 882. The closing of contacts 1153 completes a circuit for controlling the activation of the dough discharge control circuit 805 (FIG. 28) over the following path: contacts 1153, conductor 1156, dough discharge control circuit 805, conductor 1155, conductor 839 and back to contacts 1153. The closing of contacts 1152 completes an energizing circuit for the cycle control relay 1090 over the following path: positive side of the power supply 882 (FIG. 30), conductor 881, contacts 1152 (FIG. 27), conductor 1157, time delay network 1102, relay 1090 and ground.

Upon energization of the cycle control relay 1090, contacts 1091 and 1092 open. The opening of contacts 1092 releases the relay 870 (FIG. 27) through its holding circuit and further opens the activating circuit for the reject control circuit 804. The breaking of contacts 1091 opens the operating circuit for the relay 1150, which remains energized through its locking circuit. When relay 870 is deenergized, contacts 873 open to remove the plate voltage from the thyratrons 1010–1013 to extinguish the thyratrons 1011–1013 and contacts 872 break to further open the activating circuit for the reject control circuit 804. Upon the extinguishing of thyratrons 1011–1013, relays 1050, 1060 and 1070 are deenergized. The release of relay 1050 opens contacts 1051 to further open the operating circuit for the relay 1150.

The dough discharge control circuit 805 (FIG. 28) comprises a thyratron 1160 that has its plate 1161 connected to a source of alternating current (FIG. 30) through the conductor 838, a resistor 1162, a capacitor 1163 and the relay 1171 in parallel with the resistor 1162 and the capacitor 1163. The cathode 1164 of the thyratron 1160 is connected to the source of alternating current over the following path: the conductor 839, the conductor 1155, a resistor 1165 of a time delay network 1166, a resistor 1167 and the conductor 838.

The time delay network 1166 also includes a resistor 1167', which connects the grid 1168 of the thyratron 1160 to a capacitor 1169 of the time delay network 1166. In parallel with the capacitor 1169 is a potentiometer of the time delay network 1166. The capacitor 1169 charges negatively over the following path: cathode 1164, grid 1168, resistor 1167', capacitor 1169, resistor 1165 and back to the cathode 1164. The negative charge on the capacitor 1169 is sufficient to prevent the firing of thyratron 1160.

When the relay 1150 (FIG. 27) is operated to activate the dough discharge control circuit 805 (FIG. 28), contacts 1153 close to shunt out the resistor 1165 of the time delay network 1166, thereby shunting out the alternating current across the resistor 1165. As a result thereof, the capacitor 1169 is discharged through the potentiometer 1170. By adjusting the potentiometer 1170, the discharge time of the capacitor 1169 can be regulated. When the capacitor 1169 discharges sufficiently, the thyratron 1160 will fire.

Connected to the plate 1161 of the thyratron 1160 is a relay 1171 (FIG. 28), which is energized while the thyratron 1160 conducts. When the relay 1171 is energized, contacts 1172 close to energize a relay 1174 (FIG. 28) over the following path: power supply 882 (FIG. 30), conductor 881, conductor 1178, contacts 1172 (FIG. 28), relay 1174 and ground. The contacts 1173 open to release the relay 1150 (FIG. 27) by opening its locking circuit, and the contacts 1152 of the relay 1150 open to release the cycle control relay 1090. The contacts 1153 of the relay 1150 open to disconnect the activating circuit from the dough discharge control circuit 805 (FIG. 26).

The energization of the relay 1174 (FIG. 28) opens contacts 1177 and closes contacts 1175 and 1176. By closing contacts 1175, a holding circuit is completed for the relay 1174 over the following path: ground, relay 1174, contacts 1175, conductor 1179, microswitch 686, conductor 1178, conductor 881 and the positive side of the power supply 882. The opening of contacts 1177 causes the brake 681 (FIG. 30) of the dough discharging apparatus F to deenergize, which was energized over the following path: contacts 1177 (FIG. 28), conductor 1180, brake 681 (FIG. 30), conductor 1181, conductor 1182, conductor 999, power supply 998, resistor 1001, conductor 1000, conductor 1135 and back to contacts 1177. When the brake 681 is deenergized, it is released.

Upon closing contacts 1176 of the relay 1174 (FIG. 28), the clutch 680 (FIG. 30) of the dough discharging apparatus F is energized over the following path: contacts 1176 (FIG. 28), conductor 1183, clutch 680 (FIG. 30), conductor 1181, conductor 1182, conductor 999, power supply 998, resistor 1001, conductor 1000, conductor 1135 and back to the contacts 1176. When the clutch 680 is energized, it is engaged to start the operation of the dough discharging apparatus F, whereby the dough discharging apparatus F projects a measured quantity of dough, such as one-half ounce.

The potentiometer 1170 (FIG. 28) of the time delay network 1166 is adjusted to delay the operation of the thyratron 1160 and thereby delay the operation of the relays 1171, 1174 and the clutch 680 so that the time interval between the release of the relay 860 (FIG. 26) and the projection of the measured quantity of dough by the dough discharging apparatus F is equal to the time it takes for a piece of dough advancing beyond the beam of light projected across the weight checking apparatus C to be discharged from the conveyor D (FIG. 2) toward the reversible conveyor E. Thus, the dough discharging apparatus F is operated in timed relation with the advancement of the piece of dough weighing less than the prescribed weight by an amount not in excess of the predetermined quantity, whereby the measured quantity of dough, such as one-half ounce, that is projected by the dough discharging apparatus F is deposited onto the continuously advancing piece of dough as it is discharged from the transfer conveyor D.

The thyratron 1160 (FIG. 28) is extinguished after contacts 1153 of the relay 1150 (FIG. 27) are opened to enable the capacitor 1169 (FIG. 28) to once again charge to its negative potential and when the negative portion of the source of alternating current is impressed on its plate 1161. At the time the thyratron 1160 extinguishes, the relay 1171 is deenergized and contacts 1172 break to open the operating circuit for the relay 1174. The relay 1174 remains energized through its holding circuit until the microswitch 686 (FIG. 30) is opened. The microswitch 686 is opened just prior to the completion of the cycle of operation of the dough discharging apparatus F and remains open for a sufficient time duration to break the holding circuit of the relay 1174 to deenergize the same. At the end of the cycle of operation of the dough discharging apparatus F, the microswitch 686 is closed to prepare a holding circuit for the relay 1174.

When the relay 1174 is deenergized, contacts 1176 break to open the energizing circuit for the clutch 680 of the dough discharging apparatus F and contacts 1177 close to complete the energizing circuit for the brake 681 of the dough discharging apparatus F.

In case a piece of dough advancing across the weight checking apparatus C weighs less than the prescribed weight by an amount within a selected range, such as between one-half ounce and one ounce, the magnitude of the voltage signal transmitted by the amplifier 800 (FIG. 26) is sufficient to overcome the bias on the thyratron 1012 (FIG. 27), as well as the thyratron 1013. Consequently, the relay 1060, as well as relay 1070, operates. When relay 1060 is operated, contacts 1061 break to open the activating circuit for the reject control circuit 804 (FIG. 29). The operation of the relay 1070 prepares an operating circuit for the relay 1190 (FIG. 27).

When the beam of light projected by the light source 131 (FIG. 26) is no longer interrupted by the piece of dough advancing across the weight checking apparatus C, the relay 860 is deenergized to open contacts 863 and to close contacts 864. The breaking of contacts 863 opens the operating circuit for the relay 870 (FIG. 27), which remains energized through its locking circuit. The closing of contacts 864 completes an operating circuit for a relay 1190 (FIG. 27) over the following path: positive side of the power supply 882 (FIG. 30), conductor 881, contacts 864 (FIG. 26), conductor 1096, contacts 871, conductor 1097, contacts 1091, conductor 1098, contacts 1043 (FIG. 27), contacts 1053, contacts 1075, rectifier 1094, relay 1190 and ground.

The closing of contacts 864 of the relay 860 does not activate the reject control circuit 804, since contacts 1061 of the relay 1060 are open. Accordingly, no reject pulse is produced in timed relation with the advancement of the piece of dough weighing less than the prescribed weight within a selected range, such as between one-half ounce and one ounce. Therefore, at the time such a piece of dough is discharged onto the reversible conveyor E, the normally operated clutch 390 (FIG. 30) is engaged.

When relay 1190 (FIG. 27) is energized, contacts 1191–1193 are closed. The closing of contacts 1191 completes a locking circuit for the relay 1190 over the following path: ground, relay 1190, contacts 1191, conductor 1214, contacts 1213, conductor 1220, conductor 1178, conductor 881, and the positive side of power supply 882. The closing of contacts 1193 completes a circuit for controlling the activation of the dough discharge control circuit 806 (FIG. 28) over the following path: contacts 1193, conductor 1195, dough discharge control circuit 806, conductor 1196 and back to the contacts 1193. The closing of contacts 1192 completes an energizing circuit for the cycle control relay 1090 over the following path: power supply 882 (FIG. 30), conductor 881, contacts 1192, time delay network 1102, relay 1090 and ground.

Upon operating the cycle control relay 1090 (FIG. 27), contacts 1091 and 1092 open. The opening of contacts 1092 releases the relay 870 (FIG. 27) through its holding circuit and further opens the activating circuit for the reject control circuit 804. The breaking of contacts 1091 opens the operating circuit for the relay 1190, which remains energized through its locking circuit. When the relay 870 is deenergized, the contacts 873 open to remove the plate voltage from the thyratrons 1010–1013 to extinguish the thyratrons 1012 and 1013 and contacts 872 break to further open the activating circuit for the reject control circuit 804. Upon extinguishing the thyratrons 1012 and 1013, the relays 1060 and 1070 are deenergized.

The release of relay 1070 opens contacts 1075 to further open the operating circuit for the relay 1190, which remains energized through its locking circuit.

The dough discharge control circuit 806 (FIG. 28) comprises a thyratron 1200 that has its plate 1201 connected to a source of alternating current (FIG. 30) through the conductor 838, a resistor 1202, a capacitor 1203, and the relay 1211 in parallel with the resistor 1202 and the capacitor 1203. The cathode 1204 of the thyratron 1200 is connected to the source of alternating current over the following path: the conductor 839, conductor 1196, a resistor 1205 of a time delay network 1206, a resistor 1207' and the conductor 838.

The time delay network 1206 (FIG. 28) also includes a resistor 1207, which connects the grid 1208 of the thyratron 1200 to a capacitor 1209 of the time delay network 1206. In parallel with the capacitor 1209 is a potentiometer 1210 of the time delay network 1206. The capacitor 1209 charges negatively over a path from the cathode 1204, grid 1208, resistor 1207, capacitor 1209, resistor 1205 and back to the cathode 1204. The negative charge on the capacitor 1209 is sufficient to prevent the firing of the thyratron 1200.

When the relay 1190 operates to activate the dough discharge control circuit 806, contacts 1193 close to shunt out the resistor 1205 of the time delay network 1206, thereby shunting out the alternating current across the resistor 1205. As a result thereof, the capacitor 1209 discharges through the potentiometer 1210. By adjusting the potentiometer 1210, the discharge time of the capacitor 1209 can be regulated. When the capacitor 1209 discharges sufficiently, the thyratron 1200 will fire.

Connected to the plate 1201 of the thyratron 1200 is a relay 1211 (FIG. 28), which is energized while the thyratron 1200 conducts. When relay 1211 is energized, contacts 1212 close to energize a relay 1215 (FIG. 28) over the following path: positive side of the power supply 882 (FIG. 30), conductor 881, conductor 1178, conductor 1220, contacts 1212 (FIG. 28), relay 1215 and ground. The contacts 1213 break to open the locking circuit of the relay 1190 to deenergize the same. When relay 1190 is deenergized, contacts 1193 break to open the activating circuit for the dough discharge control circuit 806 (FIG. 28) and contacts 1192 open to release the cycle control relay 1090.

The energization of relay 1215 opens contacts 1218 and closes contacts 1216 and 1217. By closing contacts 1216 a holding circuit is completed for the relay 1215 over the following path: ground, relay 1215, contacts 1216, conductor 1221, microswitch 694 (FIG. 30), conductor 1222, conductor 1178, conductor 881 and the positive side of the power supply 882 (FIG. 30).

The opening of contacts 1218 causes the brake 691 (FIG. 30) of the dough discharging apparatus F to deenergize, which was energized over the following path: contacts 1218, conductor 1223, brake 691 (FIG. 30), conductor 1224, conductor 1181, conductor 1182, conductor 999, power supply 998, resistor 1001, conductor 1000, conductor 1135, and back to contacts 1218. When the brake 691 is deenergized, it is released.

Upon closing contacts 1217 of the relay 1215 (FIG. 28), the clutch 690 (FIG. 30) of the dough discharging apparatus F is energized over the following path: contacts 1217, conductor 1225, clutch 690, conductor 1224, conductor 1181, conductor 1182, conductor 999, power supply 998, resistor 1001, conductor 1000, conductor 1135 and back to contacts 1217. When the clutch 690 is energized, it is engaged to start the operation of the dough discharging apparatus F, whereby the dough discharging apparatus F projects a measured quantity of dough, such as one ounce.

The potentiometer 1210 (FIG. 28) of the time delay network 1206 is adjusted to delay the operation of the thyratron 1200 and thereby delay the operation of the relays 1211, 1215 and the clutch 690 so that the time interval between the release of the relay 860 (FIG. 26) and the projection of the measured quantity of dough by the dough discharging apparatus F is equal to the time it takes for a piece of dough advancing beyond the beam of light projected across the weight checking apparatus C to be discharged from the conveyor D (FIG. 2). Thus, the dough discharging apparatus F is operated in timed relation with the piece of dough weighing less than the prescribed weight by an amount within the selected range, whereby the measured quantity of dough, such as one ounce, that is projected by the dough discharging apparatus F is deposited onto the continuously advancing piece of dough as it is discharged from the conveyor D. The potentiometer 1210 is ganged to the potentiometer 1170 of the delay network 1166 so that the time delay adjustments for the dough discharge control circuits 805 and 806 can be made simultaneously.

The thyratron 1200 (FIG. 28) is extinguished after contacts 1193 of the relay 1190 (FIG. 27) are opened to enable the capacitor 1209 (FIG. 28) to once again charge to the negative potential and when the negative portion of the source of alternating current is impressed on its plate 1201. At the time the thyratron 1200 extinguishes, the relay 1211 (FIG. 28) is deenergized and contacts 1212 break to open the operating circuit for the relay 1215. The relay 1215 remains energized through its holding circuit until the microswitch 694 (FIG. 30) is opened. The microswitch 694 is opened just prior to the completion of the cycle of operation of the dough discharging apparatus F and remains open for a sufficient time duration to break the holding circuit of the relay 1215 to deenergize the same. At the end of the cycle of operation of the dough discharging apparatus F, the microswitch 694 is closed to prepare a holding circuit for the relay 1215.

When the relay 1215 is deenergized, contacts 1217 break to open the energizing circuit for the clutch 690 of the dough discharging apparatus F and contacts 1218 close to complete the energizing circuit for the brake 691 of the dough discharging apparatus F.

If the piece of dough advancing across the weight checking apparatus C weighs less than the prescribed weight by an amount within another selected range, such as between one ounce and one and one-half ounces, the magnitude of the voltage signal transmitted by the amplifier 800 (FIG. 26) is sufficient to overcome the bias on the thyratron 1013 (FIG. 27). Consequently, the relay 1070 (FIG. 27) is operated. Upon operating the relay 1070, contacts 1074 break to open the activating circuit for the reject control circuit 804 (FIG. 29) and contacts 1071 and 1075 close to prepare operating circuits for the relays 1150 and 1190.

When the beam of light projected by the light source 131 (FIG. 26) is no longer interrupted by the piece of dough advancing across the weight checking apparatus C, the relay 860 (FIG. 26) is deenergized to open contacts 863 and to close contacts 864. The breaking of contacts 863 opens the operating circuit for the relay 870 (FIG. 27), which remains energized through its locking circuit. The closing of contacts 1075 completes an operating circuit for the relay 1190 (FIG. 27) over the following path: positive side of the power supply 882 (FIG. 30), conductor 881, contacts 864 (FIG. 26), conductor 1096, contacts 871, conductor 1097, contacts 1091, conductor 1098, contacts 1043, contacts 1053, contacts 1075, rectifier 1094, relay 1190 and to ground. The closing of contacts 1071 operates the relay 1150 (FIG. 27) over a similar path excepting that the path continues from the contacts 1053 through the contacts 1061 in the following manner: contacts 1071, conductor 1154, relay 1050 and ground.

The closing of contacts 864 does not activate the reject control circuit 804, since contacts 1074 of the relay 1070 are open. Accordingly, no reject pulse is produced in timed relation with the advancement of the piece of dough weighing less than the prescribed weight within the selected range, such as between one ounce and one and one-half ounces. Therefore, at the time such a piece of dough is discharged onto the reversible conveyor E, the normally operated clutch 390 (FIG. 30) is engaged.

Upon energizing the relay 1150, contacts 1151-1153 close and upon energizing the relay 1190, contacts 1191-1193 close. The closing of contacts 1151 and 1191 complete locking circuits for the relays 1150 and 1190, respectively, over paths previously described. The closing of contacts 1153 and 1193 activate the dough discharge control circuits in a manner previously described. The closing of contacts 1152 and 1192 operate the cycle control relay 1090 (FIG. 27) over the following path: ground, relay 1090, time delay circuit 1102, contacts 1192, contacts 1152, conductor 881 and the positive side of the power supply 882.

The operation of the cycle control relay 1090 causes contacts 1091 and 1092 to open. The opening of contacts 1092 releases the relay 870 (FIG. 27) through its holding circuit and further opens the activating circuit for the reject control circuit 804. The breaking of contacts 1091 opens the operating circuits for the relays 1150 and 1190, which remain energized through their prevoiusly described holding circuits.

When the relay 870 is deenergized, the contacts 873 open to remove the plate voltage from the thyratrons 1010-1013 to extinguish the thyratron 1013 and contacts 872 break to further open the activating circuit for the reject control circuit 804. Upon extinguishing the thyratron 1013, the relay 1070 is deenergized. The release of relay 1070 opens contacts 1071 and 1075 to further open the operating circuits for the relays 1150 and 1190.

The dough discharge control circuits 805 and 806 are activated simultaneously and operate in a manner previously described in detail. The operation of the dough discharge control circuits 805 and 806 delays the release of brakes 681 and 691 and delays the engagement of clutches 680 and 690 of the dough discharging apparatus F so that the time interval between the release of the relay 860 (FIG. 26) and the projection of the measured quantities of dough by the dough discharging apparatus F is equal to the time it takes for a piece of dough advancing beyond the beam of light projected across the weight checking apparatus C to be discharged from the conveyor D (FIG. 2). Thus, the dough discharging apparatus F is operated in timed relation with the piece of dough weighing less than the prescribed weight by an amount within the other selected range, whereby the measured quantity of dough, such as one and one-half ounces, that is projected by the dough discharging apparatus F, is deposited onto the continuously advancing piece of dough as it is discharged from the transfer conveyor D.

When relays 1171 and 1211 of the dough discharge control circuits 805 and 806 are operated, contacts 1173 and 1213 break to open the locking circuits for the relays 1150 and 1190, respectively. The relays 1150 and 1190 release to disengage the cycle control relay 1090.

Although the function and operation of each component of the electronic control circuits H has been described in connection with its particular circuitry, the overall operation of the circuits as pieces of dough are advanced through the machine will be described. In the operation of the electronic control circuits employed in the weight checking and correcting apparatus of the present invention, the transducer 130 (FIG. 26) transmits voltage signals in succession that are respectively representative of the weight of pieces of dough advancing in succession across the weight checking apparatus C. Each piece of dough advancing across the weight checking apparatus C interrupts the beam of light projected by the light source 131 toward the phototube 132 just before maximum deflection of the scale of the weight checking apparatus C is attained due to the weight imposed thereon. During the time the light beam is interrupted, the relay 860 (FIG. 26) of the relay circuit 801 is operated. As a piece of dough on the weight checking apparatus C advances beyond the beam of light, the relay 860 is deenergized.

The voltage signals that are representative of the weight of pieces of dough advancing across the weight checking apparatus C are amplified by the amplifier circuit 800 and are transmitted in succession over the conductor 825 to the divider control circuit 802 (FIG. 28) and to the weight classifying circuit 803 (FIG. 27).

The transistor relay 890 (FIG. 28) of the divider control circuit 802 operates in response to the operation of the relay 860 of the relay circuit 801. When the transfer relay 890 is deenergized, the capacitor 925 (FIG. 28) is charged to a predetermined negative potential. Upon energizing the transfer relay 890, the capacitor 925 discharges to charge the capacitor 918 (FIG. 28) in the cathode circuits of the detector 909 to a negative reference potential of a predetermined magnitude. The capacitor 918 is charged to the negative reference potential just prior to the time the detector 909 receives a voltage signal representative of the weight of the piece of dough advancing across the weight checking apparatus C. The detector 909 is biased by the biasing network 913 so that the detector 909 conducts in response to the peak portions of the incoming signals. When the detector 909 conducts, it reduces the negative potential on the capacitor 918 and may charge the capacitor 918 positively dependent upon the difference between the magnitude of the incoming signal and the biasing potential on the detector 909.

The biasing network 913 is adjusted so that the charge remaining on the capacitor 918 is zero when the detector 909 conducts in response to a voltage signal representative of the weight of a piece of dough of a desired weight. If the voltage signal is representative of the weight of a piece of dough weighing more than the desired weight, the charge remaining on the capacitor 918 will be positive. In case the voltage signal is representative of the weight of a piece of dough weighing less than the desired weight, the charge remaining on the capacitor 918 will be negative.

When the transfer relay 890 is deenergized, a voltage pulse from the charge remaining on the capacitor 918 is transmitted to the averaging network 935 (FIG. 28). The voltage pulse is representative of the difference between the desired weight for pieces of dough produced by the dough divider and the weight of the piece of dough advancing across the weight checking apparatus C. The above operations occur each time a piece of dough is weighed by the check weighing apparatus C. Accordingly, the detector 909 converts the successive voltage signals transmitted by the amplifier 800 into a series of pulses respectively representative of the difference between the desired weight and the weight of pieces of dough advancing in succession across the weight checking apparatus C.

The series of pulses are received by the averaging network 935 of the divider control circuit 802, which has a relatively long time constant compared with the time duration between successive pulses. The averaging network 935 produces an average signal from the series of pulses and impresses the average signal onto the grid 940 of the differential detector 941 (FIG. 28). It is to be observed that the average signal produced by the averaging network 935 is not the result of a finite series of pulses, but it is a continuous signal reflecting an average of a series of pulses that is continuously produced by the detector 909.

If the average signal produced by the averaging network 935 has a magnitude representative of the desired weight, the voltage applied to the grid of the differential detector 941 is equal to the reference voltage impressed on the grid 944 of the differential detector 941 by the biasing network 945. Hence, the polarized relay 960 will not operate.

In case an average signal produced by the averaging network 935 has a positive magnitude, which is representative of an average weight in excess of the desired weight, the voltage applied to the grid 940 of the differential detector 941 is more positive than the reference voltage applied to the grid 944 of the differential detector 941. Consequently, the polarized relay 960 operates to close contacts 961. The closing of contacts 961 energizes the divider control relay 970 (FIG. 28). Upon energizing the relay 970, an operating circuit for the divider control motor 51 is completed to rotate the drive shaft of the motor 51 in a direction to decrease the weight of pieces of dough formed within the dough divider A.

The relay 970, when energized, also completes a circuit to apply a fixed positive potential to the bias control network 978. The capacitor 947 of the biasing network 945 charges slowly toward the positive voltage of the bias network 978 and applies a gradually increased positive potential to the grid 944 of the differential detector 941 until the positive potential on the grid 944 is equal to the positive potential on the grid 940 of the differential detector 941. When the potential on the grid 944 is equal to the potential on the grid 940, the polarized relay 960 is deenergized and the contacts 961 break to release the relay 970. The relay 970 is deenergized to open the operating circuit to the divider control motor 51 and to remove the positive potential from the bias control network 978. The capacitor 947 of the biasing network 945 then discharges to the reference voltage, which is zero.

If an average signal produced by the averaging network 935 has a negative magnitude, which is representative of an average weight less than the desired weight for pieces of dough leaving the dough divider, the voltage applied to the grid 940 of the differential detector 941 is more negative than the reference voltage applied to the grid 944 of the differential detector 941 by the biasing network 945. This results in the energization of the polarized relay 960, which operates to close contacts 962. The closing of contacts 962 operates the divider control relay 990 (FIG. 28).

Upon operating the divider control relay 990, an operating circuit for the reversible motor 51 is completed so that its drive shaft rotates in a direction to increase the weight of pieces of dough formed within the dough divider A. The operation of the relay 990 also completes a circuit to apply a fixed negative potential to the bias control network 978. The capacitor 947 of the biasing network 945 charges slowly toward the negative voltage on the bias control network 978 and impresses a gradually more negative potential on the grid 944 of the differential detector 941 until the negative potential on the grid 944 is equal in magnitude to the negative potential on the grid 940 of the differential detector 941. When the potential on the grid 944 is equal to the potential on the grid 940, the polarized relay 960 is deenergized.

The deenergization of the polarized relay 960 releases the divider control relay 990. When the divider control relay 990 is released, the operating circuit for the reversible motor 51 is opened and the negative potential is removed from the bias control network 978. The capacitor 947 of the biasing network 945 then discharges to the reference voltage, which is zero.

Hence, the differential detector 941 compares the polarity of the average signal with a reference voltage to determine the direction of rotation of the reversible motor 51 and compares the magnitude of the average signal with a gradually increasing reference voltage of a like polarity to determine the time duration for operating the reversible motor 51.

The above-described operations for compensating between the desired weight and an average weight is repeated until the pieces of dough advancing across the weight checking apparatus C are of the desired weight. When this occurs, the average signal applied to the grid 940 of the differential detector 941 is equal to the reference voltage applied to the grid 944 of the differential detector 941 by the biasing network 945.

As previously described, the relay 860 (FIG. 26) of the relay circuit 801 is operated when a piece of dough advancing across the weight checking apparatus C interrupts the beam of light projected toward the phototube 132. The beam of light is interrupted just before the scale of the weight checking apparatus C attains maximum deflection from the weight of a piece of dough imposed thereon. The relay 860 remains operated until the piece of dough advancing across the check weighing apparatus C has advanced beyond the beam of light projected by the light source 131.

The relay 860, when operated, completes an energizing circuit for the relay 870 (FIG. 27) of the relay circuit 801. When the relay 870 is energized, a circuit for holding the relay 870 is completed, a circuit is prepared for activating the reject control circuit 804, and a circuit is completed for impressing a positive potential on the plates of the thyratrons 1010-1013 of the classifying circuit 801. It is to be observed that the positive potential is applied to the plates of the thyratrons 1010-1013 before the scale of the weight checking apparatus C attains maximum deflection in response to the weight of a piece of dough advancing across the weight checking apparatus C.

If a piece of dough advancing across the weight checking apparatus C weighs at least the prescribed weight, the magnitude of the voltage signal transmitted by the amplifier 800 (FIG. 26) is sufficient to cause the thyratrons 1010-1013 (FIG. 27) to fire. This results in the relays 1040, 1050, 1060 and 1070 operating. The operation of relay 1040 opens the activating circuit for the reject control circuit 804 and prepares an operating circuit for the cycle control relay 1090 (FIG. 27).

When the beam of light projected by the light source 131 is no longer interrupted by the piece of dough advancing across the check weighing apparatus C, the relay 860 is released. The deenergization of the relay 860 opens the operating circuit for the relay 870, which remains energized through its holding circuit and completes an operating circuit for the cycle control relay 1090 (FIG. 27). The closing of contacts 864 of the relay 860 does not activate the reject control circuit, since the relay 1040 is operated. Hence, no reject pulse is produced in the reject control circuit 804 in timed relation with the advancement of the piece of dough weighing at least the prescribed weight. Accordingly, at the time the piece of dough weighing at least the prescribed weight is discharged onto the reversible conveyor E, the normally operated clutch 390 (FIG. 30) is engaged. When the clutch 390 is engaged, the reversible conveyor E advances the piece of dough thereon toward the conveyor 306 (FIG. 2) for further processing.

The energizing of the cycle control relay 1090 releases relay 870. When relay 870 is deenergized, it removes the plate voltage from the thyratrons 1010-1013 to extinguish the same. Thereupon, the relays 1040, 1050, 1060 and 1070 are deenergized. The cycle control relay 1090 is released through its own contacts 1091.

In case the piece of dough advancing across the weight checking apparatus C weighs less than the predetermined minimum weight, the magnitude of the voltage signal transmitted by the amplifier 800 over the conductor 825 is insufficient to overcome the bias on the thyratrons 1010-1013 of the weight classifying circuit 803 (FIG. 27). Hence, the thyratrons 1010-1013 do not fire.

When the beam of light projected by the light source 131 is no longer interrupted by the piece of dough advancing across the weight checking apparatus C, the relay 860 (FIG. 27) is deenergized.

Upon the deenergization of the relay 860, a circuit is completed for activating the reject control circuit 804 (FIG. 29), an operating circuit for the cycle control relay 1090 (FIG. 27) is completed and the operating circuit for the relay 870 is opened. The relay 870 remains operated through its holding circuit.

The cycle control relay 1090 is delayed in its operation by the time delay network 1102 and operates after the reject control circuit 804 is activated. When the relay 1090 operates, it opens the holding circuit for the relay 870 and opens its operating circuit through contacts 1091. The relay 870 is deenergized to remove the plate voltage from the thyratrons 1010-1013 of the weight classifying circuit 803 (FIG. 27).

The reject control circuit 804 (FIG. 29) stores a reject signal and delays the energization of the reject clutch 397 (FIG. 30) for a time duration equal to the time it takes for a piece of dough advancing beyond the beam of light projected across the weight checking apparatus C to be discharged onto the reversible conveyor E. Hence, the reject control circuit 804 operates the reject clutch 397 in timed relation with the advancement of a piece of dough weighing less than the predetermined weight, whereby the direction of travel of the reversible conveyor E is reversed at the time the piece of dough is discharged onto the reversible conveyor E. The reject control circuit 804 maintains the reject clutch 397 energized for a predetermined period of time.

If a piece of dough advancing across the weight checking apparatus C weighs less than the prescribed weight by an amount within a predetermined quantity, such as one-half ounce, the magnitude of the voltage signal transmitted by the amplifier 800 (FIG. 26) is sufficient to overcome the bias on the thyratrons 1011-1013 of the weight classifying circuit 803 (FIG. 27). This results in the operation of relay 1050 (FIG. 27), which opens the activating circuit for the reject control circuit 804 (FIG. 29) and prepares an operating circuit for the relay 1150 (FIG. 27).

When the beam of light projected by the light source 131 (FIG. 26) is no longer interrupted, the relay 860 (FIG. 26) is deenergized. At the time relay 860 is deenergized, the operating circuit for the relay 870 is opened and a circuit is completed for operating the relay 1150. The relay 870 remains operated through its holding circuit.

The deenergization of the relay 860 does not activate the reject control circuit 804, since the relay 1050 is operated. Hence, no reject pulse is produced in timed relation with the advancement of the piece of dough weighing less than the prescribed weight by an amount within the predetermined quantity, such as one-half ounce. Therefore, at the time such a piece of dough is discharged onto the reversible conveyor E, the normally operated clutch 390 (FIG. 30) is engaged.

Upon energizing the relay 1150 (FIG. 27) a locking circuit therefor is completed through the contacts of the relay 1171 (FIG. 28) of the dough discharge control circuit 805, an energizing circuit for the cycle control relay 1090 is completed and a circuit is completed for activating the dough discharge control circuit 805. The cycle control relay 1090 causes the relay 870 (FIG. 27) to be deenergized, which in turn removes the plate voltage from the thyratrons 1010-1013 of the weight classifying circuit 803. Consequently, thyratrons 1011-1013 are extinguished and relays 1050, 1060 and 1070 are deenergized.

The dough discharge control circuit 805 (FIG. 28) delays the release of the brake 681 and the engagement of the clutch 680 of the dough discharging apparatus F so that the time interval between the deenergization of the relay 860 (FIG. 26) and the projection of the measured quantity of dough by the dough discharging apparatus F is equal to the time it takes for a piece of dough advancing beyond the beam of light projected across the weight checking apparatus C to be discharged from the conveyor D (FIG. 2). Thus, the dough discharging apparatus F is operated in timed relation with the advancement of the piece of dough weighing less than the prescribed weight by an amount not in excess of the predetermined quantity, whereby the measured quantity of dough, such as one-half ounce, is projected by the dough discharging apparatus F onto the continuously advancing piece of dough as it is discharged from the conveyor D.

During the operation of the dough discharge control circuit 805, the thyratron 1160 (FIG. 28) is fired under the control of the time delay network 1166 to operate the relay 1171. The relay 1171, when operated, opens the locking circuit for the relay 1150 (FIG. 27) to deenergize the same and completes an operating circuit for the relay 1174 of the control circuit 805. The deenergization of the relay 1150 releases the cycle control relay 1090 (FIG. 27), and opens the activating circuit for the dough discharge control circuit 805. Thereupon, the thyratron 1160 extinguishes and the relay 1171 is deenergized.

The relay 1174 (FIG. 28) of the control circuit 805 operates to deenergize the brake 681 (FIG. 30) and to energize the clutch 680 of the dough discharging apparatus C. Through a holding circuit, the relay 1174 remains operated until the microswitch 686 (FIG. 30) of the dough discharging apparatus F is opened. The microswitch 686 is opened just prior to the completion of the cycle of operation of the dough discharging apparatus F, and at the end of the cycle of operation, the microswitch 686 is closed to prepare a holding circuit for the relay 1174. The relay 1174 deenergizes to disengage the clutch 680 and to engage the brake 681 of the dough discharging apparatus F.

In case a piece of dough advancing across the weight checking apparatus C weighs less than the prescribed weight by an amount within a selected range, such as between one-half ounce and one ounce, the magnitude of the voltage signal transmitted by the amplifier 800 (FIG. 26) is sufficient to overcome the bias on the thyratron tubes 1012 and 1013 (FIG. 27) of the weight classifying circuit 803. As a result thereof, relays 1060 and 1070 operate. The operation of the relay 1060 opens the activating circuit for the reject control circuit 804 (FIG. 29) and the operation of the relay 1070 prepares an operating circuit for the relay 1190.

When the beam of light projected by the light source 131 (FIG. 26) is no longer interrupted by the piece of dough advancing across the weight checking apparatus C, the relay 860 is deenergized. As a consequence thereof, the operating circuit for the relay 870 (FIG. 27) is opened and an operating circuit for the relay 1190 (FIG. 27) is completed.

The deenergization of the relay 860 does not activate the reject control circuit 804, since relay 1060 (FIG. 26) is operated. Therefore, no reject pulse is produced in timed relation with the advancement of the piece of dough weighing less than the prescribed weight within the selected range, such as between one-half ounce and one ounce. Therefore, at the time such a piece of dough is discharged onto the reversible conveyor E, the clutch 390 (FIG. 30) is engaged.

Upon energizing the relay 1190 (FIG. 27) a locking circuit therefor is completed through the dough discharge control circuit 806 (FIG. 28), a circuit is completed for energizing the cycle control relay 1090 and an activating circuit is completed for the dough discharge control circuit 806. The operating of the cycle control relay 1090 releases the relay 870, which in turn removes the plate voltage form the thyratrons 1010–1013 of the weight classifying circuit 803. Thereupon, thyratrons 1012 and 1013 extinguish and relays 1060 and 1070 are deenergized.

The dough discharging control circuit 806 (FIG. 28) delays the release of the brake 691 and the engagement of the clutch 690 of the dough discharging apparatus F so that the time interval between the deenergization of the relay 860 (FIG. 26) and the projection of the measured quantity of dough by the dough discharging apparatus F is equal to the time it takes for a piece of dough advancing beyond the beam of light projected across the weight checking apparatus C to be discharged from the conveyor D (FIG. 2). Thus, the dough discharging apparatus F is operated in timed relation with the advancement of the piece of dough weighing less than the prescribed weight by an amount within the selected range, whereby the measured quantity of dough such as one ounce is projected by the dough discharging apparatus F onto the continuously advancing piece of dough as it is discharged from the conveyor D.

During the operation of the dough discharge control circuit 806, the thyratron 1200 (FIG. 28) is fired under the control of the time delay network 1206 to operate the relay 1211. The relay 1211, when operated, opens the locking circuit for the relay 1190 (FIG. 27) to deenergize the same and completes an operating circuit for the relay 1215 of the control circuit 806. The deenergization of the relay 1190 releases the cycle control relay 1090 (FIG. 27) and opens the activating circuit for the dough discharge control circuit 806. Thereupon, the thyratron 1200 extinguishes and the relay 1211 is deenergized.

Thet relay 1215 (FIG. 28) of the control circuit 806 operates to deenergize the brake 691 (FIG. 30) and to energize the clutch 690 of the dough discharging apparatus C. Through a holding circuit, the relay 1215 remains operated until the microswitch 694 (FIG. 30) of the dough discharging apparatus F is opened. The microswitch 694 is opened just prior to the completion of the cycle of operation of the dough discharging apparatus F and, at the end of the cycle of operation, the microswitch 694 is closed to prepare a holding circuit for the relay 1215. The relay 1215 deenergizes to disengage the clutch 690 and to engage the brake 691.

If the piece of dough advancing across the weight checking apparatus C weighs less than the prescribed weight by an amount within another selected range, such as between one ounce and one and one-half ounces, the magnitude of the voltage signal transmitted by the amplifier 800 (FIG. 26) is sufficient to overcome the bias in the thyratron 1013 (FIG. 27) of the weight classifying circuit 803. Consequently, the relay 1070 (FIG. 27) operates to open the activating circuit for the reject control circuit 804 (FIG. 29) and to prepare operating circuits for the relays 1150 and 1190 (FIG. 27). The relays 1150 and 1190 operate in a manner previously described and activate the dough discharge control circuits 805 and 806 (FIG. 28). The dough discharge control circuits 805 and 806 operate simultaneously in a manner previously described, whereby the dough discharging apparatus F projects a measured quantity of dough, such as one and one-half ounces, onto the continuously advancing piece of dough, weighing less than the prescribed weight within the selected range, as the piece of dough is discharged from the conveyor D (FIG. 2).

Although the weight checking and correcting apparatus of the present invention has been described in connection with the processing of pieces of dough, it will be recognized that the apparatus of the present invention may be employed in connection with other plastic-like articles or articles classifiable by weight or other qualities.

It will be understood that modifications and variations of the embodiments of the invention disclosed herein may be resorted to without departing from the spirit of the invention and the scope of the appended claims.

Having thus described our invention, what we claim as new and desire to protect by Letters Patent is:

1. Weight checking and correcting apparatus adapted for use with a dough divider comprising means for continuously advancing pieces of dough along a path in spaced relation, a weighing device disposed adjacent said path for weighing the pieces of dough in succession, means responsive to said weighing device for producing successive signals, each signal being representative of the weight of one of the successively advancing pieces of dough, a dough discharging mechanism disposed adjacent said path, said mechanism including projecting means selectively operable to cast one or more of a plurality of different relatively small quantities of dough into adhering relation with the pieces of dough, and means responsive to said signals for operating said dough discharging mechanism to add quantities of dough onto pieces of dough weighing less than a prescribed weight, said added quantities of dough being commensurate with the amount individual dough pieces weigh less than the prescribed weight.

2. Weight checking and correcting apparatus adapted for use with a dough divider comprising unidirectional conveyor means for continuously advancing pieces of dough along a path in spaced relation, a weighing device disposed adjacent said path for weighing the pieces of dough in succession, a continuously driven reversible conveyor positioned adjacent said path to receive in succession the weighed pieces of dough advanced by said unidirectional conveyor means, said reversible conveyor normally running laterally across the end of said unidirectional conveyor, means for driving said reversible conveyor at a sufficient speed relative to the space between successive pieecs of dough on said conveyor means so that each piece of dough is discharged therefrom before another is received from said unidirectional conveyor means whereby one piece of dough is advanced at a time by said reversible conveyor, a dough discharging mechanism spaced from said weighing device in the direction of travel of said pieces of dough, said mechanism including means for selectively applying one or more quantities of dough to a piece of dough on said reversible conveyor, and means responsive to said weighing device and to the advancement of the pieces of dough on said unidirectional conveyor means for operating said dough discharging mechanism to add quantities of dough onto pieces of dough weighing in a range between a prescribed weight and a predetermined minimum weight and for reversing the direction of travel of said reversible conveyor to reject pieces of dough weighing less than the predetermined minimum weight.

3. Weight checking and correcting apparatus adapted for use with a dough divided comprising unidirectional conveyor means for continuously advancing pieces of dough along a path in spaced relation, a weighing device disposed adjacent said path for weighing the pieces of dough in succession, a continuously driven reversible conveyor positioned adjacent said path to receive in succession the weighed pieces of dough advanced by said unidirectional conveyor means, said reversible conveyor normally running laterally across the end of said unidirectional conveyor, means for driving said reversible conveyor at a sufficient speed relative to the space between successive pieces of dough on said conveyor means so that each piece of dough is discharged therefrom before another is received from said unidirectional conveyor means whereby one piece of dough is advanced at a time by said reversible conveyor, a dough discharging mechanism disposed adjacent said reversible conveyor, said mechanism including means for selectively applying one or more quantities of dough to a piece of dough on said reversible conveyor, and means responsive to said weighing device for operating said dough discharging mechanism to add quantities of dough onto pieces of dough weighing in a range between a prescribed weight and a predetermined minimum weight and for reversing the direction of travel of said reversible conveyor to reject pieces of dough weighing less than the predetermined minimum weight.

4. In combination, a primary dough divider, having means for discharging individual pieces of dough, means for adjusting the discharge means of said dough divider to vary the quantity of dough discharged thereby, conveyor means for receiving pieces of dough from said dough divider and for advancing the pieces of dough along a path in spaced relation, drive means for continuously operating said conveyor means, a weighing device disposed adjacent said path for weighing the pieces of dough in succession, a dough discharging mechanism disposed adjacent said path and spaced from said weighing device in the direction of travel of said pieces of dough, said dough discharging mechanism including means for depositing an increment of dough on a moving piece of dough, means responsive to said weighing device for producing successive signals representing deviations in the weights of pieces of dough from a prescribed weight, means for detecting the position of a piece of dough advancing along said path, means responsive to said detecting means for producing successive signals representing the positions of successive pieces of dough, means for operating said dough discharging mechanism in response to said successive signals to add quantities of dough onto each piece of dough weighing less than a prescribed weight as said piece is continuously advancing on said conveyor means, means for averaging said successive weight signals to produce an average weight signal, means for comparing said average weight signal with a gradually changing reference voltage, means for controlling said primary dough divider adjusting means in response to said comparison, means for rejecting pieces of dough that fall below a predetermined minimum weight, and means for controlling said rejecting means in response to said signals.

5. In combination, a primary dough divider having means for discharging individual pieces of dough, means for adjusting the discharge means of said dough divider to vary the quantity of dough discharged thereby, conveyor means for receiving pieces of dough from said dough divider and for advancing the pieces of dough along a path in spaced relation, drive means for continuously operating said conveyor means, a weighing device disposed adjacent said path for weighing the pieces of dough in succession, a dough discharging mechanism disposed adjacent said path and spaced from said weighing device in the direction of travel of said pieces of dough, said dough discharging mechanism including means for depositing an increment of dough on a moving piece of dough, means responsive to said weighing device for producing successive signals representing deviations in the weights of pieces of dough from a prescribed weight, means for detecting the position of a piece of dough advancing along said path, means responsive to said detecting means for producing successive signals representing the positions of successive pieces of dough, means for operating said dough discharging mechanism in response to said successive signals to add quantities of dough onto each piece of dough weighing less than a prescribed weight as said piece is continuously advancing on said conveyor means, means for averaging said successive weight signals to produce an average weight signal, means for comparing said average weight signal with a reference to obtain an adjusting signal that varies in direction and magnitude from the reference, and means for controlling said primary dough divider adjusting means in response to said adjusting signal.

6. In combination, a primary dough divider having means for discharging individual pieces of dough, means for adjusting the discharge means of said dough divider to vary the quantity of dough discharged thereby, conveyor means for receiving pieces of dough from said dough divider and for advancing the pieces of dough along a path in spaced relation, drive means for continuously operating said conveyor means, a weighing device disposed adjacent said path for weighing the pieces of dough in succession, a dough discharging mechanism disposed adjacent said path and spaced from said weighing device in the direction of travel of said pieces of dough, said dough discharging mechanism including means for casting increments of dough onto a moving piece of dough, means responsive to said weighing device for producing successive signals representing deviations in the weights of pieces of dough from a prescribed weight, means for detecting the position of a piece of dough advancing along said path, means responsive to said detecting means for producing successive signals representing the positions of successive pieces of dough, and means for operating said dough discharging mechanism in response to said successive signals to cast quantities of dough onto each piece of dough weighing less than a prescribed weight as said piece is continuously advancing on said conveyor means.

7. Weight checking and correcting apparatus adapted for use with a dough divider comprising conveyor means, means for advancing pieces of dough along a path in spaced relation, drive means for continuously operating said conveyor means, a weighing device disposed adjacent said path for weighing the pieces of dough in succession, a dough discharging mechanism disposed adjacent said path and spaced from said weighing device in the direction of travel of said dough pieces, said dough discharging mechanism including means for projecting a quantity of dough into a predetermined zone in said path, a control circuit for said dough discharging mechanism, means responsive to said weighing device for producing successive signals representing deviations in the weights of pieces of dough from a prescribed weight, means for detecting the position of a piece of dough advancing along said path, means responsive to said detecting means for producing successive signals representing the positions of successive pieces of dough, means for energizing said control circuit in response to said successive signals for projecting a quantity of dough against an advancing piece of dough in said predetermined zone when the advancing piece of dough weighs less than a prescribed weight, and a timing circuit associated with said control circuit for delaying the operation thereof for a period of time equal to the time it takes for successive pieces of dough to pass from said weighing device to said predetermined zone.

8. Weight checking and correcting apparatus for bringing up to weight underweight pieces of dough dispensed by a main dough divider, said apparatus comprising conveyor means for advancing pieces of dough in spaced relation along a path, drive means for continuously operating said conveyor means, a single weighing device disposed along said path for weighing the continuously moving pieces of dough in succession, means responsive to said weighing device for producing correction signals for underweight pieces of dough, a dough discharging mechanism disposed adjacent said path and downstream from said weighing device, said dough discharging mechanism comprising means for discharging different measured increments of dough onto moving pieces of dough, and control circuit means responsive to said correction signals for selectively operating said dough discharging mechanism, said control circuit means including a correction signal storing and time delay device to cause said continuously moving pieces of dough to clear said weighing device before said dough discharging mechanism is operated by said control circuit means to add increments of dough to the pieces of dough.

References Cited in the file of this patent

UNITED STATES PATENTS

| | | |
|---|---|---|
| 551,062 | Tilden | Dec. 10, 1895 |
| 798,361 | Morton | Aug. 29, 1905 |
| 888,412 | Thomson | May 19, 1908 |
| 1,916,552 | Beach | July 4, 1933 |
| 1,922,883 | Crago | Aug. 15, 1933 |
| 2,018,719 | Haug | Oct. 29, 1935 |
| 2,165,759 | Nyborg | July 11, 1939 |
| 2,322,218 | Baird | June 22, 1943 |
| 2,357,679 | Moench | Sept. 5, 1944 |
| 2,366,075 | Weyandt | Dec. 26, 1944 |
| 2,451,534 | Christensen | Oct. 19, 1948 |
| 2,502,380 | Howard | Mar. 28, 1950 |
| 2,538,346 | Wood | Jan. 16, 1951 |
| 2,568,255 | Schieser et al. | Sept. 18, 1951 |
| 2,612,995 | Kahle | Oct. 7, 1952 |
| 2,688,458 | Schieser et al. | Sept. 7, 1954 |
| 2,712,408 | Weber | July 5, 1955 |
| 2,732,067 | Cunningham et al. | Jan. 24, 1956 |
| 2,745,411 | Gilman | May 15, 1956 |
| 2,802,658 | Hensgen et al. | Aug. 13, 1957 |
| 2,901,209 | Bardy et al. | Aug. 25, 1959 |